Jan. 7, 1964  J. BONER  3,116,537
MULTIPLE TURRET LATHE
Filed Sept. 15, 1960  25 Sheets-Sheet 1

INVENTOR.
JOHANN BONER
BY
McMorrow, Berman & Davidson
ATTORNEYS

Jan. 7, 1964     J. BONER     3,116,537
MULTIPLE TURRET LATHE

Filed Sept. 15, 1960     25 Sheets-Sheet 4

FIG. 4

INVENTOR.
JOHANN BONER
BY
McMorrow, Berman & Davidson
ATTORNEYS

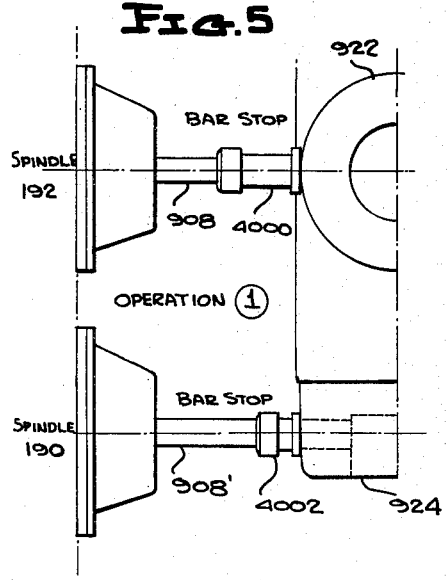
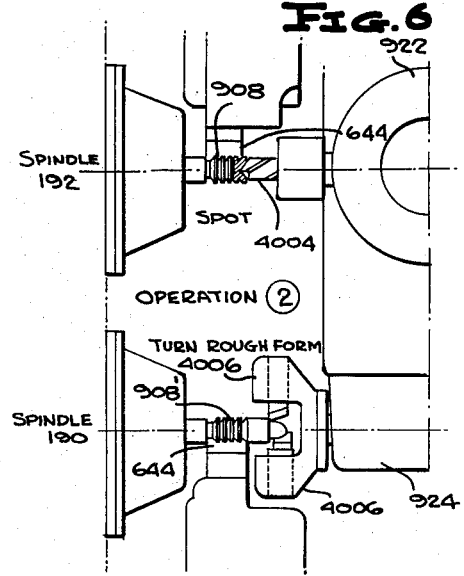
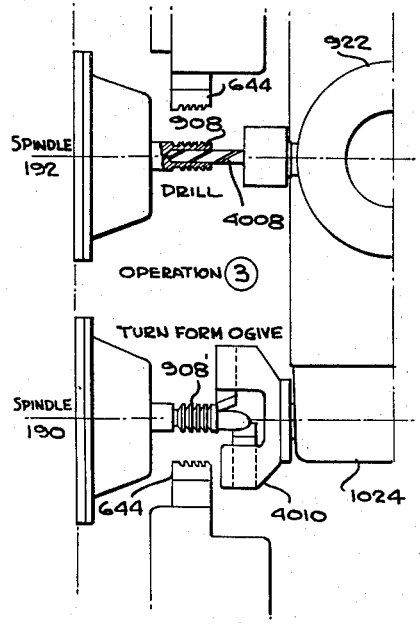
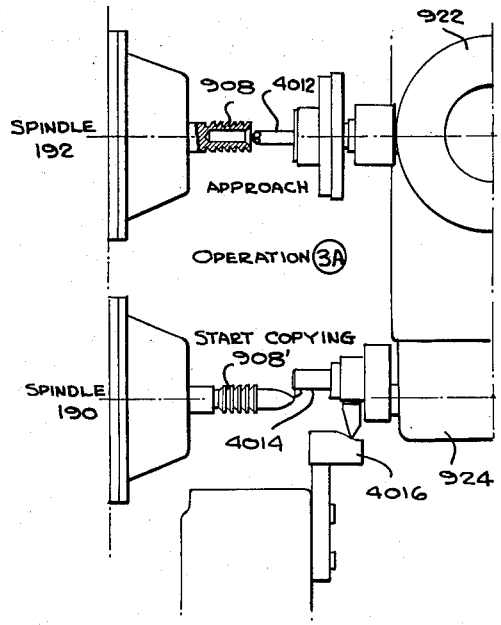

Jan. 7, 1964
J. BONER
3,116,537
MULTIPLE TURRET LATHE
Filed Sept. 15, 1960
25 Sheets-Sheet 6
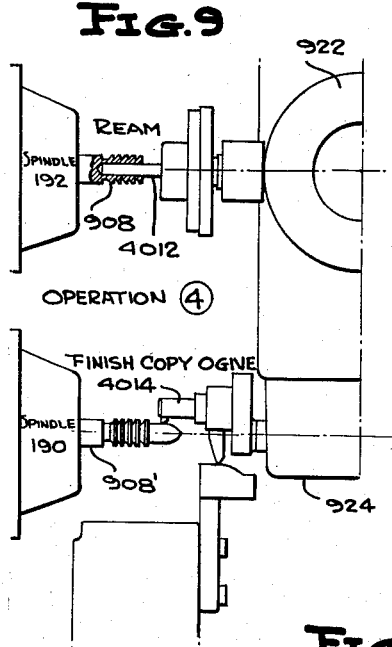
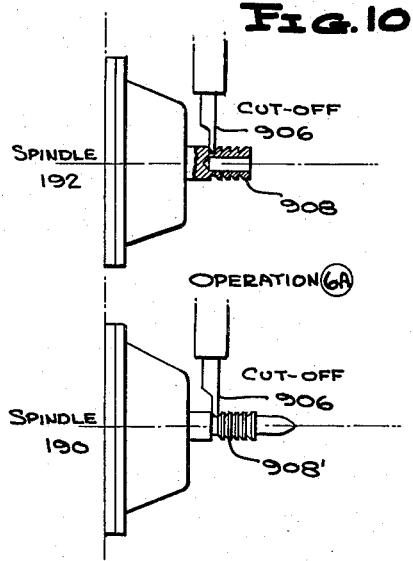
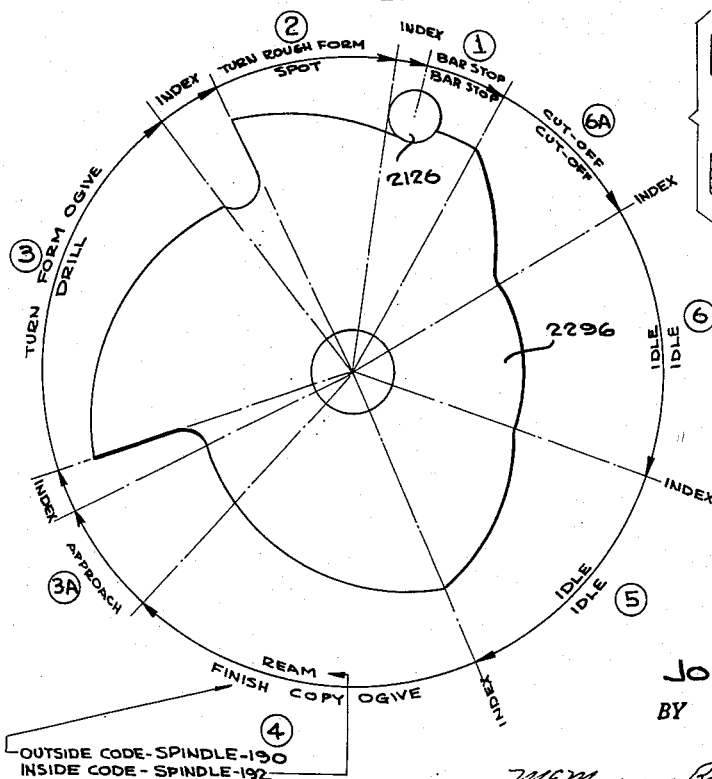
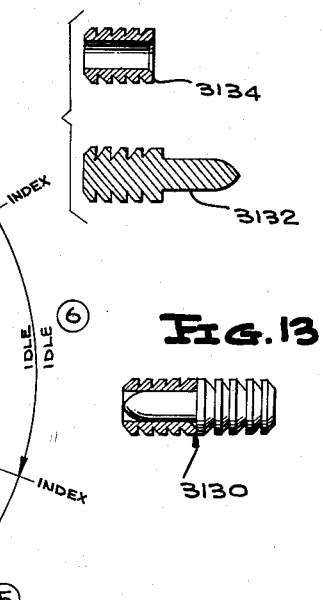
INVENTOR.
JOHANN BONER
BY
McMorrow, Berman & Davidson
ATTORNEYS

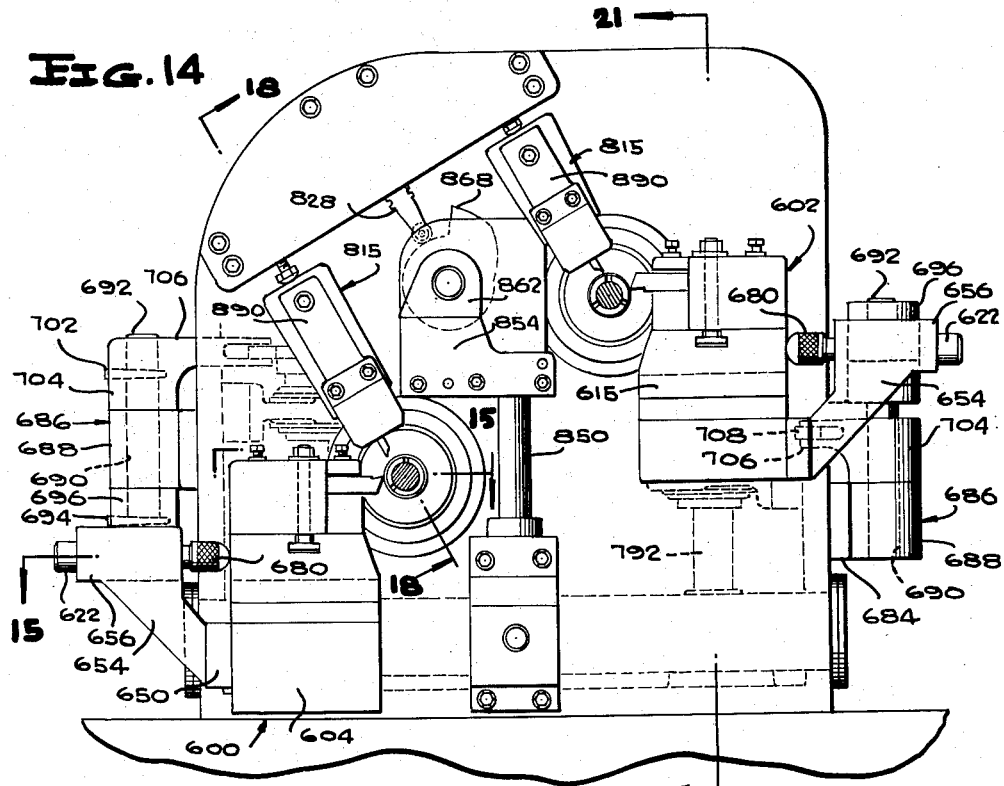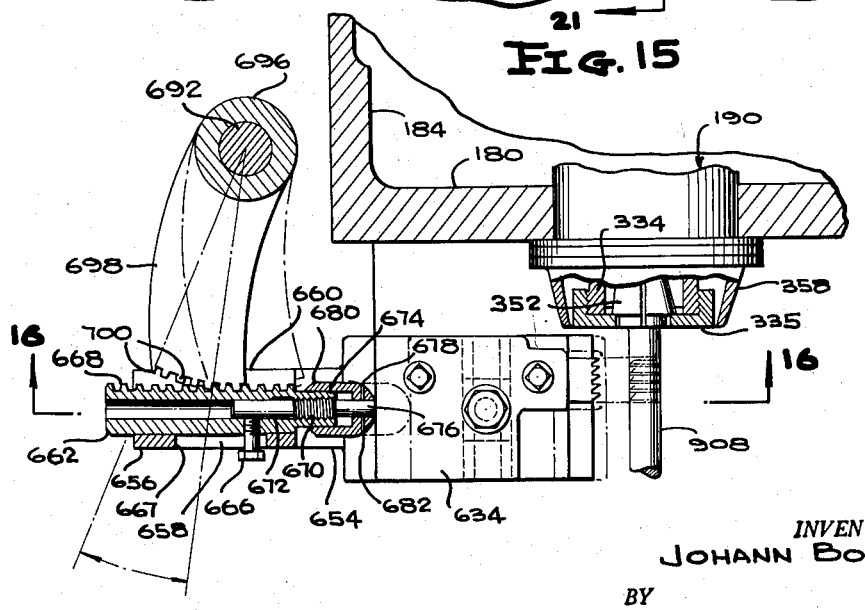

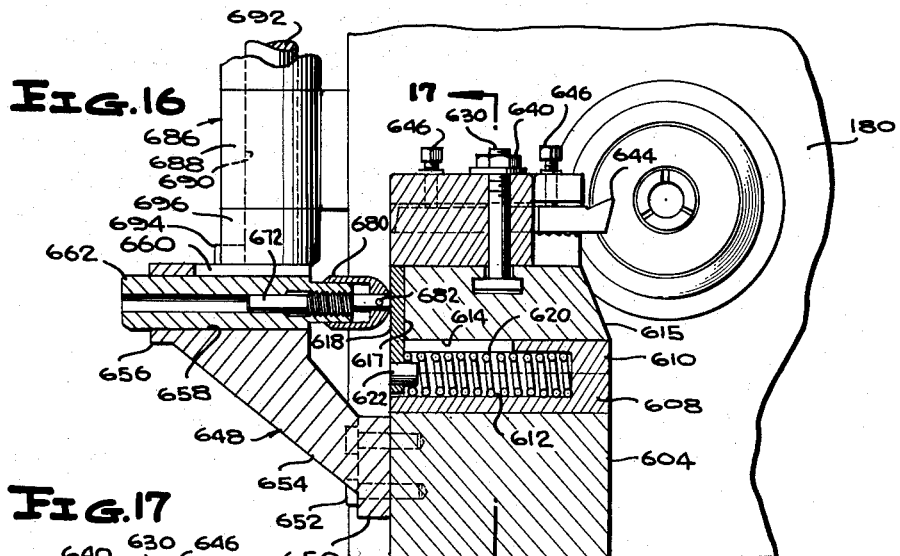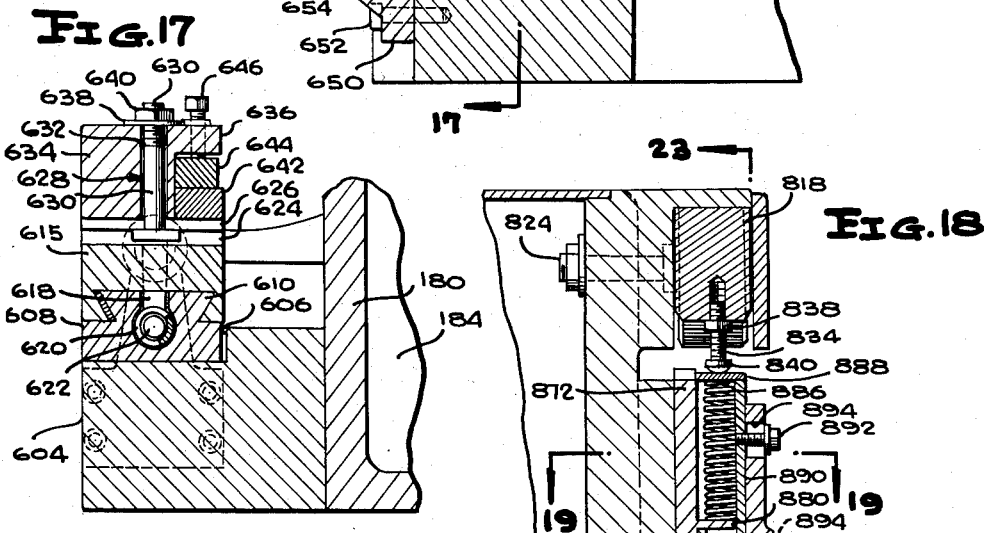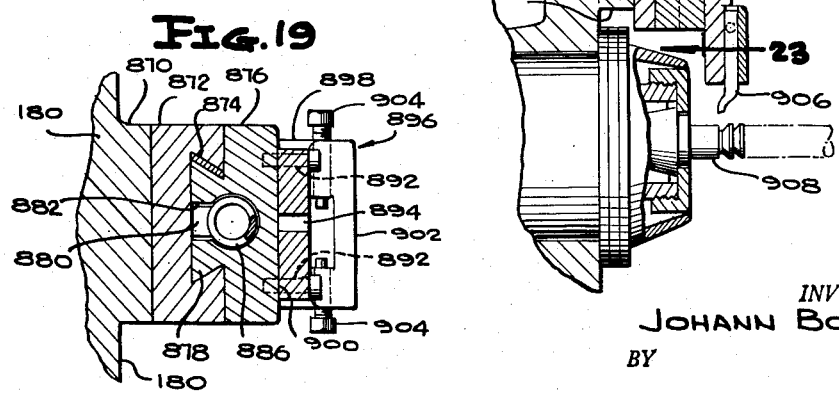

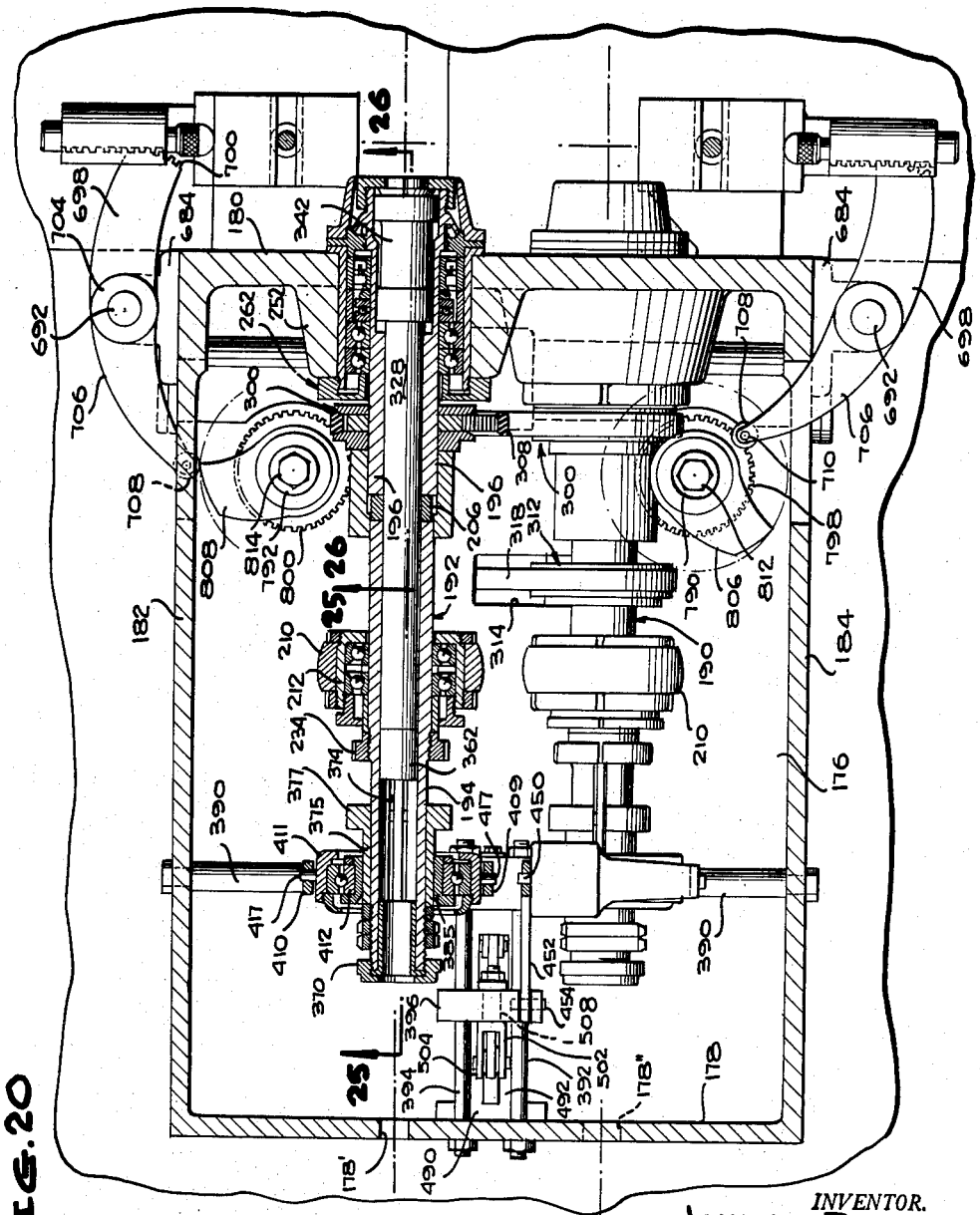

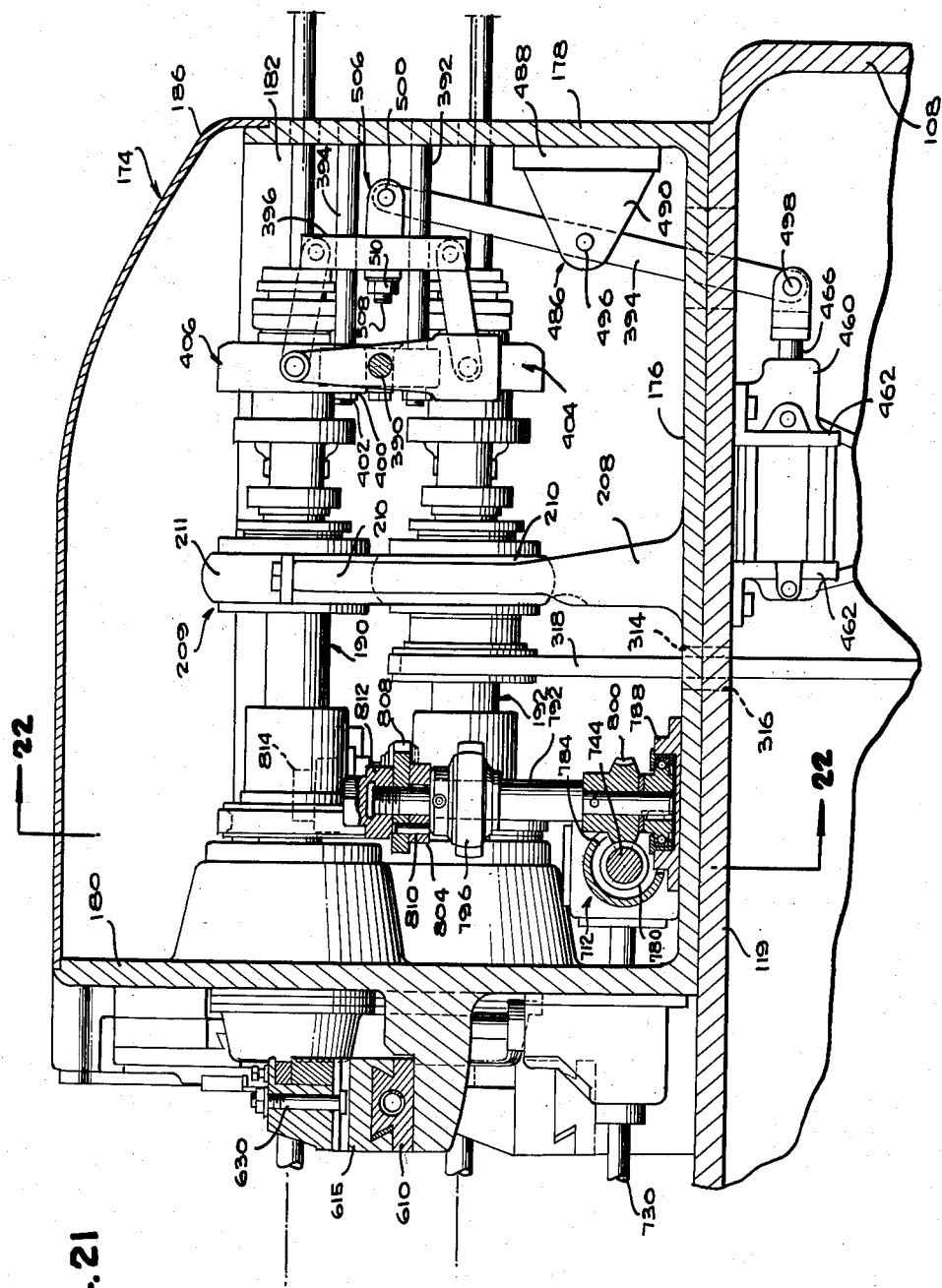

Jan. 7, 1964  J. BONER  3,116,537
MULTIPLE TURRET LATHE
Filed Sept. 15, 1960  25 Sheets-Sheet 11

INVENTOR.
JOHANN BONER
BY
McMorrow, Berman & Davidson
ATTORNEYS

INVENTOR.
JOHANN BONER
BY
McMorrow, Berman & Davidson
ATTORNEYS

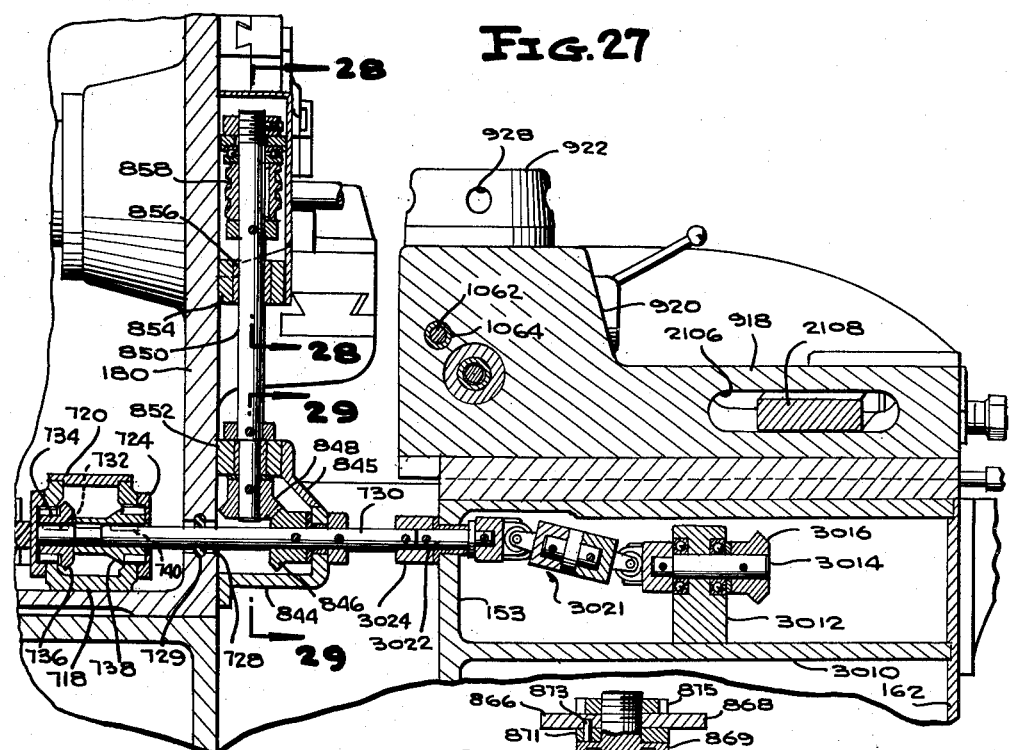
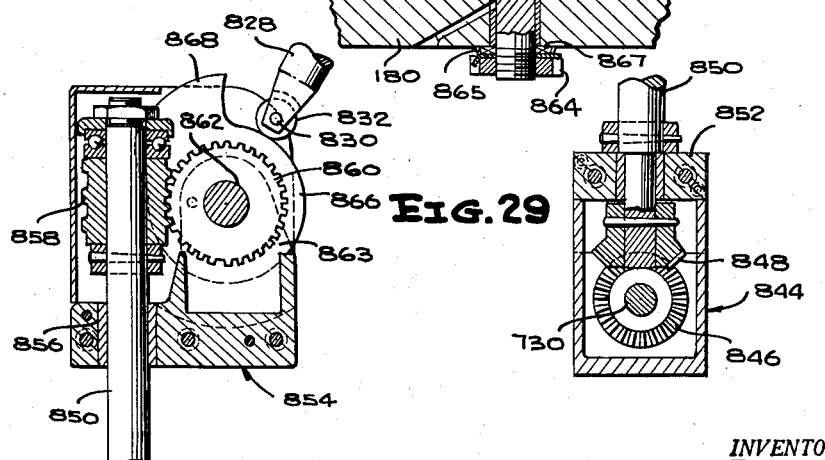

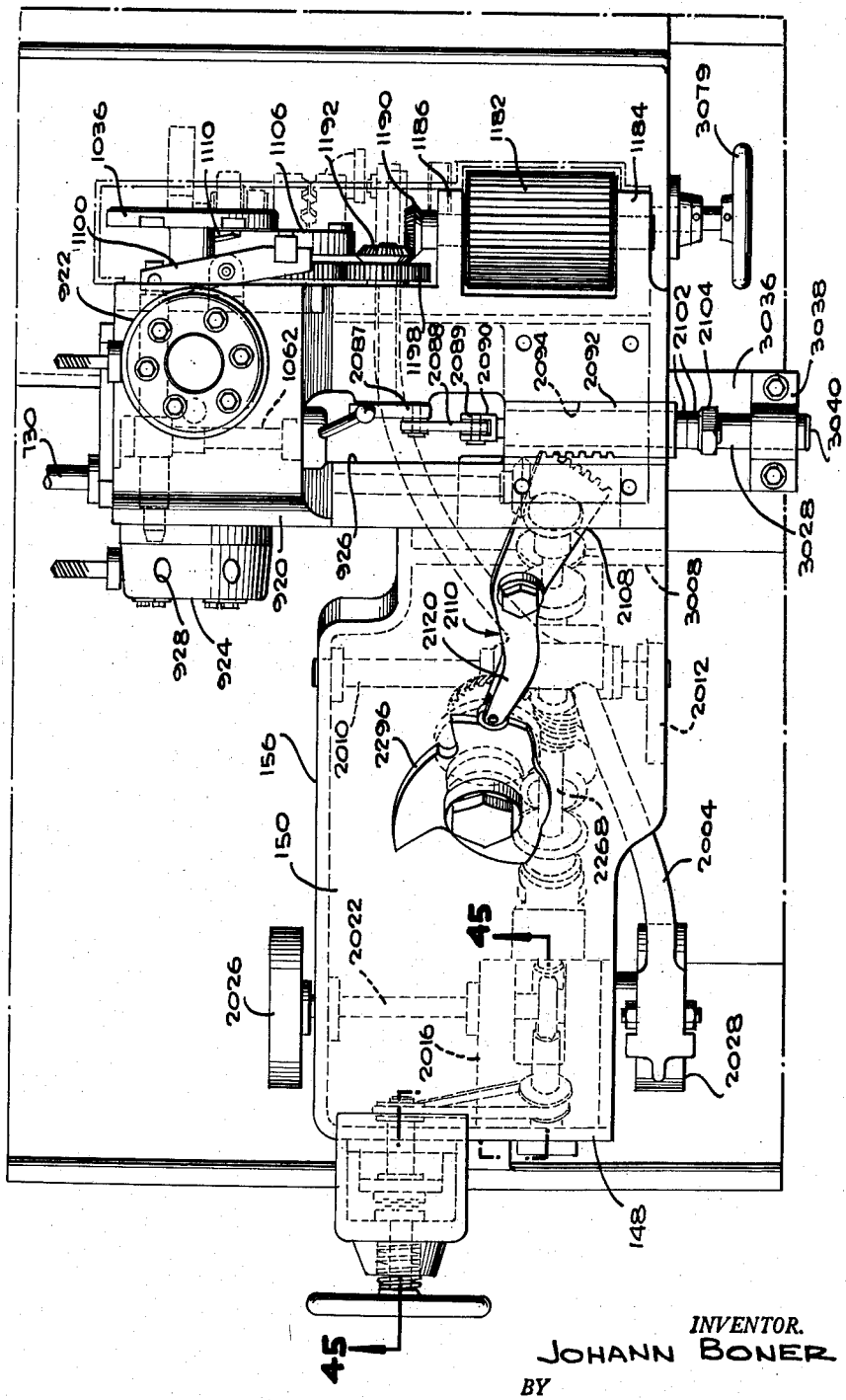

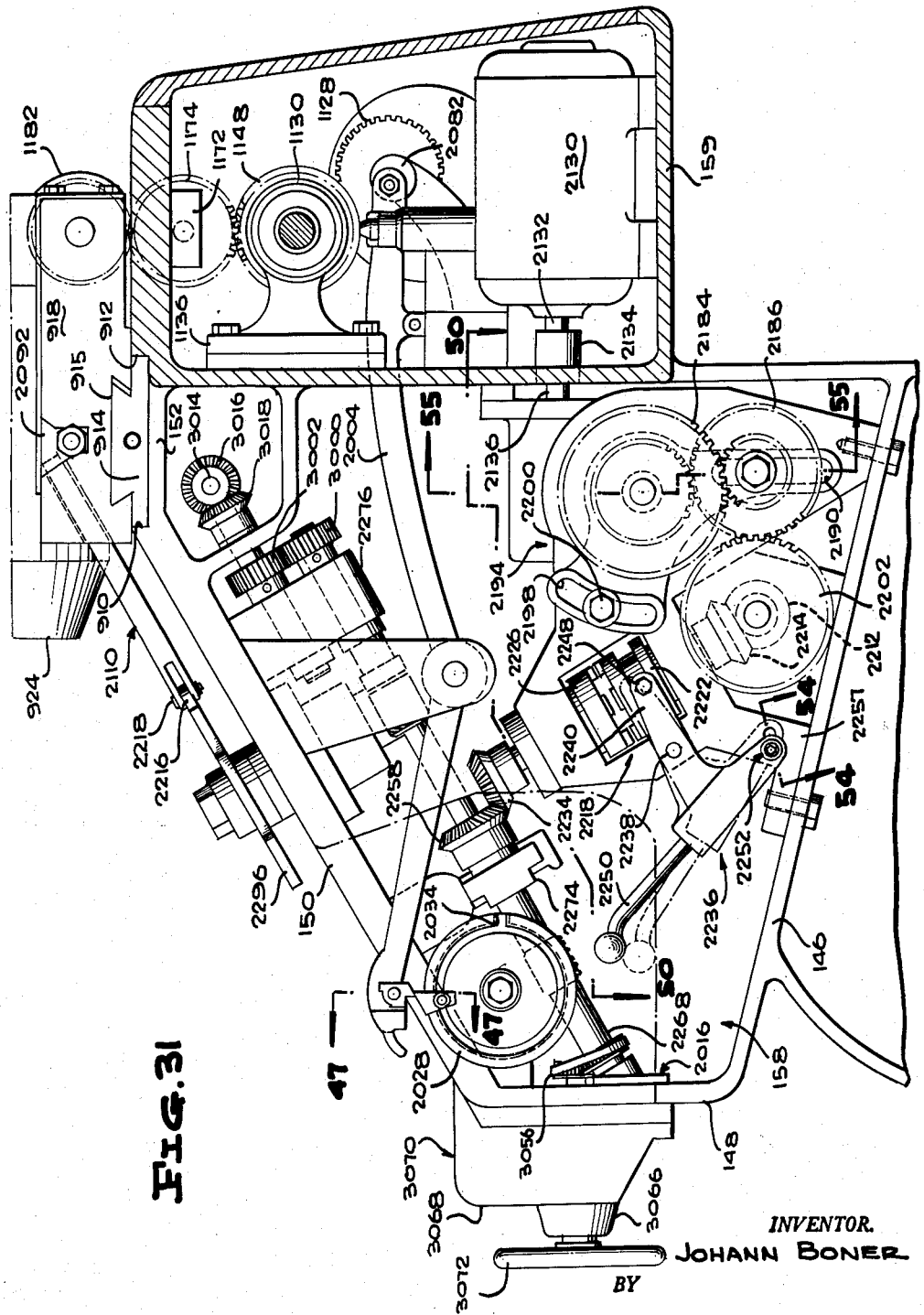

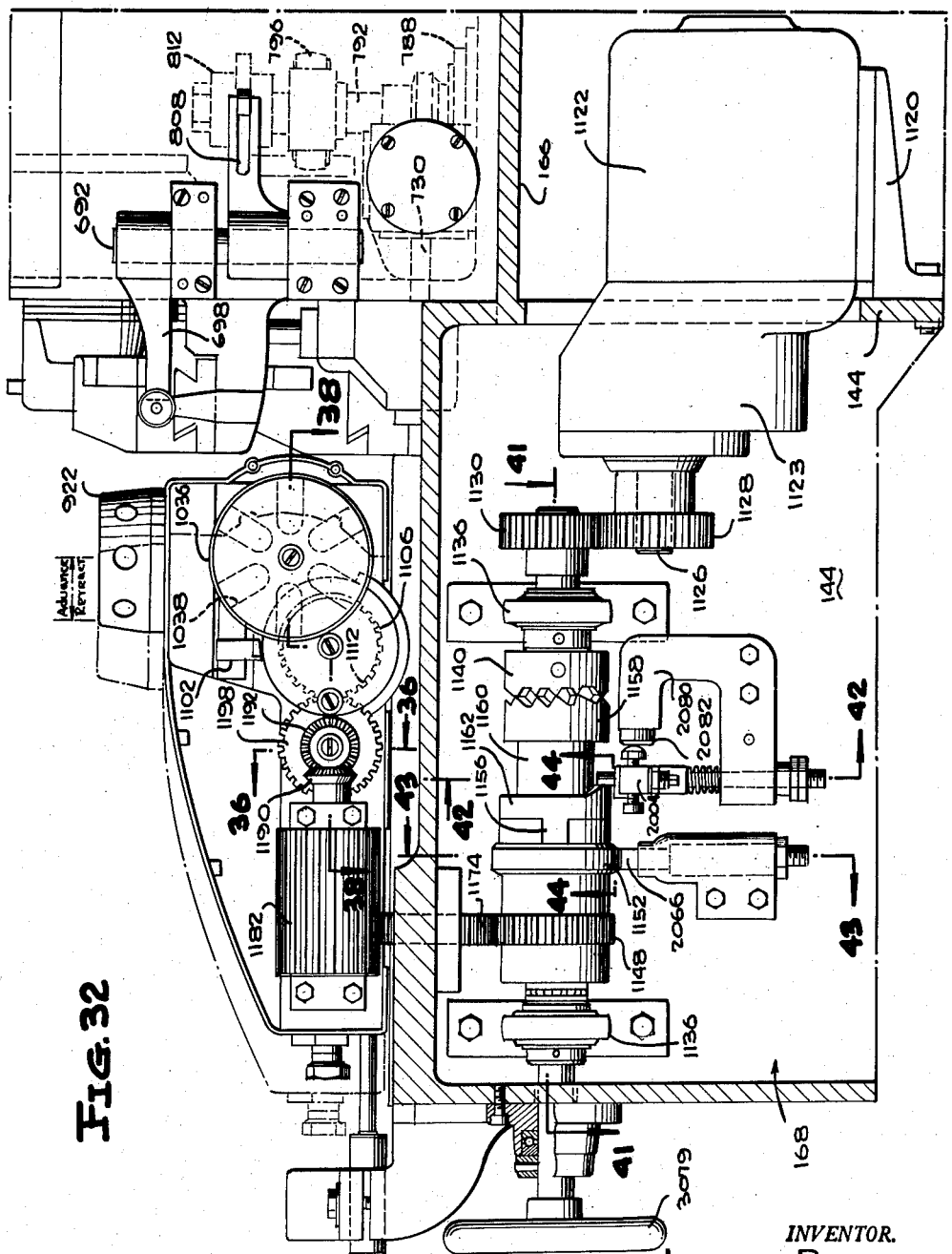

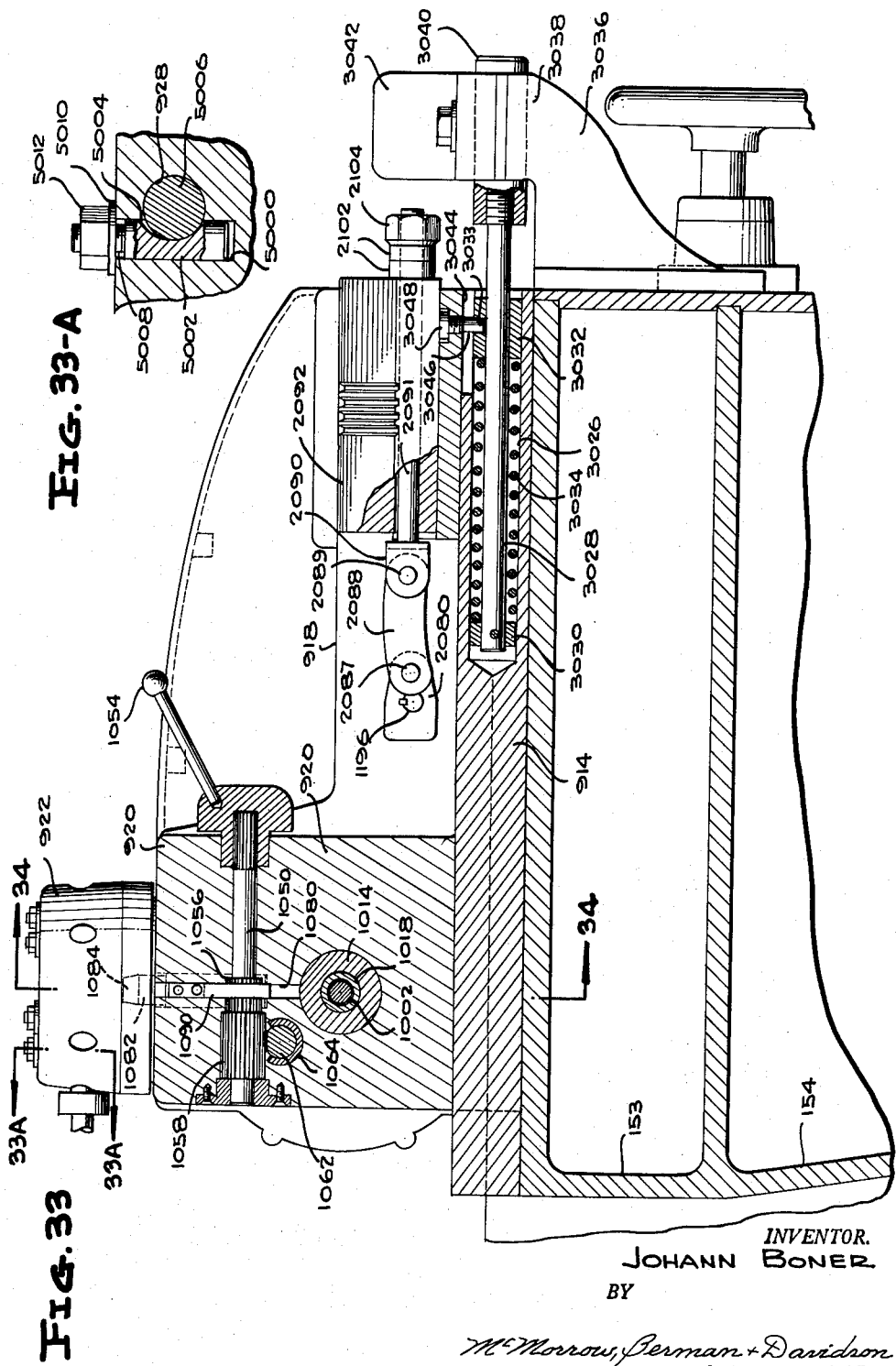

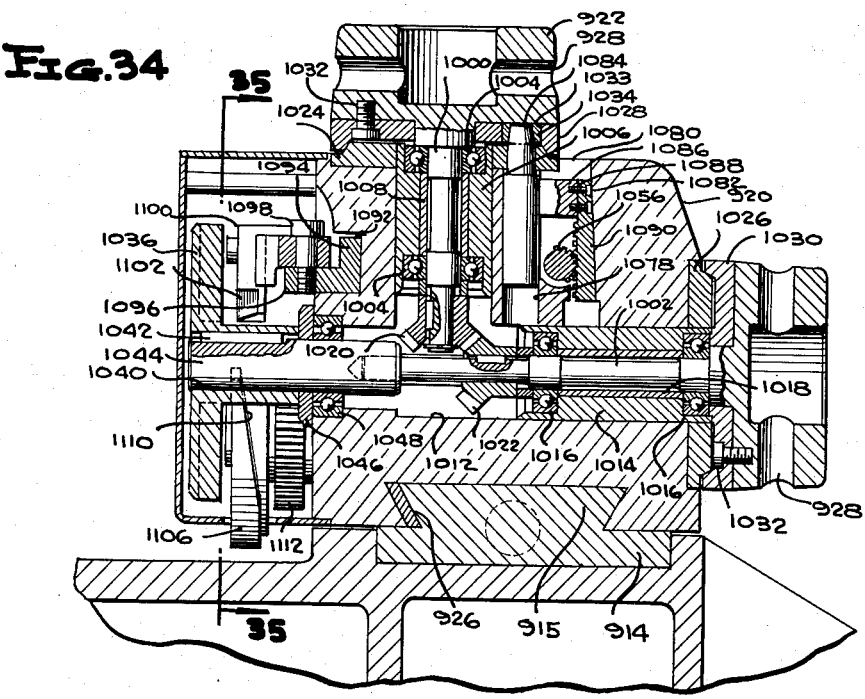
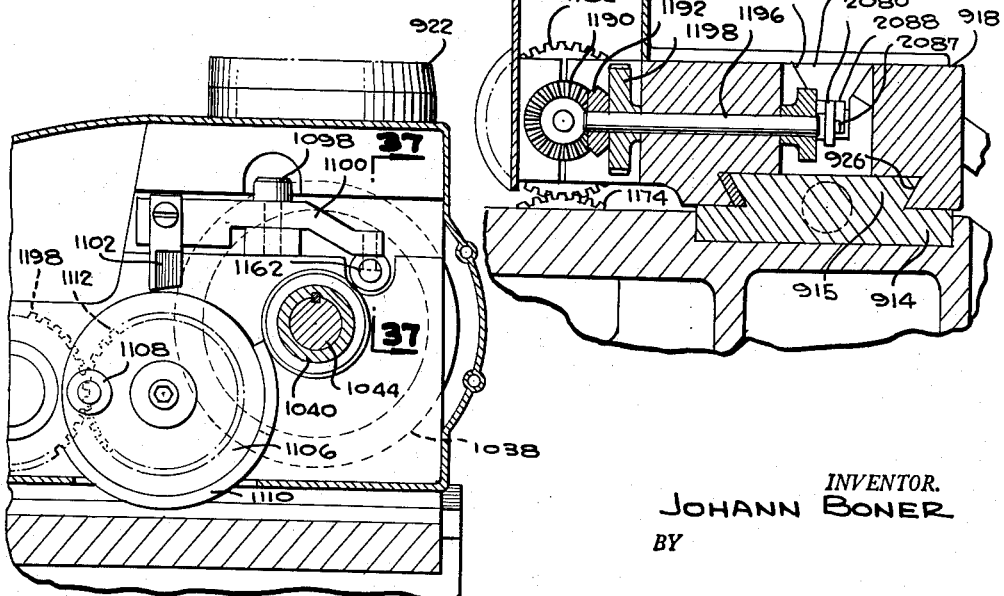

Jan. 7, 1964  J. BONER  3,116,537
MULTIPLE TURRET LATHE
Filed Sept. 15, 1960  25 Sheets-Sheet 19
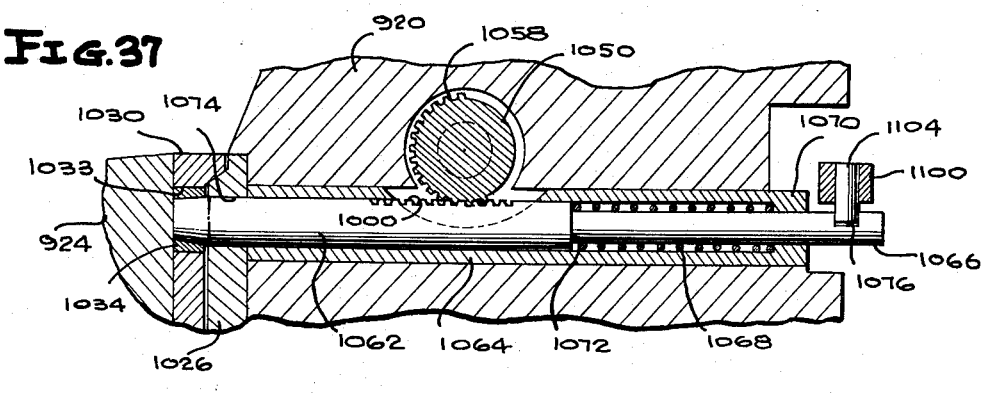
FIG. 37
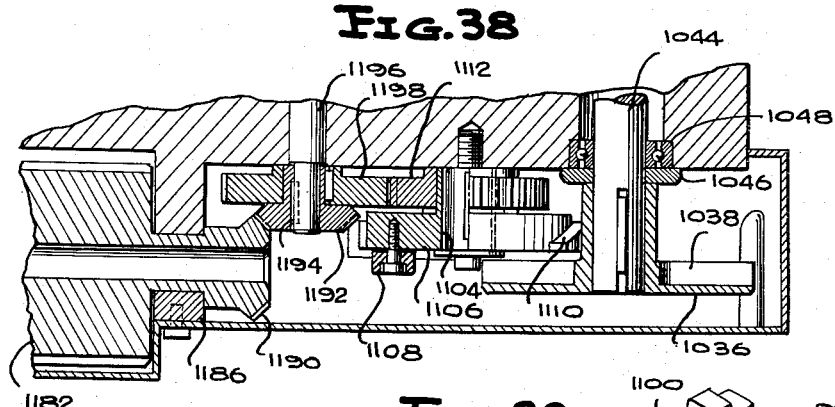
FIG. 38
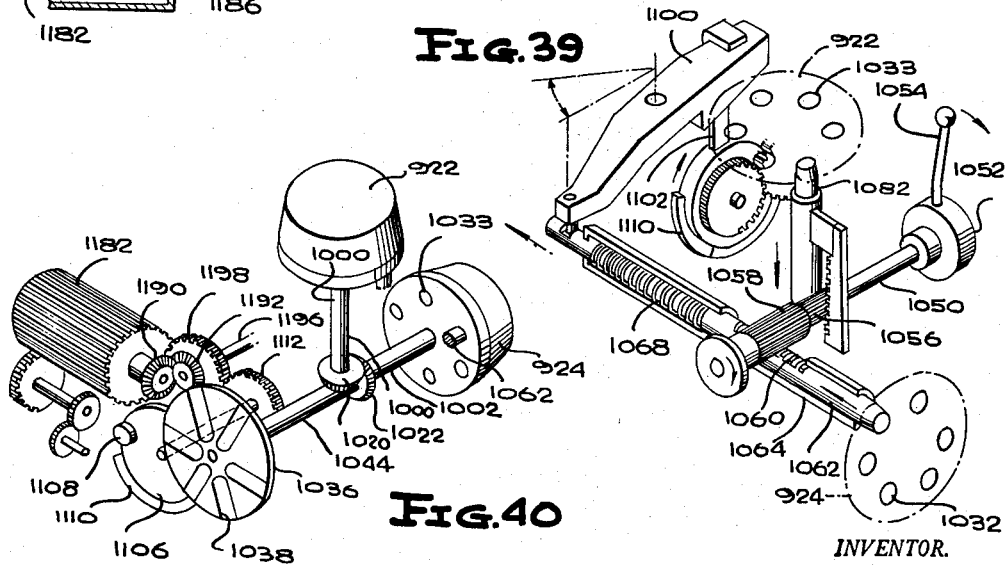
FIG. 39
FIG. 40
INVENTOR.
JOHANN BONER
BY
McMorrow, Berman & Davidson
ATTORNEYS Jan. 7, 1964  J. BONER  3,116,537
MULTIPLE TURRET LATHE
Filed Sept. 15, 1960  25 Sheets-Sheet 20

INVENTOR.
JOHANN BONER
BY
McMorrow, Berman & Davidson
ATTORNEYS

Jan. 7, 1964   J. BONER   3,116,537
MULTIPLE TURRET LATHE
Filed Sept. 15, 1960   25 Sheets-Sheet 21
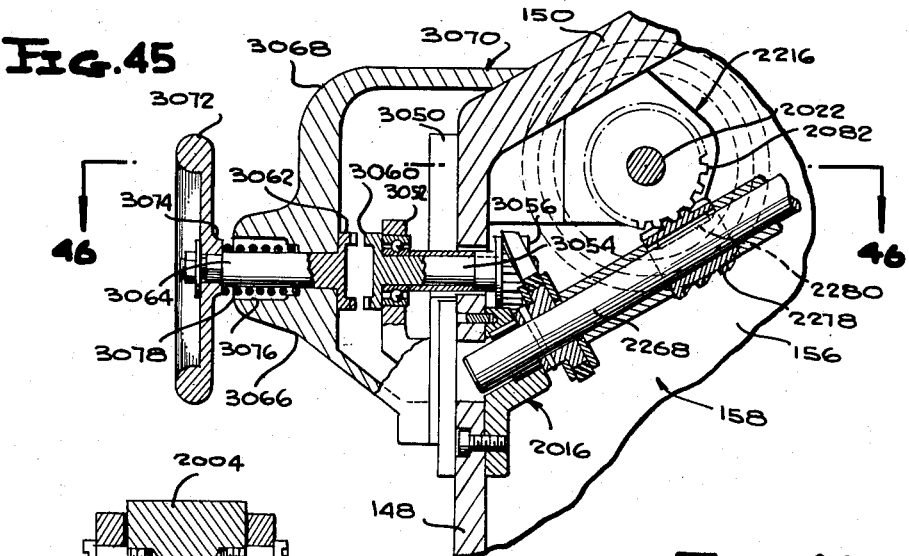
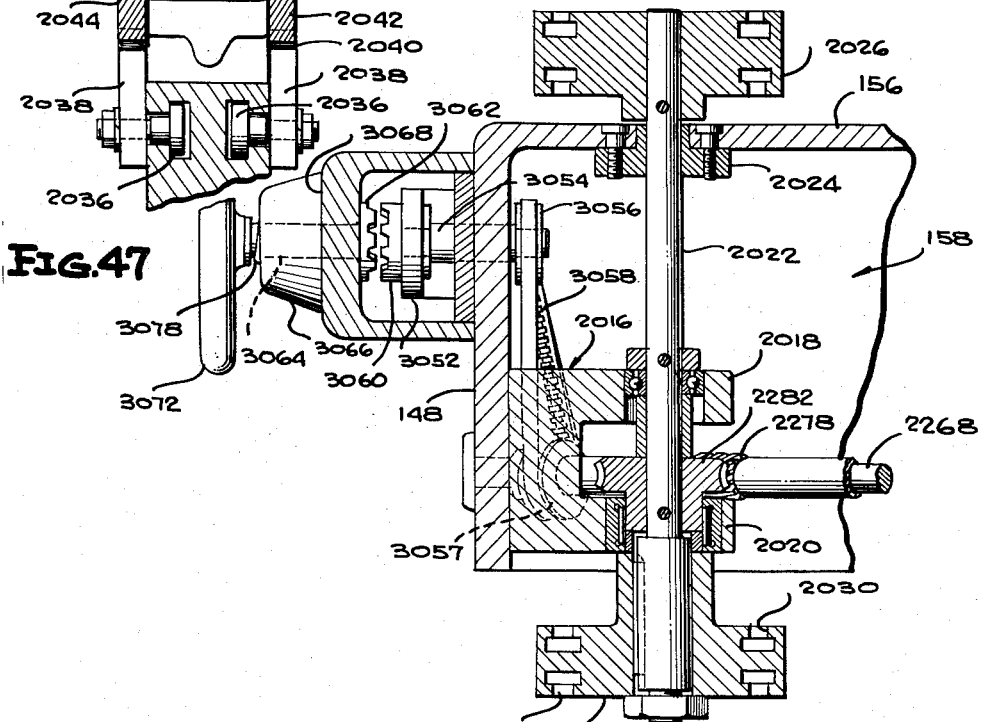
INVENTOR.
JOHANN BONER
BY
McMorrow, Berman & Davidson
ATTORNEYS

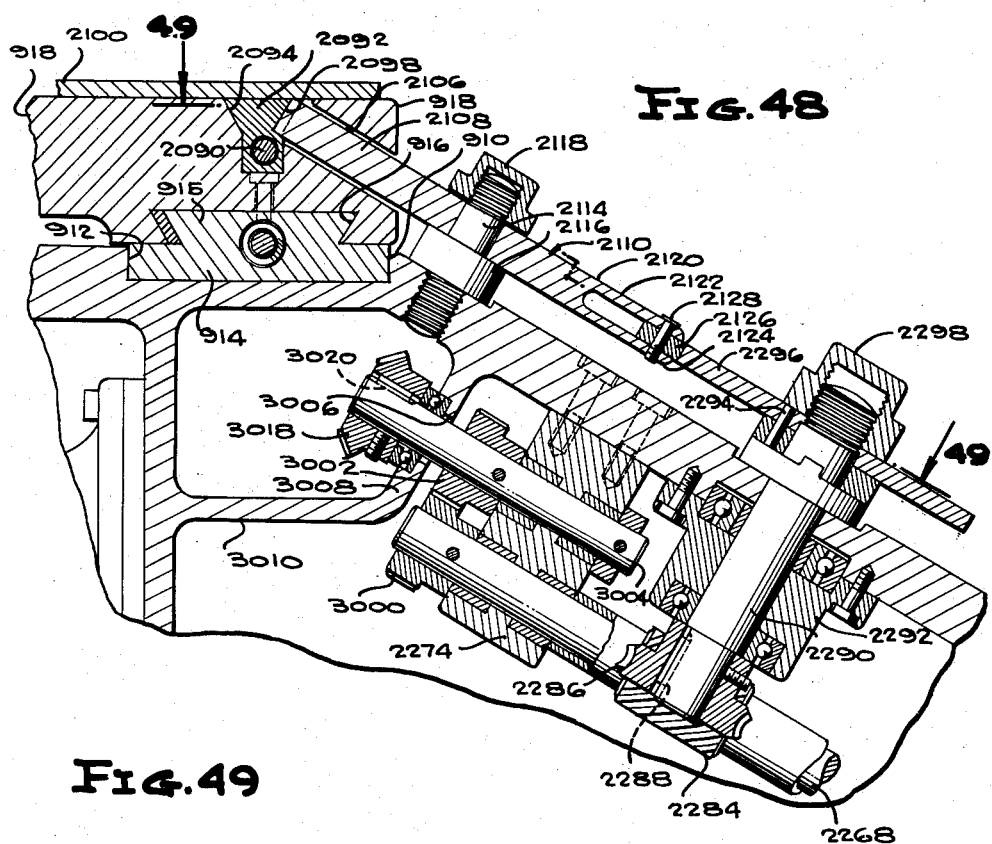
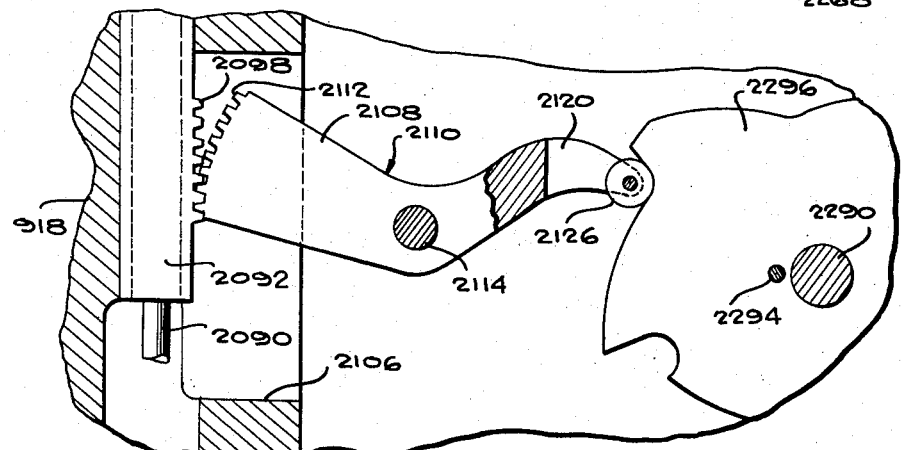

INVENTOR.
JOHANN BONER

Jan. 7, 1964   J. BONER   3,116,537
MULTIPLE TURRET LATHE
Filed Sept. 15, 1960   25 Sheets-Sheet 24
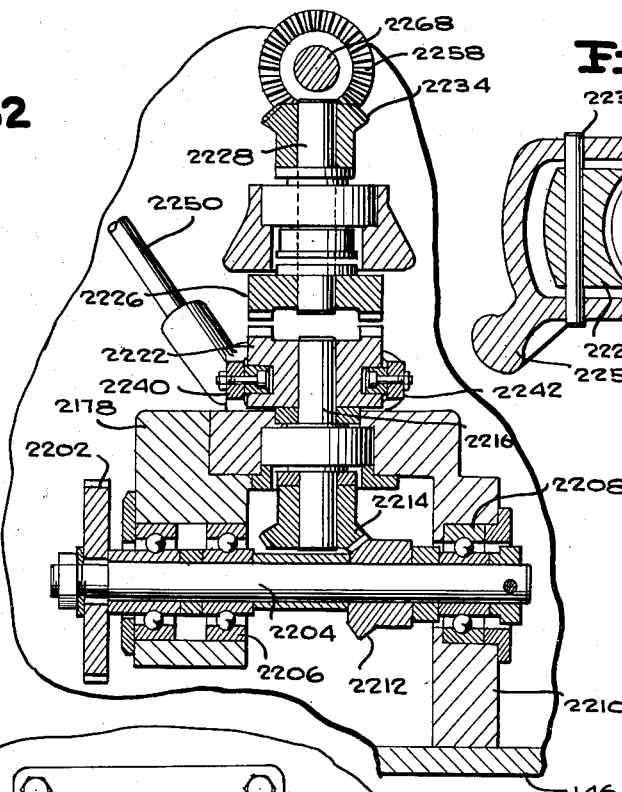
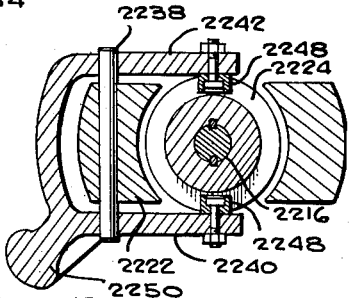
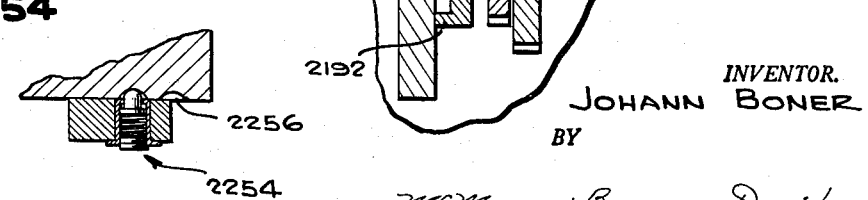
INVENTOR.
JOHANN BONER
BY
McMorrow, Berman & Davidson
ATTORNEYS Jan. 7, 1964 J. BONER 3,116,537
MULTIPLE TURRET LATHE
Filed Sept. 15, 1960 25 Sheets-Sheet 25

INVENTOR.
JOHANN BONER
BY
McMorrow, Berman & Davidson
ATTORNEYS

United States Patent Office 3,116,537
Patented Jan. 7, 1964

3,116,537
MULTIPLE TURRET LATHE
Johann Boner, Vesenaz, Geneva, Switzerland, assignor, by mesne assignments, to Anstalt Decotex, Vaduz, Liechtenstein
Filed Sept. 15, 1960, Ser. No. 56,166
28 Claims. (Cl. 29—44)

This invention relates to automatically controlled machines and, more specifically, the instant invention pertains to a machine of the lathe type, the machine being provided with a plurality of turrets.

One of the primary objects of this invention is to provide a twin spindle automatic lathe carrying work pieces adapted to be operated upon by means of tools carried in a pair of twin turrets slidably mounted for reciprocation toward and away from the work pieces.

Another object of this invention is to provide a twin spindle, twin turret lathe wherein the axes of rotation of the turrets are disposed at 90 degrees with respect to each other.

A further object of this invention resides in the provision of synchronized means for simultaneously indexing both turrets of the twin turret lathe.

As still another object of this invention, it is proposed to provide positive locking means to lock the twin turrets in pre-selected indexing positions, and to provide cam-operated means to effect an unlocking of the turrets from their indexed positions.

A still further object of this invention is to provide a turret lathe slide suitably mounted for reciprocable movement across a base, the turret slide having mounted thereon a pair of turrets with the axes thereof located at right angles with respect to each other.

Still another object of this invention is to provide in a twin spindle, twin turret lathe, means whereby the turrets may be equipped with separate sets of tools in order to manufacture two entirely different elements in the same or in a different turret cam cycle.

Still another object of this invention resides in the provision of means for disconnecting the cycle-time gearing from the back shaft whereby the latter may be hand-driven so that the machine may be properly set up by hand in order that tool clearances may be closely observed while the tripping of the turret indexing means is still possible.

Another object of this invention is to provide a two-speed motor for driving the back shaft for indexing purposes so that for a specific job, two different indexing times could be obtained during one rotation of the turret slide operating cam.

Still another object of this invention is to provide a single cam operated device for effecting oblique cut-offs of the work after the tool operations have been completed.

This invention has, as a further object thereof, the provision of a turret lathe having two work-holding spindles rotatably supported in bearings carried by the turret lathe headstock, the spindles being so constructed as to permit quick disassembly of each spindle without dismantling its respective associated bearing or bearings.

It is still another object of this invention to provide means for driving a pair of work-holding spindles of a lathe having a pair of turrets, the driving means rotating both of the spindles at the same or at substantially identical speeds.

This invention also proposes to provide the provision of pneumatic collet closing devices for the two work-holding spindles, the collet closing action being simultaneously operable from a single electro-magnetically operated valve air cylinder.

This invention contemplates, as a still further object thereof, the provision of a twin turret lathe of the type generally referred to above, the lathe, insofar as analogous machines are concerned, being relatively non-complex in construction and assembly, inexpensive to manufacture and maintain, and durable in use.

Other and further objects and advantages of the instant invention will become more evident from a consideration of the following specification when read in conjunction with the annexed drawings, in which:

FIGURE 4 is a diagrammatic representation of the component elements of the instant invention illustrating their relative association with one another and their respective driving connections;

Figure 1:
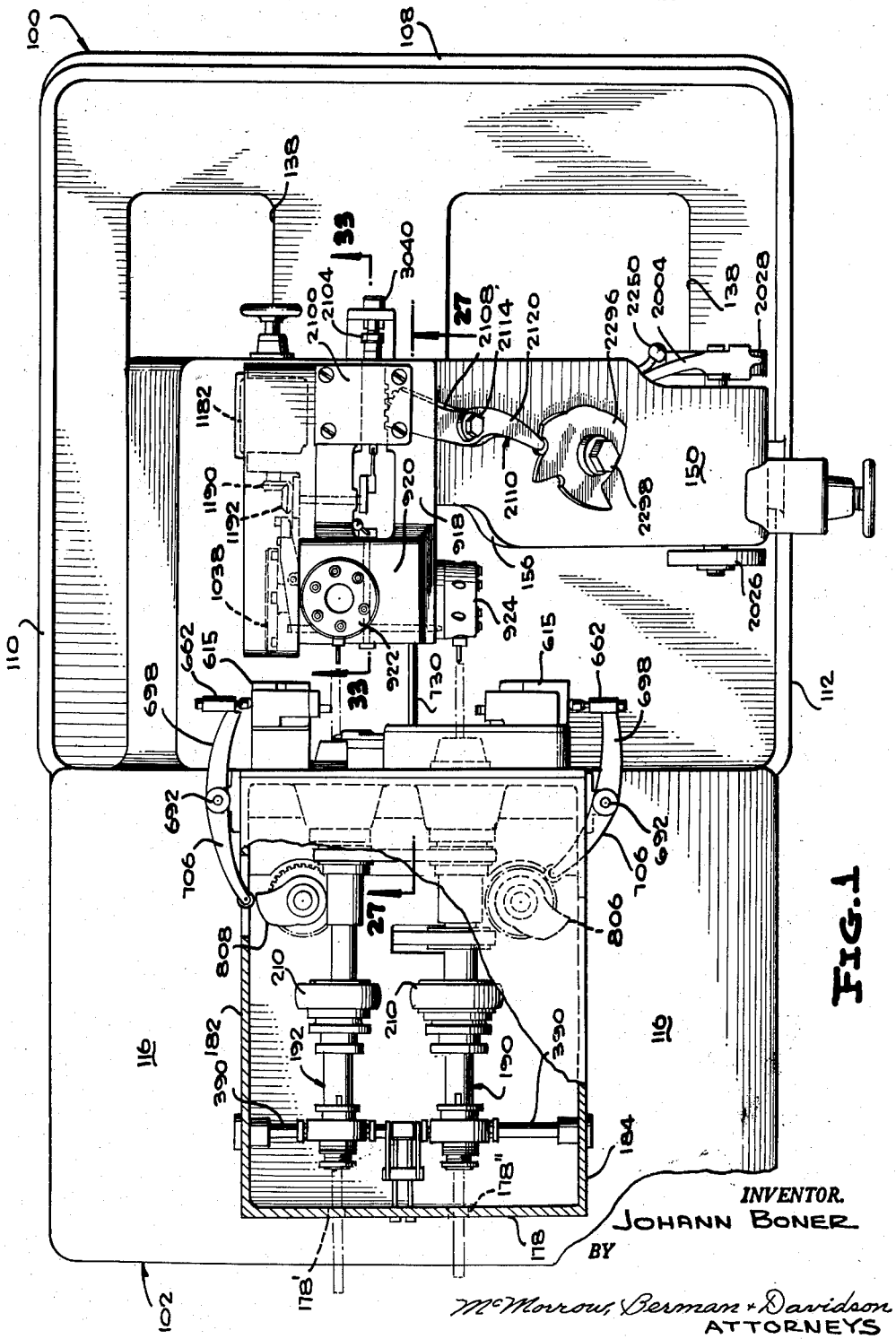
FIGURE 1 is a top plan view of a multiple turret lathe, portions of the housings thereof being broken away, and constructed in accordance with this invention.
Figure 2:
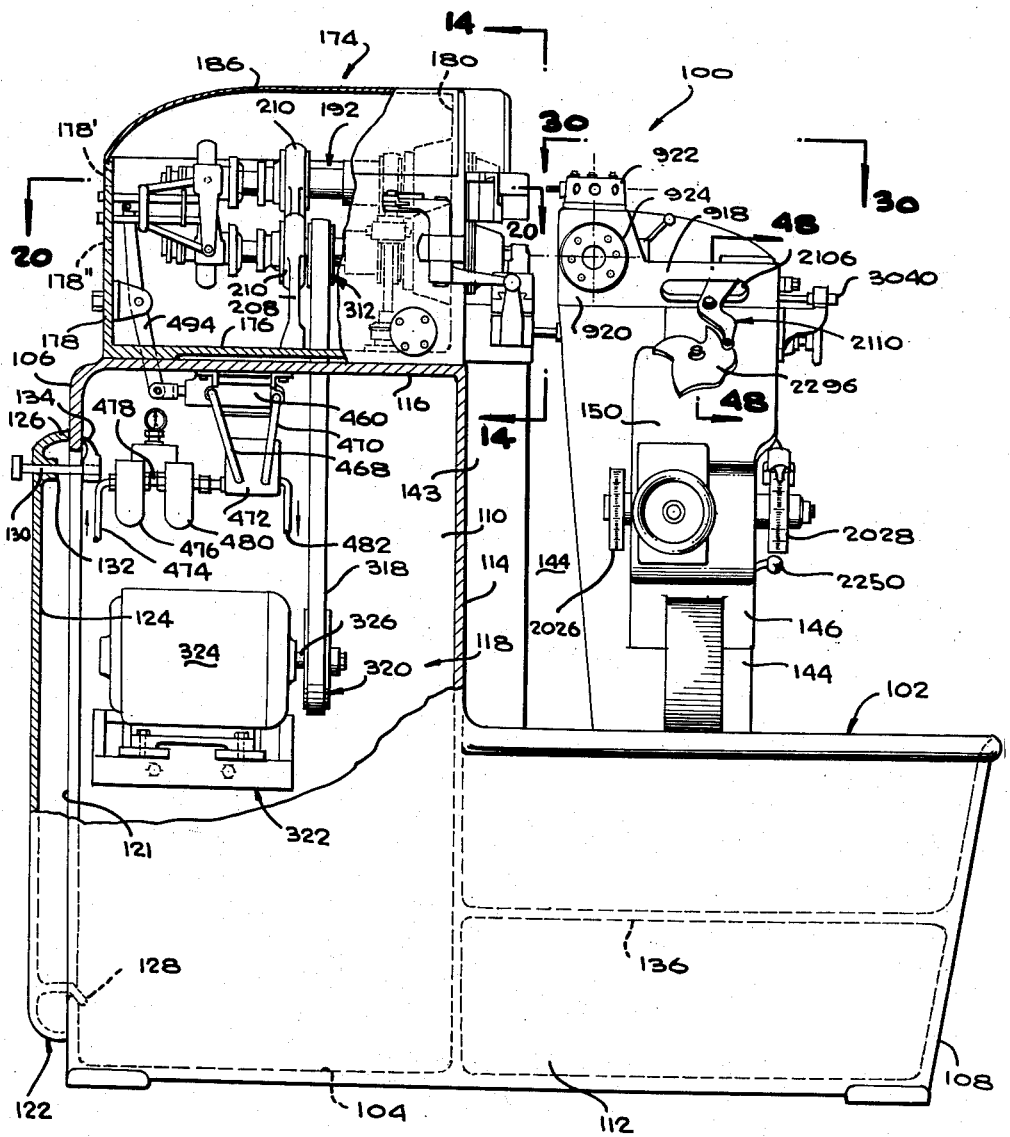
FIGURE 2 is a side elevational view of the twin turret lathe illustrated in FIGURE 1, portions of the housings again be broken away to illustrate the arrangement and disposition of certain elements of this invention.
Figure 3:
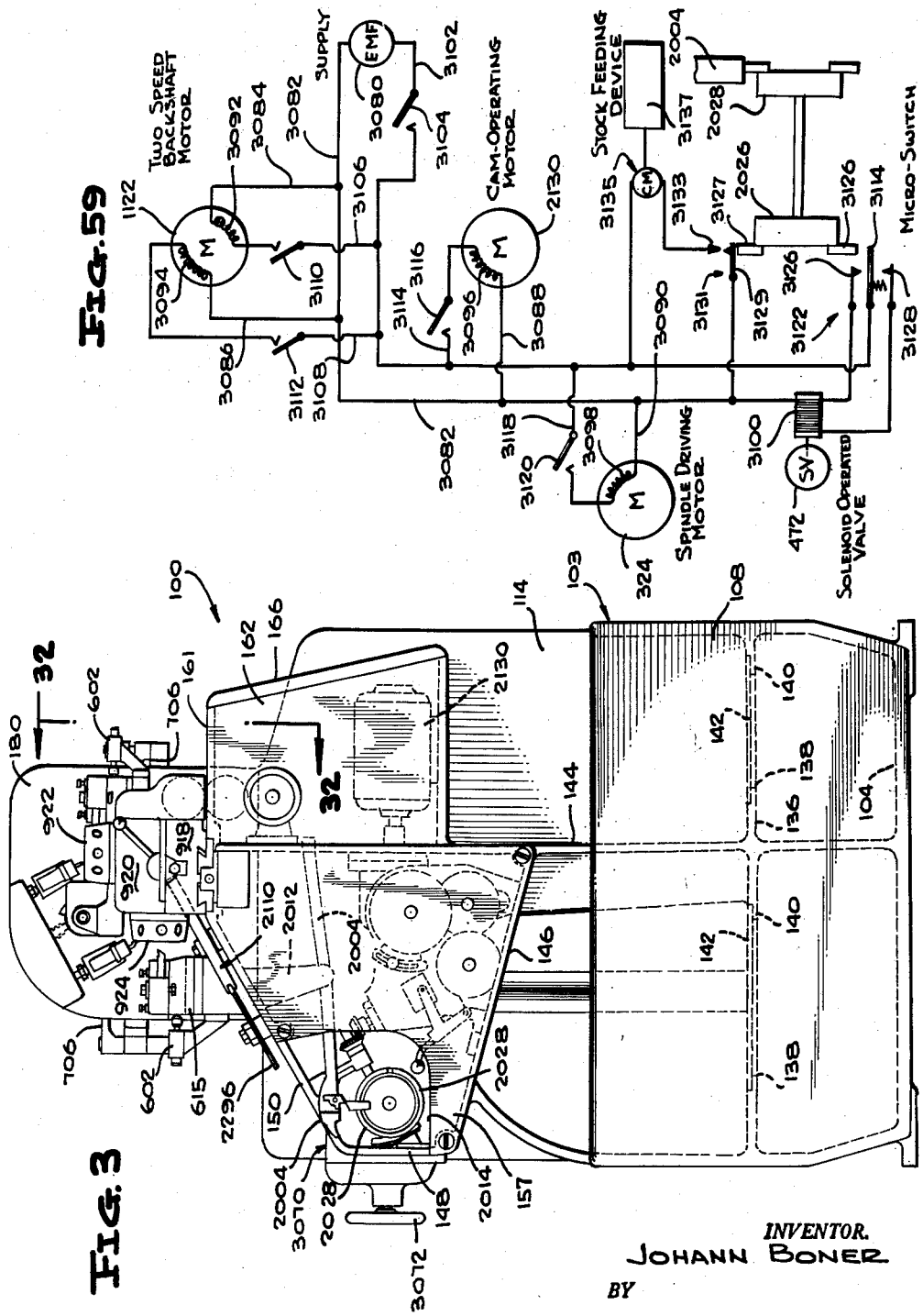
FIGURE 3 is an end elevational view of the twin turret lathe shown in FIGURE 1.
Figure 22:
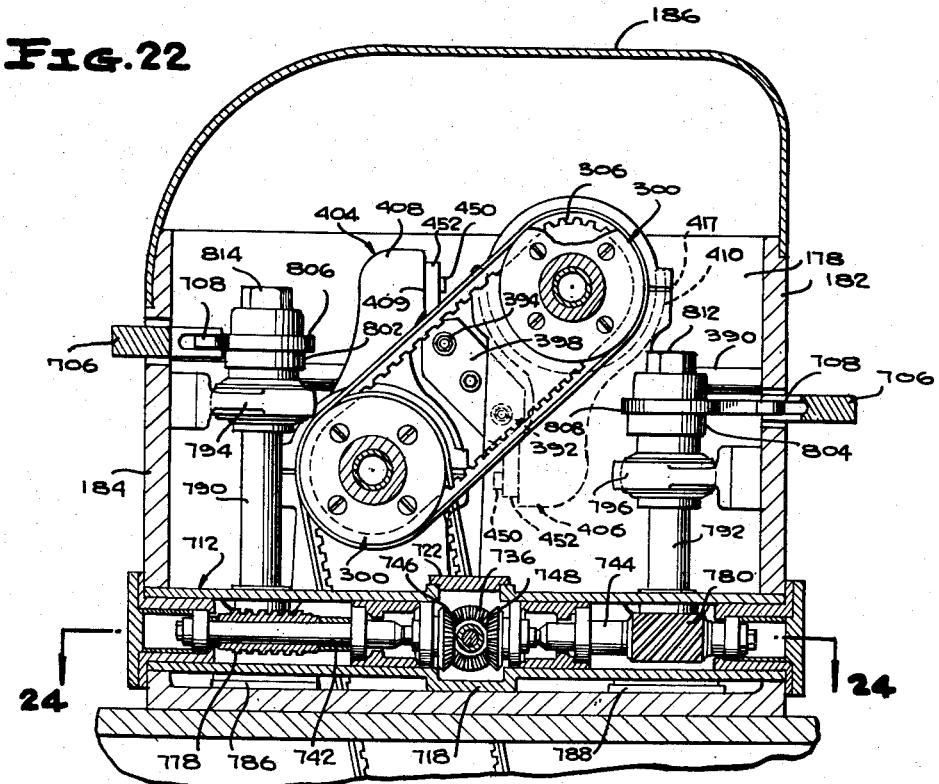
Figure 23:
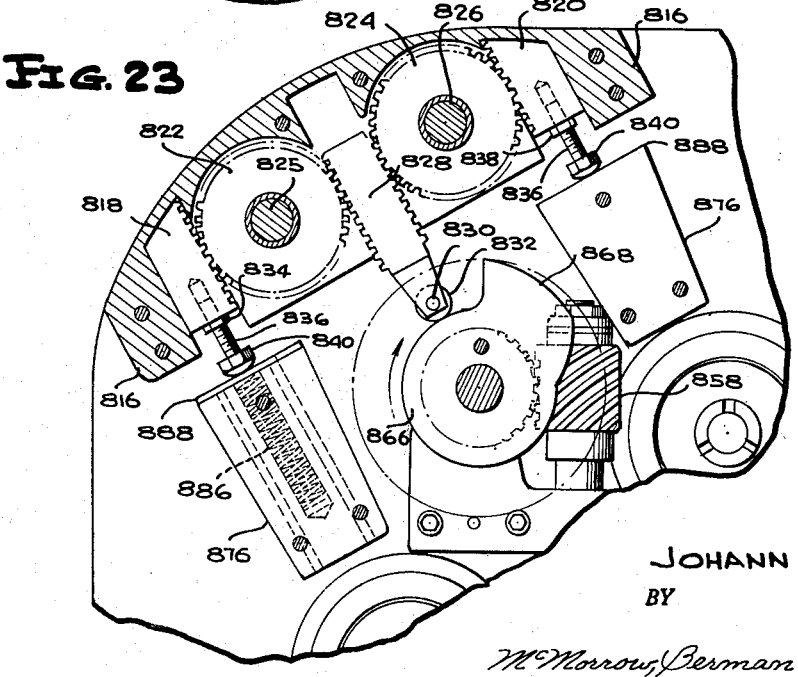
Figure 24:
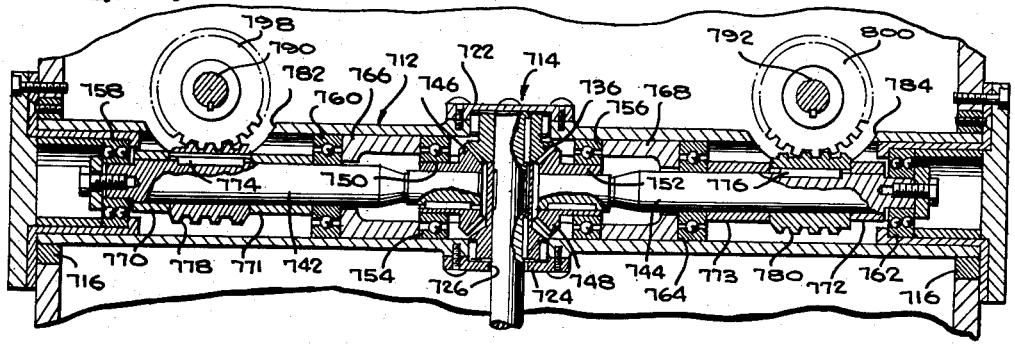
Figure 25:
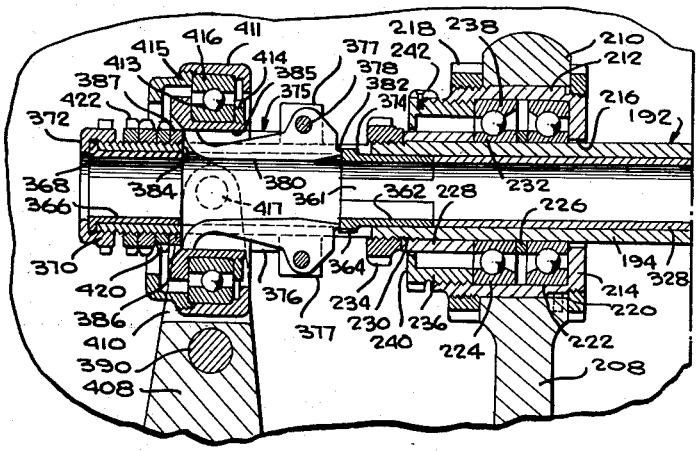
Figure 26:
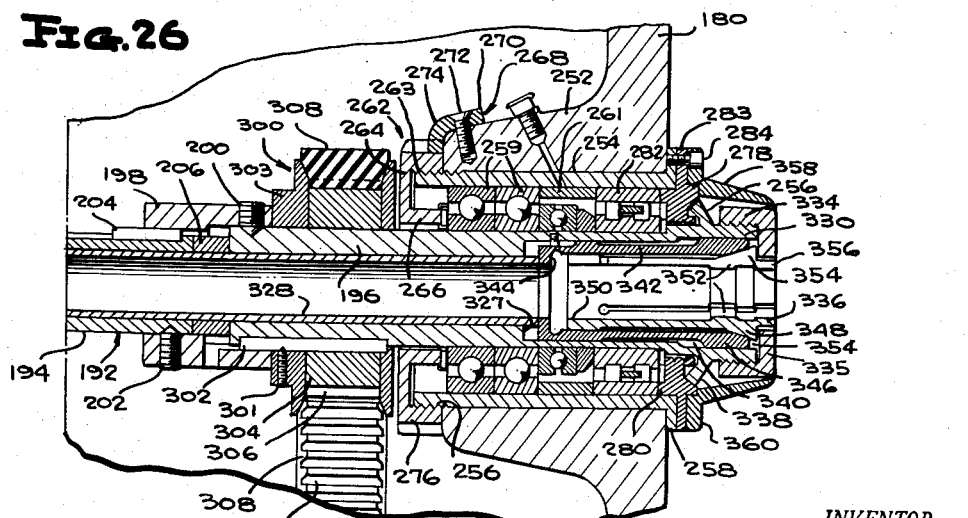
Figure 41:
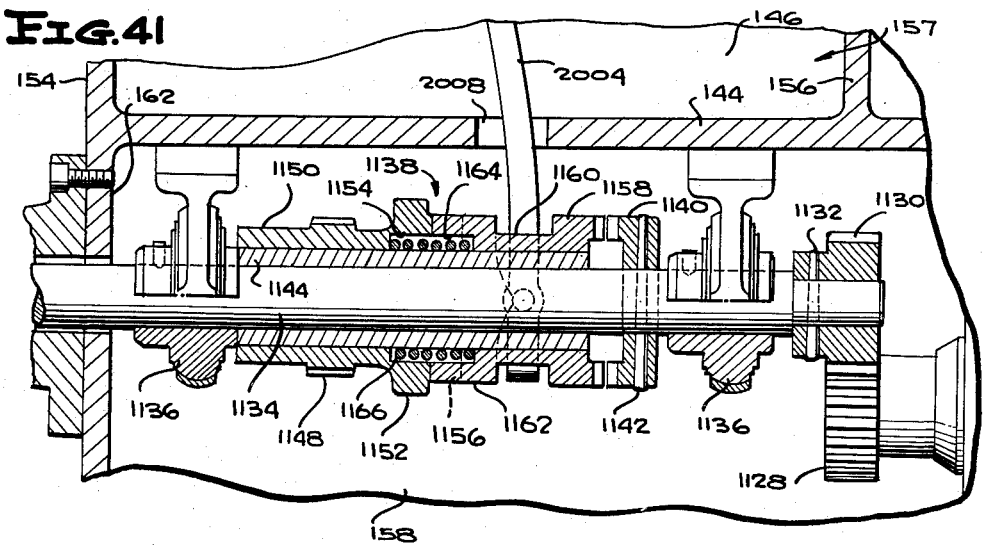
Figure 42:
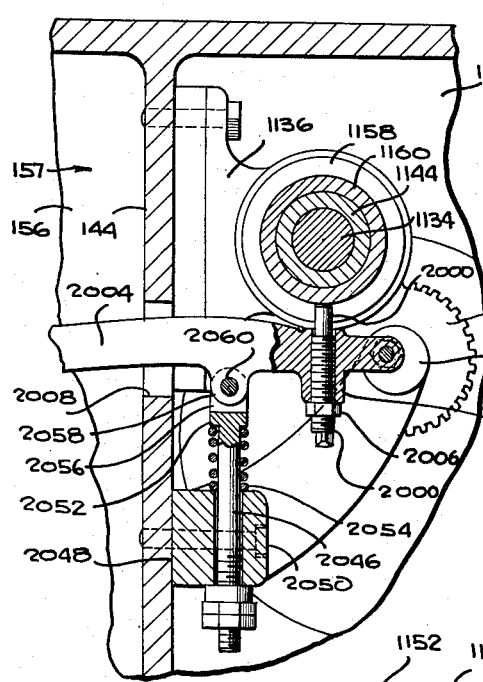
Figure 43:
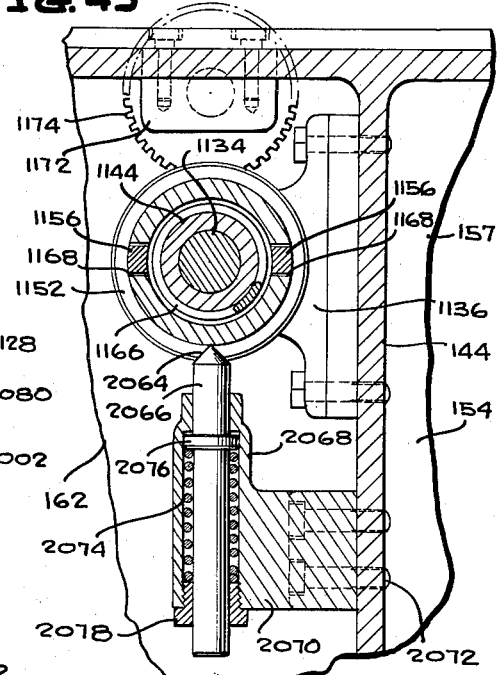
Figure 44:
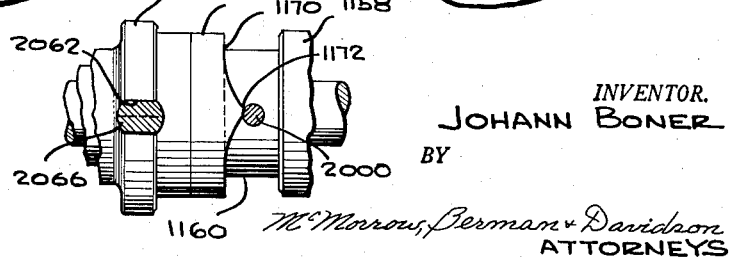
Figure 50:
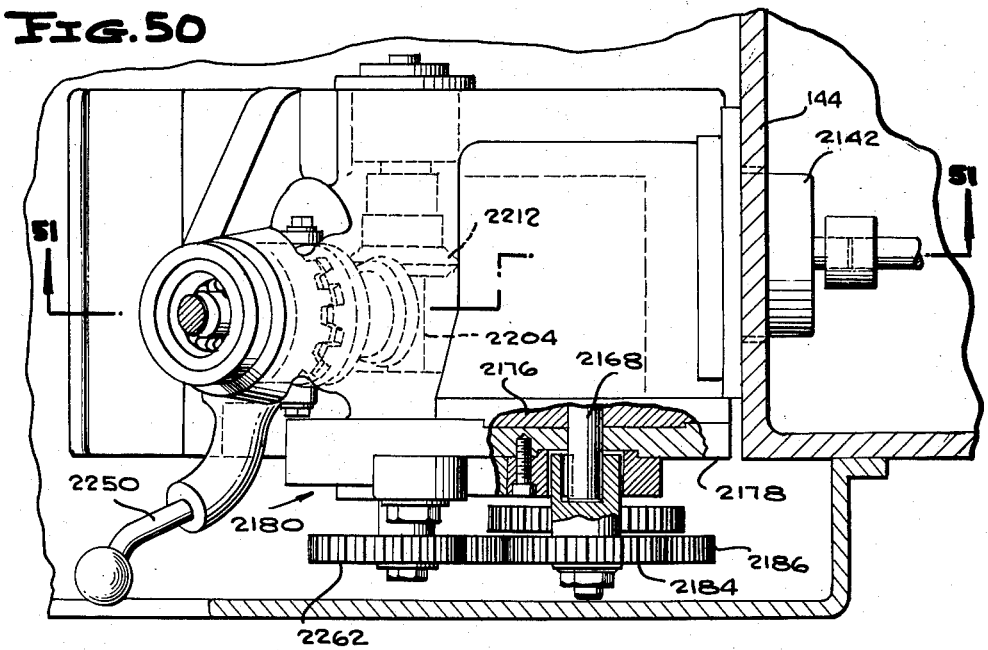
Figure 51:
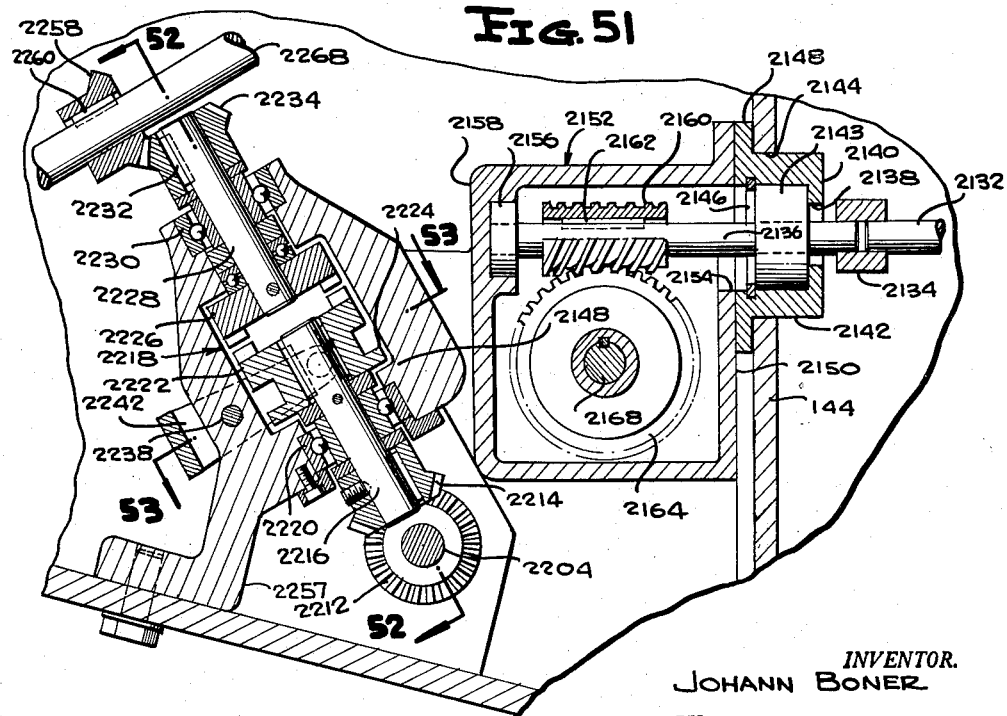
Figure 56:
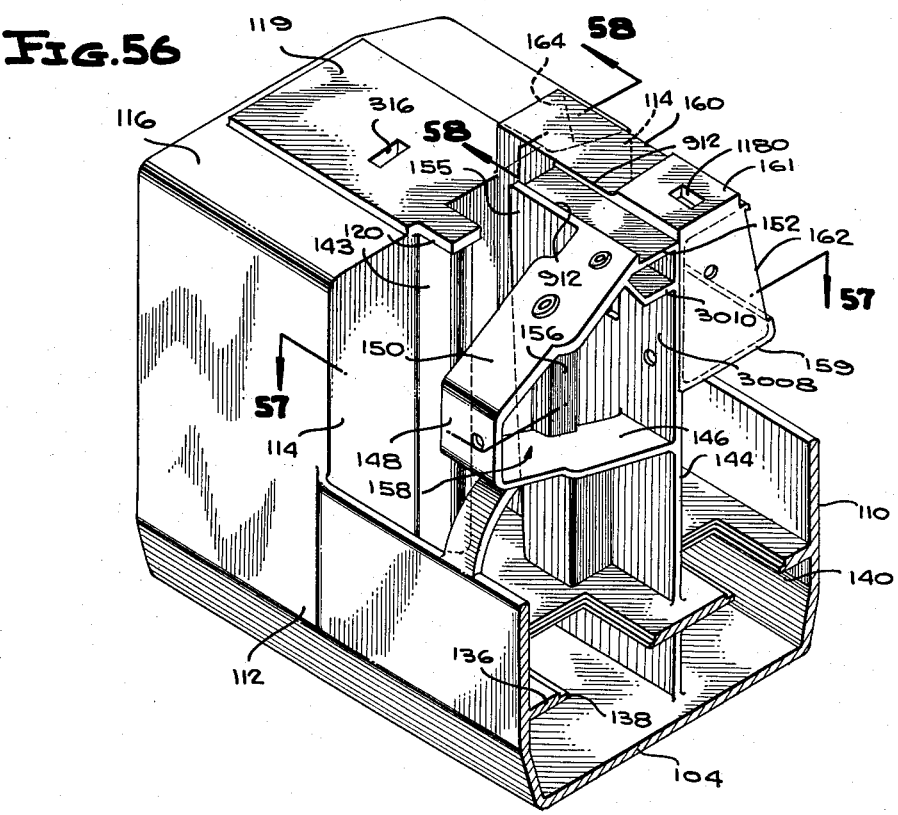
Figure 57:
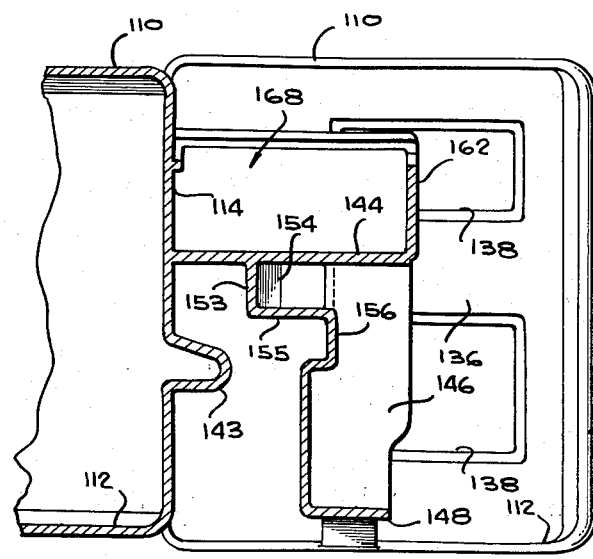
Figure 58:
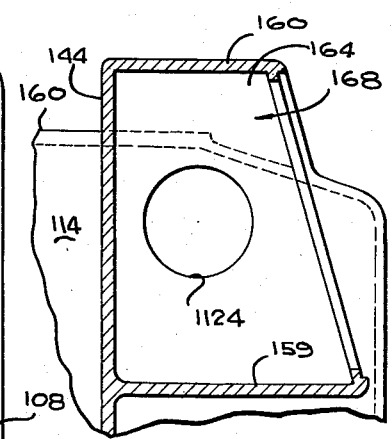

FIGURES 5 to 10, inclusive, schematically illustrate several sequential steps for forming two different elements during a complete cycle of rotation of the turrets;

FIGURE 11 is a plan view of the turret indexing cam, illustrating schematically the control time sequence for performing a complete cycle of operation of the twin turrets;

FIGURE 12 is a combined enlarged detail cross-sectional view of each of the elements performed during the operational steps illustrated in FIGURES 5 to 10, inclusive;

FIGURE 13 is an enlarged side elevational view of the elements shown in FIGURE 12, FIGURE 13 illustrating the same in assembled configuration;

FIGURE 14 is an end elevational view of the headstock;

FIGURE 15 is an enlarged detail cross-sectional view of the slide operating means and the slide per se, FIGURE 15 being taken substantially on the line 15—15 of FIGURE 14, looking in the direction of the arrows;

FIGURE 16 is an enlarged detail cross-sectional view of the slide and its operating means, FIGURE 16 being taken substantially upon the horizontal plane of line 16—16 of FIGURE 15;

FIGURE 17 is a detail cross-sectional view of the slide, FIGURE 17 being taken substantially on the vertical plane of line 17—17 of FIGURE 16, looking in the direction of the arrows;

FIGURE 18 is an enlarged detail cross-sectional view of one of the cutoff slides, FIGURE 18 being taken substantially on the inclined plane of line 18—18 of FIGURE 14, looking in the direction of the arrows;

FIGURE 19 is a detail cross-sectional view of one of the cut-off slides, FIGURE 19 being taken substantially on the horizontal plane of line 19—19 of FIGURE 18, looking in the direction of the arrows;

FIGURE 20 is an enlarged top plan view of the headstock, FIGURE 20 being taken substantially on the horizontal plane of line 20—20 of FIGURE 2, looking in the direction of the arrows, and showing the relative association of the two spindles, one of the latter being shown in cross-section;

FIGURE 21 is a side elevational view of the two spindles and elements associated therewith for effecting the operation of the slides, FIGURE 21 being taken substantially on the vertical plane of line 21—21 of FIGURE 14, looking in the direction of the arrows;

FIGURE 22 is a detail cross-sectional view, partly in elevation, FIGURE 22 being taken substantially on the vertical plane of line 22—22 of FIGURE 21, looking in the direction of the arrows;

FIGURE 23 is a front elevational view, partly in cross-section, illustrating the operating means for effecting movement of the lathe cutoff slides;

FIGURE 24 is an enlarged detail cross-sectional view of the driving means for effecting operation of the tool slides;

FIGURE 25 is an enlarged fragmentary detail cross-sectional view through one of the spindles and illustrating the collet operating means, FIGURE 25 being taken substantially on the horizontal plane of line 25—25 of FIGURE 20, looking in the direction of the arrows;

FIGURE 26 is an enlarged detail cross-sectional view through the same spindle referred to in FIGURE 25, FIGURE 26 illustrating the details of the construction of the collet means, FIGURE 26 illustrating the split spindle feature which permits the changing of pulley means without disturbing the bearings;

FIGURE 27 is an enlarged detail cross-sectional view illustrating the universal connection or drive means between the turret standard and the headstock and also including the driving means for the cutoff slides;

FIGURE 28 is an enlarged fragmentary detail cross-sectional view of the operating means for the cutoff slides, FIGURE 28 being taken substantially on the vertical plane of the line 28—28 of FIGURE 27, looking in the direction of the arrows;

FIGURE 28A is an enlarged fragmentary detail cross-sectional view taken substantially on the vertical plane of line 28A—28A of FIGURE 28, looking in the direction of the arrows;

FIGURE 29 is an enlarged fragmentary detail cross-sectional view, FIGURE 29 being taken substantially on the vertical plane of line 29—29 of FIGURE 27, looking in the direction of the arrows;

FIGURE 30 is a top plan view of the turret mechanism, per se;

FIGURE 31 is an end elevational view of the turret operating mechanism, a pair of end plates of the housing therefor being removed to show the relative association between the component elements thereof;

FIGURE 32 is an enlarged side elevational view of the turret operating mechanism, FIGURE 32 being taken substantially on the vertical plane of line 32—32 of FIGURE 3, looking in the direction of the arrows;

FIGURE 33 is an enlarged detail cross-sectional view through the turret slide and associated mechanisms, FIGURE 33 being taken substantially on the horizontal plane of line 33—33 of FIGURE 1, looking in the direction of the arrows;

FIGURE 33A is a fragmentary detail cross-sectional view of the tool securing means for each of the turrets, FIGURE 33A being taken on the line 33A—33A of FIGURE 33;

FIGURE 34 is a detail cross-sectional view through the turrets, FIGURE 34 being taken substantially on the vertical plane of line 34—34 of FIGURE 33, looking in the direction of the arrows;

FIGURE 35 is a fragmentary detail cross-sectional view, FIGURE 35 being taken substantially on the vertical plane of line 35—35 of FIGURE 34, looking in the direction of the arrows;

FIGURE 36 is an enlarged detail cross-sectional view, FIGURE 36 being taken substantially on the vertical plane of line 36—36 of FIGURE 32, looking in the direction of the arrows;

FIGURE 37 is an enlarged detail cross-sectional view taken substantially on the vertical plane of line 37—37 of FIGURE 35, looking in the direction of the arrows;

FIGURE 38 is an enlarged detail cross-sectional view, FIGURE 38 being taken substantially on the horizontal plane of line 38—38 of FIGURE 32, looking in the direction of the arrows;

FIGURE 39 is a diagrammatic representation of the turret locking means;

FIGURE 40 is a diagrammatic representation of the driving means for the turrets together with the indexing Geneva wheel;

FIGURE 41 is an enlarged detail cross-sectional view of the back shaft and its associated elements, FIGURE 41 being taken substantially on the horizontal plane of line 41—41 of FIGURE 32, looking in the direction of the arrows;

FIGURE 42 is an enlarged fragmentary detail cross-sectional view illustrating the construction and mounting of the control arm for the clutch of the back shaft shown in FIGURES 32 and 41, FIGURE 42 being taken substantially on the vertical plane of line 42—42 of FIGURE 32, looking in the direction of the arrows;

FIGURE 43 is a fragmentary detail cross-sectional view, FIGURE 43 being taken substantially on the vertical plane of line 43—43 of FIGURE 32, looking in the direction of the arrows;

FIGURE 44 is an enlarged fragmentary detail bottom elevational view, FIGURE 44 being taken substantially on the horizontal plane of line 44—44 of FIGURE 32, looking in the direction of the arrows;

FIGURE 45 is an enlarged fragmentary detail cross-setcional view illustrating the hand-operated means for controlling the cam shafts;

FIGURE 46 is a fragmentary detail cross-sectional view, FIGURE 46 being taken substantially on the horizontal plane of line 46—46 of FIGURE 45, looking in the direction of the arrows;

FIGURE 47 is a fragmentary detail cross-sectional view of the trip means for the clutching lever for the back shaft;

FIGURE 48 is an enlarged detail cross-sectional view of the turret slide operating cam and associated elements, FIGURE 48 being taken substantially on the vertical plane of line 48—48 of FIGURE 2, looking in the direction of the arrows;

FIGURE 49 is an enlarged fragmentary perspective view of the turret slide cam and operating arm therefor, FIGURE 49 being taken substantially on the line 49—49 of FIGURE 48, looking in the direction of the arrows;

FIGURE 50 is an enlarged top plan view of the turret drive means, FIGURE 50 being taken substantially on the line 50—50 of FIGURE 31, looking in the direction of the arrows;

FIGURE 51 is an enlarged detail cross-sectional view of the driving means and clutch therefor, FIGURE 51 being taken substantially on the line 51—51 of FIGURE 50, looking in the direction of the arrows;

FIGURE 52 is an enlarged detail cross-sectional view, FIGURE 52 being taken substantially on the inclined plane of line 52—52 of FIGURE 51, looking in the direction of the arrows;

FIGURE 53 is an enlarged detail cross-sectional view illustrating details of the clutching means shown in FIGURE 51, FIGURE 53 being taken substantially on the inclined plane of line 53—53 of FIGURE 51, looking in the direction of the arrows;

FIGURE 54 is an enlarged fragmentary detail cross-sectional view of the means utilized in holding the clutch for the gear change unit in engaged or disengaged relation relative to the apparatus driven thereby;

FIGURE 55 is an enlarged detail cross-sectional view through a portion of the gear train, FIGURE 55 being taken substantially on the line 55—55 of FIGURE 31, looking in the direction of the arrows;

FIGURE 56 is a perspective view, partially cut-away, of the lathe bed, the mechanical elements of the lathe having been omitted for the purpose of clarification;

FIGURE 57 is a fragmentary detail cross-sectional view of the lathe bed, FIGURE 57 being taken substantially on the line 57—57 of FIGURE 56;

FIGURE 58 is a fragmentary detail cross-sectional view taken substantially on the vertical plane of line 58—58 of FIGURE 56, looking in the direction of the arrows; and FIGURE 59 is a schematic wiring diagram for use in energizing the several electrical components of this invention.

Referring now more specifically to the drawings, reference numeral 100 (see FIGURES 1, 2 and 3) designates, in general, a twin turret-twin spindle lathe constructed in accordance with the teachings of this invention, and to facilitate the understanding of the construction of the machine and the function of the component elements thereof, basic sections and structures have been broken down below under separate captions, and to that end, the specification will first deal with the details of the bed structure.

The Bed Structure

The bed structure comprises, essentially, an elongated casing 102 which includes a substantially rectangular bottom wall 104 from which arise a pair of oppositely disposed, longitudinally spaced, substantially rectangular end walls 106, 108, a pair of oppositely disposed, laterally spaced, substantially L-shaped side walls 110, 112. Intermediate the end walls 106, 108 and extending between the side walls 110, 112 and integral therewith and the bottom wall 104 is a divider wall 114 having a rectangular configuration, the wall 114 being of substantially the same peripheral dimensions as the end wall 106 and extends parallel thereto. As is seen in FIGURE 2, the end wall 106 and divider wall 114 are perpendicular to the bottom wall 104 with the divider wall longitudinally spaced from the end wall 106 relative to the bottom wall 104. A top wall 116 extends across the upper ends of the end wall 106, the side walls 110, 112, and the divider wall 114 thereby forming a substantially hollow, vertically-elongated substantially rectangular compartment 118. The top wall 116 includes a centrally-thickened, rectangular pad 119 having a rectangular tongue 120 extending beyond the divider wall 114.

To provide access into the compartment 118, the end wall 106 is provided with a transversely-extending opening 121 normally closed by a removable closure member 122 which includes a back plate 124 having a continuous peripheral flange 126 integral therewith and projecting laterally away from one side thereof.

The closure member 122 adjacent the lower end thereof is formed with a laterally-projecting hook member 128 which extends through the opening 121 for engagement over the end wall 106 adjacent the lower end thereof, and at its upper end, the closure member 122 is equipped with a suitable quick-latching device such as, for example, a manually-operable rotatable rod 130 that extends transversely through the back plate 124 and an integrally formed supporting boss 132, the rod 130 having secured at its inner end a latch lever 134 which projects radially away therefrom for releasable engagement against the inner side of the end wall 106 adjacent the upper marginal end of the opening 121.

Referring to FIGURES 2 and 3, it is seen that the bed 102 also includes a substantially horizontal, rectangular reinforcing member 136 that is secured to and is supported on the end wall 108, side walls 110, 112 and the divider wall 114. The reinforcing member 136 is provided with a plurality of openings 138 which extend transversely therethrough and which are rabbeted to form continuous peripheral shoulders 140 which support debris-receiving screens 142. As seen in the above-referred to two figures, the rectangular member 138 projects laterally from the end wall 108 substantially midway between the upper and lower ends thereof.

As is seen in FIGURES 56 and 57, the divider wall 114 is interrupted intermediate its opposed sides by a vertical casing 143 having an ogive configuration and which extends between and is secured at its opposed vertical ends to the reinforcing members 136 and the tongue 120. From FIGURE 57, the casing 143 is seen to open into the compartment 118 through the divider wall 114.

Rising vertically from the bottom wall 104 is a support plate 144 which intersects the reinforcing member 136 and extends thereabove and is integral therewith. The support plate extends toward and is fixedly connected with the divider wall 14.

Integral with the support plate 144 is a substantially rectangular base plate 146 (see FIGURES 2 and 3) which extends upwardly at an acute angle relative to the support plate 144 and terminates at its outer end in a substantially vertical end wall 148. Connected to the upper end of the end wall 148 and upwardly inclined therefrom toward the support plate 144 is a top wall 150 which includes, at its inner end, an inwardly projecting laterally extending top wall extension 152 fixedly secured to or integral with the upper end of the support plate 144, the top wall extension 152 being disposed substantially perpendicular to the support plate 144.

Projecting laterally from the support plate 144 and integral therewith is a downwardly-extending and inclined, substantially rectangular spacer member 153. The spacer member 153 extends from the top wall extension 152 and continues downwardly to terminate in a lower end portion 154 inclined toward the end wall 108. The lower terminal end of the end portion 154 is rigidly connected with the reinforcing member 136. A wall 155 integral with the spacer member 153 extends parallel to the support plate 144. Projecting laterally from the wall 155 is a wall 156 that is integral with a pair of vertically-spaced marginal edges of the base plate 146 and the top wall 150, and also with the marginal edge of the end wall 148 immediately adjacent thereto. A removable wall 157 extends along the oppositely-disposed longitudinally-extending marginal edges of the base plate 146 and the vertically-spaced top wall 150 as well as the opposed marginal edge of the end wall 148, thereby giving rise to a closed compartment 158 (see FIGURES 31 and 56).

Also integral with or fixedly secured to the support plate 144 and to the divider wall 114 is a substantially rectangular base plate 159 which projects laterally from that side thereof opposed to the base plate 146, the base plate 159, in this instance, being substantially perpendicular to the support plate 144. Vertically spaced from and disposed in parallel relation relative to the base plate 159 is a rectangular top wall 160 preferably integrally formed with the support plate 144 and which comprises a lateral continuation of the top wall extension 152. The top wall 160, at its outer end, is formed with an integral pad 161. The base plate 159 and the top wall 160 are closed at their respective adjacent ends by end walls 162, 164 and at one side by the divider plate 114, see FIGURES 32 and 58, of which the end wall comprises an integral extension of the divider wall 114. A closure member 166 extends across the slide edges of the base plate 159, the top wall 160 and the end walls 162, 164 to form a second closed compartment 168.

Construction of Spindles and Drive Means Therefor

Fixedly secured to the top wall 116 and extending over the portion 119 thereof is a substantially hollow rectangular headstock housing 174 comprising a rectangular bottom wall 176, a pair of oppositely disposed rectangular and vertical end walls 178, 180, a pair of opposed laterally spaced and vertical side walls 182, 184, and a removable top closure member 186 (see FIGURES 20, 21 and 22).

As has been stated supra, the instant lathe employs a pair of driven spindles designated, in general, by reference numerals 190, 192, respectively. The spindles 190, 192 comprise a pair of identical elongated hollow cylindrical members each of which is of a compound type to serve a function to be described infra. The longitudinally-extending axes of the spindles 190, 192 are parallel and are laterally spaced from one another with the axis of the spindle 192 being contained in a horizontal plane spaced higher than the horizontal plane containing the axis of the spindle 190. Since both spindles are identical, a description of one is the description of the other, thus only one spindle, namely, spindle 192, will be described in detail below.

Referring now more specifically to FIGURES 20, 25 and 26, the spindle 192 is seen to comprise a pair of elongated hollow cylindrical shafts 194, 196 disposed in coaxial alignment relative to each other. An elongated hollow cylindrical sleeve 198 is telescoped over the adjacent ends of the shafts 194, 196 and is fixedly secured thereto by means of the countersunk screws 200, 202 and connects the two shafts for simultaneous rotation with one another by keying means indicated at 204. Interposed between the adjacent ends of the shafts 194, 196 and spanned by the sleeve 198 is a spacer collar 206.

Each of the shafts 194 is supported, intermediate the respective ends, on a base standard 208 having its lower end fixedly secured to the bottom wall 176 by conventional means, not shown. The upper end of each standard 208 terminates in an annular head 209 formed of a pair of arcuately-shaped confronting arcuate arms 210 and a semicircular bearing cap 211. Inserted through each of the heads 210 is a journal 212 having opposed externally-threaded ends projecting beyond the opposed sides of each of each head 210 (see FIGURES 20 and 25). An end wall 214 extends across one of the ends of the journal 212 and is centrally apertured at 216 to receive the shaft 194 therethrough. Lock nuts 218, 220 are threaded on the external ends of the journal 212 and are jammed against the annular head 210 to prevent the shifting, axially, of the journal 212 relative to the head 210.

Disposed within the journal 212 and engaging the shaft 194 are a pair of bearings 222, 224 of conventional construction and design. As is clearly seen in FIGURE 25, the bearings 222, 224 have interposed therebetween a spacer ring 226 which also surrounds the shaft 194. Axial movement or displacement of the bearings 222, 224 and of the spacer ring 226 toward the right, as viewed in FIGURE 25, is prevented by means of the end wall 214.

Displacement of the bearings 222, 224 in the opposite direction or toward the left, as viewed in FIGURE 25, is prevented by means of a thrust collar 228 which is telescoped over the shaft 194 and is threadedly connected thereto at 230. As is seen in FIGURE 25, the inner end of the thrust collar 228 engages the innermost bearing race 232. Axial shifting of the collar 228 is prevented by means of a lock nut 234 threaded on the shaft 194 and engaging the outer end of the thrust collar 228. Additionally, displacement of the bearings 222, 224 to the left, as viewed in FIGURE 25, is prevented by means of a thrust collar 236 which is threaded within the sleeve 212 in such a manner as to engage against the upper bearing race 238. The inner end of the thrust collar 236 is threaded into the journal 212 for engagement against the outer bearing race 233. The outer end of the thrust collar 236 terminates in an apertured end wall 240 which surrounds the thrust collar 228 and is also provided with a nut head 242 secured to the thrust collar 238 to permit tool engagement therewith whereby the thrust collar 236 may be threaded and unthreaded from the journal 212.

As is seen in FIGURES 20 and 26, the end wall 180 is integrally formed with a pair of enlarged inwardly-extending substantially hollow cylindrical bosses 252 through which the outer ends of the shafts 196 extend. Telescoped within each boss 252 is an axially elongated substantially hollow cylindrical journal 254 having an inner end externally threaded as at 256 while the other end thereof terminates in a circumferential flange 258 which extends laterally and outwardly from the journal 254 for abutment against the outer side of the end wall 180. Interposed between the journal 254 and the shaft 196 is a pair of inner bearings 259 which are separated from an outer bearing 260, the bearings 259, 260 being axially spaced from one another relative to the shaft 196, by means of a spacer ring 261. Axial displacement of the bearings 259, 260 and of the ring 261 to the left, as viewed in FIGURE 26, is prevented by means of a nut 262 which is threaded on the journal 254 at 263, the nut 262 being provided with an end wall 264 which carries a centrally-positioned hollow cylindrical element 266 which is coaxial with respect to the shaft 196. As is seen in FIGURE 26, the free end of the element 266 abuts against the adjacent side of one of the bearings 259. An L-shaped locking member 268 has the leg portion 270 thereof fixedly secured to the boss 252 by means of a screw 272, while the foot portion 274 engages about the inner end of the boss 252 for abutment against one of the planar faces 276 of the nut 262.

Displacement of the bearings 259, 260 and the spacer ring 261 in the opposite direction, or toward the right, as viewed in FIGURE 26, is prevented by means of a bearing keeper ring 278 which engages about the outer end of the shaft 196. The ring 278 includes an inwardly-extending circumferential flange 280 which abuts against the outer side of the outer bearing race 282 of the bearing 260, and also an outwardly-extending circumferential flange 283 which is fixedly secured to the flange 258 (a part of the journal 254) by means of screws 284. To serve a purpose to be described below, the ring 278, at the outer side thereof, is provided with an inwardly-inclined circumferential abutment surface 286.

Again, and referring specifically to FIGURES 20, 21 and 22, it is seen that each of the spindles 192, 194 have mounted thereon a pulley 300 of identical construction. As is seen in FIGURE 26, each of the pulleys 300 is keyed, as at 302, to the shaft 196 of their respective spindles. The pulleys 300 are disposed intermediate the adjacent ends of the sleeve 198 and nut 262 and the central portion 304 thereof is provided with a plurality of teeth 306. An endless belt 308 having internal teeth 310 is trained about the central portion 304 of the pulleys 300, the teeth 310 being adapted to mesh with the teeth 306 of the central portion 304 of each pulley 300. The driving relationship between each of the pulleys 300 is usually 1:1.

Driving means for the spindles 190, 192 are provided and comprise a second pulley 312 (see FIGURES 2 and 20), keyed to the shaft 194, identical in all respects to the construction of the pulleys 300 described in detail above. In this instance, the pulley 312 is keyed or otherwise fixedly secured to the shaft 194 of the spindle 190 for rotation therewith. The bottom wall 176 and the top wall portion 119 are formed with a pair of aligned transversely-extending slots 314, 316, respectively, which are also aligned with the pulley 312. An endless belt 318, identical in construction with respect to the endless belt 308, is trained about the pulley 312 and extends downwardly through the slots 314, 316 for training about a fourth pulley 320, identically constructed with respect to the other three above-described pulleys. As is seen in FIGURE 2 of the drawings, the belt 318, when passing through the slots 314, 316, enters the chamber 118 (see FIGURE 2), within which is disposed any desirable and conventional electric motor mounting base 322 on which is supported an electric motor 324. The electric motor 324 is provided with the conventional drive shaft 326 on which the pulley 320 is fixedly secured for rotation therewith.

It should be now obvious that upon energization of the motor 324 the pulley 320 will drive the pulley 312 and, in turn, the spindle 190. Rotation of the spindle 190 causes rotation of the pulley 300 connected thereto, and through the endless belt 308, the other pulley 300 will be driven. Driving the last-named pulley 300 will, of course, effect a driving of the spindle 192.

Each of the spindles 190, 192 has been broken down into two shafts 194, 196 so that the driving belts 308, 318 may be quickly and easily changed without the necessity of tearing down the bearing assemblies. This is one of the very important features of this invention. The belt change or replacement steps will be described below.

*Collets and Operating Means Therefor*

It now becomes of importance to describe the collet and collet operating mechanism which are associated with each of the spindles 190, 192. However, and before describing specifically these several elements and their functions, it first becomes necessary that a more elaborate description of the construction of the shafts 194, 196 be presented.

As is seen in FIGURES 20, 25 and 26, the shaft 196, adjacent its outer end, is countersunk to provide an enlarged bore 327, and at its extreme outer end, the shaft 196 terminates in a laterally-offset hollow cylindrical end portion 330. This terminal end portion 330 is open and ground concentric with the smaller diameter of the enlarged bore 327. The terminal end portion 330 is externally threaded to threadedly receive an end cap 334 having an end wall 335 centrally apertured at 336. The terminal end portion 330 is integrally formed with an inwardly-inclined outwardly-extending circumferential collar 338 which, when taken together with the inclined surface 286 of the ring 278, form a labyrinth seal to prevent foreign matter and coolant from passing into the bearing assembly.

The offset terminal end 330 includes an enlarged bore 340 to which further reference will be made below.

Disposed within the bores 327, 340 is an enlarged substantially cylindrical collet carrier 342 which is adapted for reciprocation therein. As is seen in FIGURE 26, the collet carrier 342 is provided with an inner centrally-apertured end wall 344 which is adapted to be engaged by the outer end of a pusher sleeve 328. The outer end of the collet carrier 342 is enlarged to form a cylindrical shoulder 346 for reciprocation within the bore 340. The shoulder 346 is also formed with an external conically-shaped cam surface 348, the function of which will also be described below.

Disposed within the collet carrier 342 is a substantially cylindrical collet 350 which is axially split to form a plurality of collet fingers 352, the collet fingers adjacent their respective outer ends being provided with conical or cam-shaped ends 354 which are necked down, leaving extensions 356.

As is seen in FIGURE 26, the collet carrier is free to reciprocate within the bore 327 and the bore 340. The position of the collet carrier 342 is determined by the length of the pusher sleeve 328.

The cap 334 is enclosed within a substantially hollow cylindrical safety guard 358 flanged at 360 for connection to the flange 283 of the ring 278 and the flange 258 of the journal 254 by means of the screws 284.

Disposed within the shaft 194 and adjacent the nut 234, the pusher sleeve 328 is seen to terminate in a pair of axially-extending arcuately-shaped diametrically-opposed tongues 361 which are received within a slotted cylindrical insert 362 having an enlarged end portion 364. A second insert 366 is disposed within the shaft 194 and is provided, at its outer end, with an outwardly-turned circumferential flange 368 which abuts against the extreme outer end of the shaft 194. Axial displacement of the insert 366 is prevented by means of a nut 370 threaded on the shaft 194 and being provided with a centrally-apertured end wall 372 which engages against the flange 368.

The shaft 194, intermediate the nuts 234, 370, is provided with a plurality of axially-extending slots 374 which extend transversely therethrough. Mounted on the slotted portion of the shaft 194 and fixedly secured thereto is a hollow tubular axially-slotted dog sleeve 375 having slots 376 co-extending and aligned with the slots 374. The dog sleeve 375, adjacent its inner end, is integrally connected with a plurality of radially-extending lugs 377 between each adjacent pair of which is connected, on a pivot pin 378, a dog 380. As is seen in FIGURE 25, the dogs 380 each have a bell crank lever configuration of which one end is provided with a tab 382 and the other end of the lever or dog 380 terminates in a concave-convex arm 384.

As viewed in FIGURES 25 and 26, the pusher tube 328 has been moved to its collet closing position with the tabs 382 engaging against the enlarged end 364 of the insert 362. In this position the concave-convex ends of the levers 380 slidably engage against the inner side or surface of a journal 385 having a circumferential flange 386 adjacent the lever arms 384, the outer side of the flange having a frusto-conical cam surface 387 formed therein and serving a purpose to be described.

A substantially cylindrical rod 390 extends transversely across the headstock 174 and has its opposed ends fixedly secured in the side walls 182, 184 thereof. As is seen clearly in FIGURES 20, 21 and 22, the cylindrical rod 390 extends between a pair of slide rods 392, 394 which project inwardly from the end wall 178 and are rigidly secured thereto. The slide rods 392, 394 are parallel to each other, but the slide rod 394 is offset vertically, upwardly and laterally away from the slide rod 392. Mounted for reciprocation on the slide rods 392, 394 is a slide block 396 and a stabilizing or vibration-dampening block 398, see FIGURE 22. As is seen in FIGURES 20 and 21, the stabilizing block 398 is normally positioned adjacent the free ends of the slide rods 392, 394 and movement thereof relative to the slide rods 392, 394 is prevented by means of enlarged washers 400, the nuts 402, and the rod 390 which extends transversely therethrough.

Disposed adjacent the remotely-disposed sides of the rods 392, 394 are a pair of yokes 404, 406 inverted with respect to each other and having identical constructions. The yokes 404, 406, each include a leg 408 which is pivotally supported on the cylindrical rod 390. The remotely disposed ends of the legs 408 are bifurcated to provide, integrally, a pair of diverging arcuate arms 409, 410 apertured adjacent the free ends thereof.

The journal 385 is encompassed by an annular casing 411 disposed in concentric spaced relation relative thereto and between which is interposed a conventional bearing 412. As is seen in FIGURE 25, a replaceable bushing is press fit into the casing 411 and includes a lower bearing race 413 disposed between the flange 386 and the lock nut 414 threaded on the other end of the journal 385, and a centrally-apertured cap 415 is threaded into the casing 411 to bear against the upper bearing race 416. Thus, the bearing 412 is effectively prevented from shifting axially of the casing 411.

Each annular casing 411 is provided with a pair of diametrically opposed outwardly-extending pivot pins 417 which are adapted to be rotatably received within the apertures formed in the free ends of the yoke arms 409, 410. For reasons to become more evident below, the pivotal connection between the casings 411 and their respective associated arms 409, 410 is necessarily loose.

One or more nuts 20 are threaded on the shaft 194 adjacent the outer end thereof, of which the outermost one 422 comprises a jam nut. The axial position of these nuts provides adjustable gripping means for the dogs 380.

Each of the legs 408 of the yoke members 404, 406 is provided with a laterally-projecting pin 450 to which is connected, respectively, one of the respective ends of a pair of links 452, the other ends of the links 452 being pivotally connected at 454 with the sliding block 396. Thus, as the sliding block 396 is reciprocated on the slide rods 392 and 394 the yokes 404, 406 pivot on the rod 390 in the same direction whereby the casings 411 are shifted axially of the spindle 192, and in so moving, effect the operation of the collets 350 as described above.

Pneumatically-operated means are utilized in effecting the reciprocation of the sliding block 396. The pneumatic means is shown in FIGURES 2, 4, 20 and 21 and is seen to comprise an air cylinder 460 of conventional design. The air cylinder 460 is rigidly secured to the top wall 116 by means of a pair of conventional hanger brackets 462 and depends therefrom. Mounted for reciprocation within the air cylinder 460 is a reciprocating piston 464 (see FIGURE 4) having fixedly secured to one side thereof and projecting through the air cylinder a piston rod 466. The air cylinder 460, on opposite sides of the piston 464 connects through conduits 468, 470 with a two-way solenoid-operated valve 472 of conventional design. Air under constant pressure is admitted to the inlet side of the valve 472 through a conduit 474 which is connected to the inlet side of an air filter 476. The discharge side of the air filter 476 connects through the conduit 478 with the inlet side of an oil-mist lubricating device 480 of conventional design, and is charged therefrom through the tube 482 which is connected to the inlet port of the valve 472. If desired, an air gauge 484 may be connected to this series circuit.

Reference numeral 486 denotes a bracket having a base portion 488 fixedly secured to the end wall 178 of the headstock 174, and projecting inwardly from the base and disposed in laterally spaced and confronting relation are a pair of bracket arms 490, 492 (see FIGURES 20 and 21) between which extend an elongated lever 494. The lever 494 is pivotally supported on a pivot pin 496. One end of the lever 494 is connected by a pivot pin 498 to the piston rod 466, while the other end of the lever 494 is pivotally connected at 500 between the arms 502, 504 of a yoke 506 having a stem 508 extending through the slide block 396 and rigidly secured thereto as by means 510.

FIGURES 20, 25 and 26 illustrate the collet as being in its operative position and, assuming that the device is being operated, the spindles 190, 192 will rotate. Assuming further that the work cutoff stroke has now been just completed, means (to be described in detail below) are provided to operate the solenoid switch 472 causing the same to rotate or move 90 degrees whereby pressure is relieved from one side of the piston 464 and applied to the other side thereof. Air under pressure admitted to the other side of the piston 464 causes the lever 494 to pivot in a counterclockwise direction as viewed in FIGURE 21 whereby the yokes 404, 406 are moved axially to the right, reference being made to FIGURE 25 of the drawings. Movement of the yokes in the above-indicated direction effects a shifting of the journals 385 to the right as viewed in FIGURE 25 and the concave-convex ends of the dogs or levers 380 are now forced to move outwardly through the slots 374, 376 as the ends 384 move along the frusto-conical surfaces 387. As this movement takes place, the tab ends 382 of the levers 380 are pivoted inwardly away from the enlarged ends 364 of the insert 362.

With the pusher tube 328 now being unlocked, the cam-shaped ends 354 of the collet fingers 353 exert a pressure on the cylindrical shoulder 346 of the collet carrier 342 whereby the carrier 342 is moved to the left as viewed in FIGURE 26, as well as the pusher tube 328, whereby the collet fingers 352 are permitted to expand away from the work.

Rotation of the solenoid-actuated valve 472 a further 90 degrees will reverse the air pressure on the piston 476 and the yokes 404, 406 will move into the position shown in FIGURES 21 and 25.

*Spindle Belt-Removing Procedure*

When it becomes necessary to replace the belt 308, the front cap nut 334 is first unscrewed from the terminal end 330 of the shaft 196. The operator may then remove the collet carrier 342 together with the the collet 350.

The screws 200, 202 are now loosened from their engagement with the shafts 196, 194, respectively (see FIGURE 26). The pusher tube 328 is now removed from within the shafts 194, 196. The cylindrical sleeve 198 is now moved to the left as viewed in FIGURE 26, over the shaft 194 thus permitting the removal of the collar 206.

The set screw 301 of the flange 303 for the pulley 300 is unloosened and is removed from between the two shafts 194, 196, after which the belt 308 may be slid from the hub 304 and also removed from between the adjoining ends of the shafts 194, 196.

This sequence of operations applies to both of the spindles.

*Horizontally Reciprocable Tool Holding Means*

Tool holding means are provided and are indicated in general by reference numerals 600, 602 (see FIGURE 14), one being provided for each of the spindles 190, 192. The tool holding means 600, 602 are identical in construction relative to each other, and hence, a description of one comprises a description of the other.

Referring now more specifically to FIGURES 14 to 20, inclusive, each of the tool holders 600, 602 is seen to include an elongated substantially rectangular base support 604 fixedly secured to and projecting laterally from the end wall 180 adjacent the side walls 182, 184 and disposed below and to one side of each of the spindles 190, 192. Each base support 604 has an elongated rectangular groove 606 extending transversely thereacross and projecting downwardly from the upper sides thereof. Each of the grooves 606 has disposed therein, respectively, an elongated substantially rectangular block 608. Each of the blocks 608 (see FIGURES 16 and 17) is integral with an upwardly-extending dovetail key 610. A bore 612 extends inwardly from one end of the block 608, the bore 612 terminating adjacent the other end thereof. As is seen in FIGURES 16 and 17, the dovetail key 610 has a slot 614 extending inwardly from the same end of the block 608, the slot 614 being of lesser axial length than the bore 612 and being in communication therewith.

An elongated substantially rectangular slide block 615 is provided with an elongated dovetail groove which slidably receives the dovetail key 610 therein. The adjacent outer ends of the dovetail key 610 and the slide block 615 are formed with a continuous vertically-extending elongated substantially rectangular groove 617 which has fixedly secured therein a vertically-elongated substantially rectangular face plate 618 which extends downwardly through the slot 614 and terminates in confronting relation relative to the bore 612. Disposed within the bore 612 and abutting against the inner end thereof and against the face plate 618 is a helicoidal spring 620 which, at its outer end, is held against displacement by means of a centering pin 622 carried by the face plate 618 and which is engaged by the aforementioned outer end of the spring. From the foregoing description, it will be understood that the slide blocks 615 are constantly biased for movement away from their respective adjacent spindles.

The upper end of the slide block 615 is provided with an inverted T-shaped passage 624, the stem portion 626 of which opens into the plane of the upper end thereof. A hold-down bolt 628 is slidably inserted in the passage 624 and has a shank portion 630 thereof projecting above the above-referred to plane. The shank 630 is slidably received within a passage 632 that extends vertically through a tool hold-down block 634 having an offset flange 636 vertically spaced above the upper end of the slide block 615. The hold-down block 634 is fixedly secured to the slide block 615 by means of the washer 638 and nut 640 threaded on the terminal end of the shank 630 of the bolt 628. Disposed on the slide block 615 and below the flange 636 is a substantially rectangular tool wedge 642 which supports the lathe tool 644, the latter being clamped against the wedge 644 by clamping bolts 646, the clamping bolts 646 being threaded through the flange 636.

*Tool Holder Slide Block Feed Means*

Means are provided to feed each of the slide blocks 615 toward their respective adjacent spindles and against the tension of the springs 620. These means comprise a bracket 648 having a rectangular base 650 rigidly connected by screws 652 to a side of the base support 604. A bracket arm 654 projects laterally and upwardly from the base 650 and terminates in an elongated hollow tubular boss 656 having an axially-elongated cylindrical bore 658 (see FIGURES 14, 15 and 16) formed therein. To serve a function to be described, the boss 656 is formed with an axially-extending slot 660 which is in open communication with the bore 658. Mounted for reciprocation in the bore 658 and extending between the opposed ends of the boss 656 is an elongated hollow tubular member 662. Relative rotary and axial movement of the tubular member 662 with respect to the boss 656 is limited by a stop pin 666 which extends through an axially-extending slot 667 formed in the boss 656 and is threaded into the tubular member 662 intermediate the opposed ends thereof. Integral with the tubular member 662 and externally thereof is an axially-extending rack gear 668, the rack gear 668 being located in confronting relation relative to the slot 660.

The tubular member 662 is internally threaded at 670 adjacent one of its ends, and inserted into this threaded end is a cylindrical rod 672 threaded intermediate its ends at 674 for connection with the threads 670. As is seen in FIGURE 15, the rod 672 has an end portion 676 which extends beyond the adjacent end of the tubular member 662 and is received within the centrally-apertured end wall 678 of a hollow cylindrical cap 680. The cap 680 is telescoped over the threaded end portion of the hollow tubular member 662, and its end wall 678 has a convex configuration and is connected to the end portion 676 of the rod 672 by means of a diametrically-extending pin 682. Thus, the cap 680 and its end wall 678 may be axially adjusted relative to the tubular member 662.

As is seen in FIGURES 15 and 16, the tubular member 662 is mounted for reciprocation within the bore 658 in a direction perpendicular to the face plate 618, and the extreme outer end of the end wall 678 of the cap 680 is adapted to bear thereagainst.

To the side wall 184 is secured, respectively, the rectangular base 684 of a hanger bracket 686, reference being made to FIGURES 14 and 20. The bracket 686 includes a vertically-elongated, substantially cylindrical boss 688 having an axially-extending vertical bore 690 therethrough. Journaled for rotation in the bore 690 is a shaft 692 that projects beyond the opposed ends of the boss 688. To the lower end of the shaft 692 is adjustably secured, by a taper pin 694, a hub 696 at one end of a lever 698. The lever 698 is arcuately shaped and extends through the slot 660 and is provided with a plurality of rack gear teeth 700 which are adapted to mesh with the rack gear teeth 668 of the tubular member 662. To the upper end of the shaft 692 is connected, by a taper pin 702, the hub 704 of an arcuately-shaped lever 706. The other end of the lever 706 is bifurcated to receive therein a cam follower roller 708 (see FIGURE 20), rotatably connected thereon by a pivot pin 710. As will become more apparent below, actuation of the lever 706 adjacent the side wall 184, in a counterclockwise direction will effect a similar movement of the lever 698 (as viewed in FIGURES 15 and 20) whereby the tubular member 662 is caused to move axially to the right, reference being made to FIGURE 15, causing the end 682 of the cap 680 to bear against and force the slide block 615 to move toward the adjacent spindle 190.

While the means for effecting the reciprocation of the other tubular member 662 adjacent the spindle 192 are substantially the same, the order of its assembly is somewhat different. Referring now more specifically to FIGURES 14, 15 and 20, it is seen that the side wall 182 has fixedly secured thereto another rectangular base 684 for a second hanger bracket 686. The bracket 686 includes a second vertically-elongated substantially cylindrical boss 688. A second shaft 692 is rotatably supported in the second boss 688 and has connected thereto intermediate the ends thereof a second hub 704 for a second lever 706. The free end of the lever 706 is bifurcated, as before, and has rotatably mounted therein a second cam follower roller 708. To the upper end of the second shaft 692 is fixedly secured the hub 696 of a second lever 698 (see FIGURE 20) having rack gear teeth 700 at the free end thereof. The second lever 698 is adapted to drive the second of the tubular members 662 to effect movement of the slide 615 toward the spindle 192.

Thus, movement of the second lever 706 in a clockwise direction, as viewed in FIGURE 20, will introduce feeding movement in the second of the levers 698.

Driving means for the levers 698, 706 are provided and comprise an elongated substantially hollow tubular gear box 712 having a substantially rectangular hollow transmission housing 714 intermediate its respective ends. As is seen in FIGURES 22 and 24, the gear box 712 is supported at its remotely-disposed ends in gaskets 716 forming inserts in the side walls 182, 184. The gear box 712 extends transversely across the headstock 174 adjacent the bottom wall 176 and the end wall 180.

As is seen in FIGURES 21, 22 and 27, the transmission housing includes an offset substantially rectangular bottom wall 718 which is supported on the bottom wall 176, a similar vertically-spaced removable substantially rectangular top wall 720, and a pair of oppositely-disposed, spaced cover plate end walls 722, 724. The front cover plate end wall 724 is centrally apertured at 726, and the aperture 726 is coaxially aligned with the opening 728 (see FIGURE 27) formed in the end wall 180. A rotatable shaft 730 extends through the aperture 726 and opening 728 and through an O-ring seal 729 into the transmission housing 714 and at that end thereof adjacent the rear cover plate end wall 722 is keyed at 732, the hub 734 of a beveled gear 736. The outer end of the hub 734 is proximate the cover plate rear end wall 722 and axial displacement of the gear 736 to the right (as viewed in FIGURE 27) is prevented by means of the spacer collar 738 which extends between the front cover plate end wall 724 and the adjacent face of the gear 736. The collar 738 is keyed at 740 to the shaft 730 for rotation therewith.

Extending into the transmission housing 714 and at right angles to the shaft 730 is a pair of shafts 742, 744 on the adjacent ends of which are connected, for rotation therewith, a pair of bevel gears 746, 748, respectively, each of which mesh with the bevel gear 736.

The shafts 742, 744 extend axially through the gear box 712 with the hubs 750, 752 of the gears 746, 748, respectively, riding in bearings 754, 756, and the shafts 742, 744 are also journaled in bearings 758, 760 and 762, 764, respectively. Interposed between each pair of bearings 758, 760 and 756, 764 are spacer collars 766, 768 (see FIGURE 24).

Spacer sleeves 770, 771 are mounted on the shaft 742 adjacent each bearing 758, 760, and similar spacer sleeves 772, 773 are mounted on the shaft 744 adjacent the bearings 762, 764. Interposed between the adjacent ends of the sleeves 770, 771 and 772, 773, respectively, and keyed to the shafts 742, 744 at 774 and 776 are worm gears 778, 780 which confront openings 782, 784 (see FIGURES 21 and 24) formed in the gear box 712 adjacent each end thereof.

Reference numerals 786, 788 denote a pair of substantially hollow cylindrical base elements which are fixedly secured to the bottom wall 176 of the headstock 174 adjacent the end wall 180. The cylindrical base elements 786, 788 have journaled therein the lower ends of a pair of shafts 790, 792, respectively (see FIGURE 21) and each of the shafts 790, 792 adjacent their respective upper ends are journaled for rotation in bearings 794, 796 which are fixedly secured to the side walls 184, 182, respectively, of the headstock 174. The shaft 790 has fixedly secured thereto a spur gear 798 which projects through the opening 782 and meshes with the worm gear 778. In a similar manner, a spur gear 800 is fixedly secured to the shaft 792 and projects through the opening 784 formed in the gear box 712, and meshes with the worm gear 780.

The upper ends of the shafts 790, 792 project above the bearings 794, 796 and have fixedly secured thereto discs 802, 804 for rotation therewith. Superimposed over each of the discs are a pair of cam members 806, 808, respectively, doweled at 810 (only one dowel connection being shown) to the discs 802, 804 immediately subjacent thereto. As is seen in FIGURE 20, the upper ends of the shafts 790, 792 are threaded to receive nuts 812, 814, and the cam members 806, 808 are adapted to be engaged by the cam follower rollers 708 of the levers 706.

From the foregoing description it should now be apparent that as the shaft 780 rotates, the shafts 742, 744 will also rotate, and the rotation of the last-named shafts will, in time, introduce rotation to the shafts 790, 792, through the medium of the worm gears 778, 780 and the spur gears 798, 800. As the shafts rotate, so too will rotate the cam members 806, 808 and will thereby actuate the levers 706, whereby the slides 615 are actuated for movement toward their immediately adjacent spindles 190, 192.

The movement of the levers 706 to force the slides 615 toward their respective spindles 190, 192 is, of course, resisted by the springs 620 which, as the rollers 708 track the low side of the cams 806, 808, force the slides 615 in the opposite direction.

Reference is now made more specifically to FIGURES 14, 18 and 19 wherein is disclosed the construction of a second pair of tool holding devices and the means for operating the same. This second pair of tool holders and the operating means therefor have been designated, in general, by reference numeral 815. Referring in particular to FIGURES 14 and 23, it is seen that the front wall 180 adjacent an upper corner thereof is thickened to provide a chord-shaped boss 816 having portions thereof removed to accommodate a pair of rack gears 818, 820 adjacent each end thereof, and a pair of spur gears 822, 824 which are adapted to mesh with the rack gears 818, 820, respectively. The spur gears 822, 824 are journaled for rotation on shafts 825, 826 which are fixedly secured to the end wall 180 and project outwardly therefrom.

As is clearly shown in FIGURE 23, this assembly also includes a third rack gear 828 having the opposed longitudinal extending sides thereof formed with gear teeth which are adapted to mesh, simultaneously, with the teeth of the spur gears 822, 824. The outer end of the rack gear 828 is bifurcated and supported between the bifurcation on a pin 830 is a cam follower roller 832. Thus, as the rack gear 828 is reciprocated, the spur gears 822, 824 will rotate to drive the rack gears 818, 820 in a direction inwardly or outwardly of the boss 816.

The rack gears 818, 820 each has projecting outwardly from one of their respective ends adjustment bolts 834, 836, respectively, the latter being held in their respective adjusted positions by means of lock nuts 838. The extreme outer ends of the bolts 834, 836 terminate in enlarged abutment heads 840, 842.

The means for driving the rack gear 828 is clearly illustrated in FIGURES 22, 23, 24, 27, 28, 28A and 29.

As illustrated therein, the driving means includes a substantially hollow gear box or housing 844 fixedly secured to the outer side of the end wall 180 adjacent the lower end thereof. The housing 844 includes a removable upper cover 845. The shaft 730 extends transversely through the gear box 844 and has rigidly secured thereto for rotation therewith a bevel gear 846 which, in turn, meshes with a second bevel gear 848 fixedly connected to the lower end of a shaft 850 which projects upwardly through the upper end of the cover 845 and is journaled for rotation therein.

The worm gear 858 meshes with the spur gear 860 pinned at 861 to a shaft 862 supported at its opposed ends on the end wall 180 and an upwardly-projecting flange 863 integral with the housing 854. The inner end of the shaft 862 is provided with a nut 864, a thrust bearing housing 865 and thrust bearings 867. The shaft 862, adjacent its other end, has a thrust bearing flange 869 integral therewith against which bears a cam adapter disc 871 to which a cam 866 is connected by a dowel 873. The cam 866 and adapter plate 871 are held on the aforementioned other end of the shaft 862 by means of a nut 875. The cam 866 has a cam surface 868 which is adapted to be tracked by the cam follower roller 832. Thus, as the cam member 866 rotates in a clockwise direction (reference being made to FIGURE 23), the roller 832 will track, for a portion of the periphery of the cam member, the low side thereof. In this condition, the rack gears 818, 820, the spur gears 822, 824, and the rack gear 828 maintain their respective positions as shown in FIGURES 23, 28 and 28A. When the high side 868 of the cam member 866 is engaged by the roller 832, the rack gear 828 is moved radially outwardly therefrom and effects counterclockwise rotation of the spur gear 822, and clockwise rotation of the spur gear 824. This causes movement of the rack gears 818, 820, outwardly of the boss 816.

The front wall 180 also includes a pair of integral substantially rectangular bosses 870 disposed in advance of the enlarged abutment heads 840, see FIGURES 18 and 19, and to each of which is secured a substantially rectangular guide block 872 having a longitudinally-extending dovetail groove 874 formed therein. A pair of substantially rectangular slide blocks 876 are formed integrally with a dovetail key 878, respectively, which are slidably received within the grooves 874 for reciprocation therein.

The guide blocks 872 each includes a laterally-projecting abutment or tongue 880 that projects into a longitudinally-extending slot 882 formed in the dovetail key 878 which intersects a longitudinally-extending bore 884 formed in the slide blocks 876 (see FIGURE 18) in which is disposed a helicoidal spring 886 under compression. One end of the spring 886 bears against the tongue 880, and the other end thereof abuts against a wear plate 888 fixedly secured, by conventional means, to the upper end of the slide block 876. As is seen in FIGURES 18 and 23, the springs 886 constantly bias the slide block 876 for movement toward the heads 840 whereby the wear plates are held in constant engagement therewith, and the force exerted by each spring 886 effects the return of the rack gears 818, 820 to their respective positions shown in FIGURE 23, when the roller 832 tracks the low side of the cam 866.

Referring now more specifically to FIGURES 14, 18 and 19, it is seen that to each of the slide blocks 876 is connected an elongated substantially rectangular tool holder plate 890 which is adjustably connected thereto by screws 892 received in slots 894 formed in the tool holders 890, and which are threaded into the slide blocks 876.

The lower ends (see FIGURES 18 and 19) of the tool holders 890 are integral with the tool holder clamping means 896 which include a pair of laterally-projecting arms 898, 900 across which extends a bight member 902.

A pair of clamping screws 904 traverse the arms 898, 900 to hold a tool 906 therebetween and between the plate 890 and the bight member 902.

Thus, actuation of the cam member 866 will cause the tool 906 to approach the work pieces 908 when the roller 832 rides on the high side 868 of the cam member 866, and the springs 886 force the withdrawal of the tools from the work pieces when the roller 832 engages the low side of the cam member 866.

The Turret Mounting Block

It will be noted that the top wall 152 is bounded along its longitudinally-extending sides by vertical shoulders 910, 912 (see FIGURES 31, 48 and 56) in which is fixedly secured an elongated block 914 having an upwardly projecting dovetail key at 915 formed integrally therewith. The key 915 is adapted to be received within a dovetail slot 916 formed in the underside of turret mounting block 918 which includes, at one end thereof, an enlarged substantially rectangular supporting member 920 on which are rotatably mounted a pair of cylindrical turrets 922, 924, the axes of rotation of which are disposed at right angles relative to each other, as will be described in more detail infra.

From FIGURES 1, 30 and 36 it is seen that the block 918 is formed with a central opening 926 to which further reference will be made.

The Construction and Assembly of the Turrets

The turrets 922, 924 are of identical construction, each including six tool-receiving stations 928 spaced circumferentially thereabout. The turrets 922, 924 are formed with centrally-positioned laterally-projecting shafts 1000, 1002, respectively. The shaft 1000 is journaled in axially-spaced bearings 1004 disposed within a bushing 1006, the shaft 1000 having interposed between the aforesaid bearings a spacer sleeve 1008. As is seen in FIGURE 34, the bushing 1006 is received within a vertical bore 1010 formed in the support member 920.

The bore 1010 intersects a substantially horizontal bore 1012 at substantially right angles with respect thereto, and disposed within the bore 1012 is a bushing 1014 that carries bearings 1016 adjacent each end thereof and in which is journaled the shaft 1002. The bearings 1016 are held in axially-spaced relation by means of a spacer sleeve 1018.

A bevel gear 1020 is keyed to the inner end of the shaft 1000 for rotation therewith, and a similar bevel gear 1022 is keyed to the shaft 1002 intermediate its ends for rotation therewith, the bevel gears 1020, 1022 (see FIGURE 34) being in mesh with one another.

Interposed between each of the turrets 922, 924 and the support member 920 are wear plates 1024, 1026, respectively, the wear plates 1024, 1026 being fixedly secured to the turret block by conventional means. Superimposed against the wear plates 1024, 1026 is a second set of wear plates 1028, 1030 which are fixedly secured to the respective turrets by means of countersunk bolts 1032.

In the instant embodiment of this invention, each of the wear plates 1028, 1030 is provided (see FIGURES 34, 37, 39 and 40) with six indexing stations comprising openings 1033 in which are inserted bushings 1034. The two turrets 922, 924 are driven, sequentially, through their respective indexing stations by the rotation of a Geneva gear 1036 having six radially-extending slots 1038, the gear 1036 having a centrally laterally-projecting hub 1040 which is keyed at 1042 to a shaft 1044 that extends into the bore 1012 and is splined or otherwise rigidly connected to the shaft 1002 for rotation therewith. The hub 1040 bears against an external face or wear plate 1046 and the shaft 1044 is journaled for rotation in the support member 920 in bearing 1048.

Thus, as the Geneva gear 1036 is driven, the shafts 1000, 1002 will be simultaneously driven and will effect the rotation of the turrets 922, 924.

In a manner to be described below, the rotation of each of the turrets 922, 924 is intermittent in order to afford the sequential indexing thereof and the locking of the turrets in a given indexed position.

The Turret Locking Means

As in all turret lathes, it is necessary that the turret be locked in a selected one of its index positions. This is true in the instant case, and these means are described in detail below.

Specific reference is made now to FIGURES 32, 33, 34, 37, 38, 39, and 40. As illustrated therein, it is seen that a shaft 1050 extends transversely through the support member 920 and is journaled for rotation therein. One end of the shaft 1050 is splined to an externally-positioned wheel 1052 which is adapted to receive a manually-operable lever 1054 normally employed in setting up the lathe. The other end of the shaft 1050 terminates in a pair of aligned integral spur gears 1056, 1058. The gear 1058 meshes with a rack gear 1060 formed adjacent one end of a turret lock shaft 1062. The lock shaft 1062 extends transversely across the support 920 and is mounted for reciprocation within a sleeve 1064. The lock shaft 1062 is formed with a necked-down portion 1066 which is partially surrounded by a helicoidal spring 1068. As is clearly seen in FIGURE 37, the necked-down portion 1066 of the shaft 1062 extends through a centrally-apertured end wall 1070 of the sleeve 1064, and the helicoidal spring abuts thereagainst and against the shoulder 1072 of the shaft 1062 whereby the shaft 1062 is constantly biased for movement toward the turret 924. From FIGURE 37 it is seen that the wear plate 1026 is provided with an aperture 1074 aligned with the shaft 1062 and with the bushing 1034. The necked-down portion 1066 of the shaft 1062 is also provided with a notch 1076 to which further reference will be made below.

It should be clear from the above specification that as the gear 1058 is rotated in a counterclockwise direction, the lock shaft 1062 will be withdrawn from the wear plate 1030 whereby the turret head 924 becomes free to rotate. At the same time, it is equally manifest that as the gear 1058 is rotated in a clockwise direction, the shaft 1062 will move in the reverse direction and engage within one of the indexing station apertures 1032.

The support 920 is formed with a downwardly-extending bore 1078 and a communicating slot 1080 (see FIGURES 33 and 34). Mounted for reciprocation within the bore 1078 is a second lock shaft 1082, the lock shaft 1082 having a reduced end 1084 which is adapted for sequential engagement within the openings 1032 formed in the wear plate 1028 of the turret 922.

Integral with and projecting laterally from the lock shaft 1082 is a flange 1086 which is connected at 1088 to a rack gear 1090 disposed within the slot 1080. The rack gear 1090 depends from the flange 1086 and meshes with the gear 1056 formed on the shaft 1050.

Thus, as the bolt 1062 reciprocates, so too will reciprocate the lock bolt 1082.

As has been stated above, the helicoidal spring 1068 constantly tends to urge the locking bolt 1062, and consequently, the lock bolt 1082, toward their respective locked positions. As the indexing of the turrets 922, 924 occurs, it is necessary, of course, to effect the withdrawal of the lock bolts 1062, 1082 from the indexing openings 1032. This is accomplished in the following manner.

Referring now more specifically to FIGURE 34 of the drawings, it will be seen that the support member 920 is formed with a longitudinally-extending groove 1092 in which is fixedly secured an L-shaped bracket 1094. The bracket 1094 includes a leg portion 1096 on which is pivotally connected on pin 1098, a lever 1100. The lever 1100, at one end thereof, has secured thereto a depending lever arm 1102, and at its other end the lever 1100 has fixedly secured thereto a depending latch member 1104, see FIGURE 37, which engages within the notch 1076 formed in the reduced end 1066 of the lock bolt 1062.

To that side of the support member 920 remotely disposed with respect to the turret 924 is mounted a shaft 1104. Mounted on the shaft 1104 is a wheel 1106 having a roller 1108 projecting laterally from a side thereof. The wheel 1106 is also provided with an arcuate cam member 1110 disposed adjacent the periphery thereof.

Also mounted on the shaft 1104 is a gear 1112, the gear 1112 and the wheel 1106 being disposed in side-by-side relation (see FIGURE 38).

The gear 1112 and wheel 1106 are driven by means to be described. It should be noted, however, at this point, that the roller 1108 carried by the wheel 1106 is adapted to engage and disengage the slots 1038 of the Geneva gear 1036, and in so engaging and disengaging the shafts 1002 and 1044 are caused to intermittently rotate, and this intermittent rotation is translated through the gears 1020, 1022 to the turret 922, the turret 924, rotating, of course, with the shaft 1002. It should further be observed that the depending arm 1102 is disposed in the path of movement of the cam 1110, and upon engagement one with the other, the lever 1100 is caused to pivot in a clockwise direction, reference being made to FIGURE 39 of the drawings. After the arm 1102 escapes from the arcuate cam 1110, the shafts 1062, 1082 are moved to their locked positions under the influence of the helicoidal spring 1063.

*Driving Means for Indexing the Turrets*

Fixedly secured to the wall 114 is a bracket 1120 (see FIGURE 32) which supports a two-speed electric motor 1122 having a speed reducer 1123 connected thereto and projecting through an opening 1124 formed in the end wall 114 and into the compartment 168. To the output shaft 1126 of the speed reducer 1123 is keyed a spur gear 1128 which meshes with a spur gear 1130 pinned at 1132 (see FIGURE 41) to a back shaft 1134. The back shaft 1134 is supported, adjacent each end thereof, in hanger bearings 1136 that are secured to and project laterally from the support plate 144 in the compartment 168.

A spring-loaded clutching mechanism is indicated at 1138 and comprises a female clutch element 1140 pinned at 1142 to the back shaft 1134 adjacent one of its ends for rotation therewith. A bushing 1144 is telescoped over the back shaft 1134 and extends axially and inwardly on the back shaft 1134 from the other end thereof. The bushing 1144 is secured at 1146 to the back shaft 1134 for rotation therewith.

A spur gear 1148 is mounted for free rotation about the bushing 1144, the spur gear 1148 including a hub 1150 which terminates at one end in a cylindrical flange 1152. The outer end of the cylindrical flange 1152 is counterbored at 1154 and is also provided with a pair of diametrically-opposed axially-extending lugs 1156 (see FIGURES 41 and 43). Mounted for axial shifting on the bushing 1144 is a male clutch element 1158. The male clutch element 1158 is provided with a bight portion 1160 of reduced diameter and an end portion 1162 having a counterbore 1164. The end portion 1162 is disposed in confronting relation relative to the cylindrical flange 1152, and the two counterbores 1154 and 1164 form a compartment for a helicoidal spring 1166. As is clearly seen in FIGURE 41, the helicoidal spring 1166 abuts against the adjacent ends of the hub 1150 and the bight 1160 whereby the male clutch element 1158 is constantialy biased for movement toward the female clutch element 1140. It should be noted at this point that the end portion 1162 of the male clutch element 1158 is provided with a pair of diametrically-opposed openings 1168 which are adapted to slidably receive the lugs 1156.

To serve a function to become more apparent below, it will be noted, reference being made to FIGURE 44 of the drawings, that the end 1162 of the male clutch element 1158 is formed with a cam face 1170 having a high side designated at 1172. The purpose and function of the cam face 1170 will be made apparent below.

Fixedly secured to the top wall 160 and depending below its pad 161 is a bracket 1172 (see FIGURE 43) on which is supported, for rotation, a spur gear 1174. The spur gear 1174 meshes with the spur gear 1148 and has a portion thereof extending upwardly through an opening 1180 (see FIGURE 56) formed in the top wall pad 161.

The spur gear 1174 meshes with an elongated spur gear 1182 rotatably supported between a pair of arms 1184, 1186 which project laterally from the turret mounting block 918.

The shaft 1188 of the spur gear 1182 has fixedly secured thereto at one end thereof a beveled gear 1190 which meshes with a second beveled gear 1192 keyed at 1194 to one end of a shaft 1196 that extends transversely through the turret mounting block 918 and is journaled for rotation therein. Also mounted on the shaft 1196 is a spur gear 1198 which, in turn, meshes with the spur gear 1112 to effect a driving relation therebetween.

It will be recalled that the wheel 1106 is directly connected to the spur gear 112, and hence, it will be understood that with the motor 1122 energized and the clutching elements 1140 and 1158 engaged, the above-described indexing and the release of the turrent lock shafts or bolts are accomplished.

Disengagement of the clutch elements 1140, 1158 is effected in the following manner:

The clutch elements, as illustrated in FIGURE 41, are shown in disengaged positions. At this time the high side 1172 of the cam face 1170 is tangentially engaged with a pin 2000 which is carried by and in an enlarged boss 2002 formed in one end of an elongated lever 2004. The pin 2000 is threaded for adjustment purposes and is held in adjusted position in the boss 2002 by means of a lock nut 2006. The lever 2004 extends through an opening 2008 formed in the wall 144 and into the compartment 158. The lever 2004 is substantially V-shaped in configuration and, intermediate its ends, the lever 2004 is pivotally connected on a shaft 2010, the shaft 2010 being supported adjacent one of its ends by means of a bracket 2012 which depends from the top wall 150, the other end being supported on the wall 156. As is clearly seen in FIGURES 3 and 30, the other end of the lever 2004 is laterally bowed to extend through an opening 2014 (see FIGURE 3) formed in the end closure member 157.

Referring is now made to FIGURES 45 to 47, inclusive, wherein it is seen that a bracket 2016 is rigidly secured to the end wall 148 and projects therefrom inwardly into the compartment 158. The bracket 2016 includes a pair of laterally-spaced and substantially parallel apertured arms 2018, 2020 through which extends, for rotation therein, a shaft 2022. The shaft 2022, at one of its ends, is journaled for rotation in a bushing 2024 secured to the wall 156 and projects externally of the compartment 158. The other end of the shaft 2022 projects through the opening 2014 formed in the closure member 157, and to the remotely-disposed ends of the shaft 2022 are fixedly secured for rotation therewith, timing and programming drums 2026, 2028.

As is seen in FIGURE 31 and FIGURES 45 to 47, inclusive, the drum 2028, on opposite sides thereof, is formed with continuous circumferential T-shaped grooves 2030, 2032, each of which is intersected by a radial slot 2034 (only one being shown in FIGURE 31) to permit the introduction of one or more bolts 2036 on which are mounted cam elements 2038 (see FIGURES 31 and 47). Each of the cam elements 2038 is provided with a cam surface 2040 which, as the drum 2028 rotates, is adapted to engage against a similar surface formed on cam elements 2044 which are fixedly secured by screws to the opposed sides of the other end of the lever 2004. The cam elements 2038 are, of course, adjustable within the grooves 2030, 2032 so that the sequential engagement of the cam elements 2038 with the cam elements 2042 may be varied in accordance with the work to be performed.

From the foregoing description it is now clear that as the cam elements 2038 engage the cam elements 2042, the lever 2004 is pivoted to effect disengagement of the pin 2000 from the high side 1172 of the male clutch element 1158 freeing the male clutch element 1158 so that the same, under the influence of the spring 1164, effects engagement with the female clutch element 1140. After the high side 1172 of the cam surface 1170 passes the pin 2000, that end of the lever 2004 is constantly biased for movement toward the bight portion 1160 by means of a shaft 2046 which is mounted for reciprocation within a boss 2048. The boss 2048 is fixedly secured to the wall 144 as by screws 2050, and interposed between the upper end of the boss 2048 and a shoulder 2052 formed on the shaft 2046, is a helicoidal spring 2054 under compression. The shoulder 2052 terminates in a bifurcated end 2056 between the arms of which is received a protuberance 2058 is secured therebetween on a pin 2060. Thus, the tripping of the lever 2004 is resisted by the force of the spring 2054, and immediately thereafter the pin traces the cam face of the male clutch element 1158 and, as the same begins to rise to the high side 1172, the male clutch element 1158 is effectively withdrawn from the female clutch element 1140 whereby the gear 1148 ceases its rotation.

The cam face 1170 is of such contour that the clutch elements 1158, 1140 are engaged and disengaged during one complete revolution of the hub 1150 after the lever 2004 has once been tripped. To insure that there will not be any over-throw or over-running of the gear 1148, the cylindrical flange 1152 is formed with a notch 2062 which is adapted to releasably receive therein (see FIGURES 43 and 44) the conical head 2064 of a locking stud 2066 which is mounted for reciprocation with a substantially hollow cylindrical casing 2068. As is clearly seen in FIGURE 43, the casing 2068 includes a lateral-offset portion 2070 which is detachably connected to the wall 144 by means of bolts 2072. The stud 2066 is constantly biased for movement toward the flange 1152 by means of a helicoidal spring 2074, one end of which abuts against an enlarged head 2076 of the stud 2066, the other end of which engages against the inner end of a centrally-apertured closure member 2078.

As is seen in FIGURES 32 and 42, the boss 2048 is integral with a reverted arm 2080 having an abutment head 2082. Extending transversely through the first-mentioned end of the lever 2004 is an enlarged head 2086 which is adapted to engage against the abutment head 2082. Thus, the tangential engagement of the pin 2000 with the high side 1172 of the cam face 1170 may be constantly maintained with the desired pressure.

The shaft 1196 has fixedly connected to its other end an arm 2080 which carries an offset pivot pin 2087 which pivotally connects one end of a link 2088 thereto. The other end of the link 2088 is pivotally connected at 2089 to the bifurcated end 2090 of an elongated shaft 2091 which extends longitudinally through a sliding gear rack block 2092 (see FIGURE 33). As is seen in FIGURES 30, 33 and 36, the sliding gear rack block is disposed within an opening 2094 formed in the turret mounting block 918, see also FIGURES 48 and 49. As is seen in these figures, the sliding gear rack block 2092 is essentially Y-shaped in transverse cross-section and includes rack gear teeth 2098 which extend along an arm thereof. The shaft 2091 extends through the stem portion of the Y-shaped sliding gear rack block 2092. Vertical displacement of the sliding gear rack block 2092 is prevented by means of a cover plate 2100 which is fixedly secured to the turret mounting block 918 and extends across the slot or opening 2094 throughout substantially its entire length. The shaft 2091, at its other end, has secured thereon a plurality of lock washers 2102 and a lock nut 2104.

The turret mounting block 918 adjacent the sliding gear rack block 2092 is provided with a longitudinally-extending opening 2106 which receives therethrough one end 2108 of a bell crank lever 2110. As is clearly seen in FIGURE 49, the end 2108 of the bell crank lever 2110 is segment-shaped and at the outer end thereof is formed with a plurality of teeth 2112 which are adapted to mesh with the teeth 2098.

The bell crank lever is pivotally supported intermediate its ends on a shaft 2114 which has one of its ends threaded into the top wall 150. Integral with the shaft 2114 and interposed between the top wall 150 and the bell crank lever 2110 is a spacer collar 2116. The spacer collar 2116 maintains the bell crank lever 2110 in spaced and substantially parallel relation relative to the top wall 150. Also mounted on the shaft 2114 is a hold-down cap 2118 which prevents the vertical displacement of the bell crank lever 2110. The other end 2120 of the bell crank lever 2110 is bifurcated to provide a pair of arms 2122, 2124 between which is disposed a roller 2126 mounted for rotation on a pin 2128. The bell crank lever 2110 is driven by means to be described immediately below.

Fixedly secured to the base plate 159 (reference being made to FIGURE 31 of the drawings) is an electric motor 2130 having a drive shaft 2132. The drive shaft 2132 is connected by a conventional connector 2134 to one end of a driven shaft 2136. As is seen in FIGURE 51, the driven shaft 2136 extends through an opening 2138 formed in the end wall 2140 of a substantially hollow cylindrical cap member 2142 in which is disposed bearings 2143. The cylindrical cap member extends through a suitable opening 2144 formed in the support plate 144, and the bearings are retained by a ring 2146.

The cylindrical cap member 2142 has a flange 2148 juxtaposed with respect to a side wall 2150 of a gear box 2152. The wall 2150 is provided with an aperture 2154 coaxially aligned with the cylindrical member 2142 and the shaft 2136 extends transversely of the gear box 2152 with the uncoupled end thereof journaled in an antifriction bearing 2156 supported on a side wall 2158 oppositely disposed with respect to the side wall 2150. A worm gear 2160 is keyed at 2162 to the shaft 2136 which meshes with (see FIGURE 55) a spur gear 2164 keyed at 2166 to a shaft 2168. The opposed ends of the shaft 2168 are journaled in bearings 2170, 2172 supported on the end walls 2174, 2176, respectively, of the gear box 2152. As is clearly seen in FIGURE 55, that end of the shaft 2168 adjacent the bearings 2172 projects externally at the end wall 2176 and through a side leg 2178 of a clutch housing designated, in general, by reference numeral 2180. Keyed to this end of the shaft 2168 is a shaft extension 2183 on which is keyed a spur gear 2184. The spur gear 2184 meshes with an idler gear 2186 mounted on a shaft 2188 which is adjustable by conventional means within an elongated slot 2190 formed in one end 2192 of an L-shaped adjustment lever 2194. The lever 2194 is pivotally supported on a bushing 2196 mounted on the extension 2183 of the shaft 2168.

The other end of the lever 2194 is formed with an arcuate slot 2198 through which is received a bolt 2200 threaded into the housing 2180. Thus, the shaft 2188 may be adjusted longitudinally in the slot 2190 and arcuately about the shaft 2168.

Referring now to FIGURES 31, 35, 51, 52 and 55, it is seen that the idler gear 2186 meshes with a spur gear 2202 that is keyed to a shaft 2204 extending transversely across the housing 2180, and is journaled for rotation in bearings 2206 carried by the arm 2178. The other end of the shaft 2204 is journaled in similar bearings 2208 carried in an arm 2210 opposite the leg 2178 and forming a part of a housing 2180. Keyed to the shaft 2204 for rotation therewith is a beveled gear 2212, the beveled gear 2212 meshing with a second beveled gear 2214 fixedly secured to one end of a clutch drive shaft 2216. The clutch is designated by reference numeral 2218 and is conventional in nature. As is illustrated in FIGURE 51, the shaft 2216 is journaled in the housing 2180 in bearings 2220 and the other end thereof has splined thereto, for axial movement relative thereto, a conventional male coupler element 2222 having a peripheral groove 2224 formed therein.

Reference numeral 2226 denotes the female coupling element, the coupling 2226 being fixedly secured to one end of a shaft 2228 and disposed in confronting relation relative to the male coupling element 2222. The shaft 2228 is a driven shaft and is mounted in suitable bearings 2230 for rotation in the housing 2180, and the outer end of the shaft 2228 has keyed at 2232, a beveled gear 2234.

Reference is now made to FIGURE 31 of the drawings wherein reference numeral 2236 indicates a bell crank lever pivotally connected on a pin 2238 to the housing 2180. The bell crank lever 2236 includes a pair of yoke arms 2240, 2242 (see FIGURE 52), each of which is provided with confronting pins 2248 which are adapted to engage within the peripheral groove 2243. The lever 2236 is also provided with a manually-operable handle 2250 so that the lever 2236 may selectively be rotated in a counterclockwise direction (reference being made to FIGURE 31) to effect the engagement of the male coupling element 2222 with the female coupling element 2226 to drive the shaft 2228. Spring-biased detent means 2254 are carried by the lever 2236 for selective engagement within the recesses 2256 formed in the front supporting leg 2257 for the housing 2180.

Referring now more specifically to FIGURES 31, 45, 46 and 48, it is seen that the beveled gear 2234 meshes with a beveled gear 2258 keyed at 2260 to a shaft 2268, one end of the shaft 2268 being rotatably supported in bearings 2270 disposed in a bushing 2272. As is seen in the drawings, the bushing 2272 is supported on the end wall 148 and extends laterally away therefrom and is substantially parallel to the top wall 150. Intermediate its ends, the shaft 2268 is supported from the top wall 150 in hanger bearings 2274, 2276 (see FIGURES 31 and 48). The shaft 2268 has a worm gear 2278 keyed thereto at 2280 which meshes with a gear 2282 affixed to the shaft 2022 for rotation therewith. As is seen in FIGURES 30 and 46, the shaft 2268 is inclined at such an angle as to dispose the gear 2282 between the arms 2018, 2020 of the bracket 2016. The shaft 2268, when rotated, will drive the shaft 2022 which will, in turn, effect the rotation of the timing and programming drums 2026, 2028.

The other or upper end of the shaft 2268 has fixedly secured thereto a second worm gear 2284 which is in mesh with the gear 2286 keyed at 2288 to one end of a shaft 2290 mounted for rotation in bearings 2292 fixedly secured to the underside of the top wall 150, the other end of the shaft 2290 projecting through the top wall 150 and having doweled thereto at 2294 a cam member 2296. A hold-down cap 2298 is threaded on the aforementioned other end of the shaft 2290 to prevent inadvertent axial displacement of the cam 2296. As is seen in FIGURES 48 and 49, the periphery of the cam 2296 is adapted to be traced by the cam follower roller 2126 mounted on the lever 2110.

To the upper outer end of the shaft 2268 is fixedly secured a spur gear 3000 which meshes with a gear 3002 that is, in turn, fixedly mounted on a shaft 3004. The shaft 3004 is supported for rotation in the hanger bracket 2276 and has an end portion thereof extending through an opening 3006 formed in a wall 3008 that depends from the top wall 150. As is clearly seen in FIGURE 48, the lower end of the wall 3008 is integrally joined with the support plate 144 by a longitudinally-extending wall 3010.

A bearing block 3012 (see FIGURE 27) is fixedly secured on the wall 3010 and has journaled for rotation therein a shaft 3014 on one end of which is fixedly secured a beveled gear 3016 that meshes with the beveled gear 3018 which is keyed at 3020 to the upper end of the shaft 3004. The longitudinal axes of the shafts 2268 and 3004 are seen to be substantially parallel with relation to one another.

The other end of the shaft 3014 is connected by a universal joint 3021 to one end of a connecting shaft 3022, the other end of the shaft 3022 being rotatably journaled in the spacer wall 153 and, by means of a coupler element 3024 the shaft 3022 is connected in driving relation to the shaft 730. Thus, driving means is established for effecting operation of the several cams mounted on and carried by the headstock.

Extending inwardly from one end of the block 914 and the dovetail key 915 is a substantially cylindrical bore 3026 (see FIGURE 33) in which is disposed an elongated cylindrical rod 3028 having a cylindrical collar 3030 fixedly secured to the inner end thereof. Adjacent the other end of the rod 3028 and also disposed within the bore 3026 is a sleeve 3032 mounted for reciprocation on the rod 3028 and having a bore 3033 formed therein. Between the adjacent ends of the collar 3030 and sleeve 3032 and surrounding the rod 3028 is a helicoidal spring 3034 under compression.

Reference numeral 3036 indicates a bracket having an upwardly extending leg 3038 in which is disposed a substantially cylindrical internally threaded cap 3040 fixedly secured in the leg 3038 by means of a clamp 3042. As is clearly seen in FIGURE 33, the other or outer end of the rod 3028 is threadedly engaged for adjustment within the cap 3040.

The outer end of the dovetail king 915 is formed with an inwardly-extending slot 3044 which is adapted to receive for reciprocation therein the shank portion 3046 of a screw 3048 threaded in the turret mounting block 918, the outer terminal end of the shank portion 3046 being received within the bore 3033 of the sleeve 3032.

The inwardly-extending slot 3044 in the outer end of the dovetail key 915 determines the maximum forward stroke of the turret mounting block 918, and the screw 3048 always has longitudinal and side clearance in the slot 3044.

During the forward movement of the block 918, the sleeve 3032 compresses the spring 3034, and when the indexing lever 2004 is tripped, the shaft 1196 to which is connected the lever 2080 starts its motion counterclockwise (reference being made to FIGURE 33), thus pulling the turret mounting block 918 toward the headstock.

It will be understood that as the shaft 1196 turns through one complete revolution, the compressed spring 3094 will give additional return impetus to the crank portion between the centers 1196 and 2087 to effect substantially instantaneous withdrawal of the turret mounting block 918. As the rack 2092 moves inwardly, the spring 3034 is compressed, and during the rotation of the shaft 1196 from 120 degrees to 240 degrees the indexing operation described above takes place. As the shaft 1196 turns through the final 120 degrees, the spring 3034 is fully compressed against the inner end of the slot 3044, thereby urging the turret mounting block 918 to move forward toward the work. This completes the motion carried out through one revolution of the shaft 1196. The motor 1122 is, as has been stated above, desirably a two-speed motor capable of operation at 240 r.p.m., and 120 r.p.m., and at 240 r.p.m., of the shaft 1196 the indexing time will be one-fourth of a second, and at 120 r.p.m., the indexing time will be one-half second.

*Manually-Operable Means for Effecting Machine Set-Up*

Reference is now made more specifically to FIGURES 45 and 46. Fixedly secured to the wall 148 is a substantially rectangular bracket plate 3050 having a support arm 3052 fixedly secured thereto and disposed in spaced relation. The wall 148, bracket plate 3050 and arm 3052 are coaxially aligned to rotatably receive therein a shaft 3054 having a toothed pulley 3056 fixedly secured for rotation therewith at one end thereof, and a similar pulley 3057 is secured to the shaft 2068 adjacent the bracket 2016. A twisted endless belt 3058 is trained about the pulleys 3057, 3058.

The other end of the shaft 3054 carries a female clutch element 3060 adapted to be releasably engaged by a male clutch element 3062 carried on one end of a shaft 3064 which is adapted for reciprocation within a boss 3066 formed in the end wall 3068 of a clutch housing designated, in general, by reference numeral 3070. Any conventional means may be employed for securing the housing 3070 to the top wall 150 and end wall 148. As seen in FIGURE 45, the shaft 3064 has fixedly secured to its other end a hand-operated wheel 3072 having a hub 3074 disposed in confronting relation with respect to a bore 3076 formed in the boss 3066. A helicoidal spring 3078 surrounds the shaft 3064 and abuts against the base of the bore 3076 at one of its ends and against the hub 3074 at its other end. Thus, the shaft 3064 and the male clutching element 3062 are constantly biased for movement away from the female clutching element 3060.

It is interesting to note that arcuate movement of the lever 2250 in such a direction as to effect disengagement of the coupling elements 2222, 2226, the shaft 1196 is not prevented from functioning in connection with the hand operation. Reference is here made to the kinetic diagram of FIGURE 4 of the drawings, wherein it is clearly seen that the drive motors 1122 and 2130 are quite independent. To borrow terminology used in the screw machine art, disengagement of the coupling elements 2222, 2226 merely throws the machine out of cycle. It, therefore, affects all of the cams governing the tool post. Nevertheless, the cycle time gear train remains in operation, but is idling (see FIGURE 50) as long as the motor 2130 is energized.

This points up one of the novel features of the invention in that the working cycle may be cranked through by hand faster while setting up for tool clearances, and it is made much easier since the cycle gear train is disconnected. For example, on a conventional single spindle screw machine, cranking through by hand on a one-fourth second turret indexing machine which is provided with a back half-speed of 240 r.p.m., and doing a job in a 60-second cycle, the operator would require 240 turns at the back shaft to manually perform 60 seconds (one revolution of the cam shafts) to make a part. This is because the gearing for the cycle is coupled with the timing drums and the cam shafts. By way of further explanation, one could not take the cycle time gears off the shafts and revolve the cam shafts and programming drums by hand on such a machine.

In the instant machine there is provided a 1:10 worm gear operating all of the cam shafts and a 1:1.75 ratio with respect to the handwheel timing belt drive. For idling one full turn of all the cam shafts it would, therefore, require 17.5 turns of the handwheel. It is not advocated that the handwheel be utilized for cutting, for this always provides an erroneous picture regardless of ratio. The only true cutting takes place when the machine is in cycle because of the direct relationship of feeds and speeds with the respective hundreds of cam spaces.

In the instant machine an advantage over prior art devices is provided in that it may idle by hand with the cycle gears rotating, go through the trip motions with the shaft 1196 running, or the shaft 1196 may be stopped and the trip indexing lever may be operated by hand and the shaft 1196 turned through one full revolution by the handwheel 3079 (see FIGURES 30 and 32) while watching clearances.

Still another possibility is the cranking by hand with either the back shaft running or idle, and still feeding stock on the proper lobe, because the feed is done by electrical impulses derived from apparatus, to be described, controlled by trips. It should be noted, however, that at any time, the automatic cycling of this machine is instantly available by engaging the clutch 2180.

With reference to FIGURE 4, a typical hand-operated indexing operation is briefly set forth below.

First, the shaft 1196 would be idle. Second, the clutch 2180 would be disengaged, thus stopping the cam cycle. Third, the clutch element 3062 would be engaged with the clutch element 3060 and the handwheel 3072 rotated in order to actuate the several cams and drums. Now, if the lever 2110 reaches the cutdown portion of the cam 2296, the lever 2004 will be tripped. Thereafter, the handwheel 3079 is rotated through one revolution while carefully watching, at the same time, for tool clearances on both turrets 922, 924.

*Wiring Diagram*

In the interest of simplicity, a schematic wiring diagram for controlling the several motors and the solenoid-operated valve is presented in FIGURE 59. The wiring diagram illustrated therein has been over-simplified, but it is believed that the same will suffice to show the electrical means for controlling the electrical components of the invention.

As is shown in FIGURE 59, a source of E.M.F. identified at 3080 has connected to one side thereof a line 3082. Leads 3084, 3086, 3088 and 3090 from the line 3082 connect directly with one of the sides of the fields 3092, 3094 of the two-speed back shaft motor 1122, respectively, and with one side of the field 3096 of the cam-operating motor 2130, as well as with one side of the field 3098 of the spindle-driving motor 324. The line 3082 connects directly into one side of the armature winding 3100 of the solenoid-operated valve 472.

The other side of the source of E.M.F. 3080 connects through line 3102 interrupted by a main control switch 3104 with the other sides of the fields 3092, 3094 through leads 3106, 3108, respectively, interrupted for selected operation by means of switches 3110, 3112, respectively. The line 3102 also connects through the lead 3114 controlled by switch 3116 with the other side of the winding 3096 of the cam-operating motor 2130. The other side of the field 3098 of the spindle-driving motor 324 connects with the line 3102 through a lead 3118 interrupted by a switch 3120.

Reference numeral 3122 designates a micro switch for energizing the armature 3100 for opening the valve 472 clockwise and counterclockwise in the manner described above. The switch 3122 is conventional in design and includes a switch arm 3124 which is adapted to be engaged by a dog 3126 carried on the timing drum 2026. The switch arm 3124 is constantly biased for engagement against a fixed switch contact 3126 which holds the valve 472 in such position that air under pressure is normally airing the air cylinder 460 on the right-hand side of the air cylinder piston to hold the collet fingers 452 in their normally closed position. The breaking of this circuit and the establishment of the circuit through the fixed switch contact 3128 causes the valve 472 to turn in the opposite direction and thereby cause the compressed air to be admitted to the other side of the piston in the air cylinder 460, thereby causing the piston rod 466 to move in the reverse direction and effect release of the collet fingers 452.

Only one of the switches 3110, 3112 is closed depending upon what speed is desired on the back shaft.

The drum 2026 carries other trips or dogs 3127 for sequentially closing the switch arm 3129 of the second micro-switch 3131 against the fixed switch contact 3133. This closes the circuit to the control means of a pneumatic stock-feeding device 3137 for feeding stock through the openings 178', 178'' formed in the end wall 178 and into the spindles 190, 192 during the cycle time in which the collets are open.

*Operation of the Twin Turret Lathe*

The operation of the instant device may be clearly made out by reference to FIGURES 5 to 13, inclusive. In this embodiment of the invention the contours and sizes of the various cams described above have been carefully calculated as well as all gearing involved to produce, for example, a dowel pin 3130 (see FIGURE 13) which is a compound unit formed of the peg 3132 and socket 3134. In the instant embodiment, the peg 3132 may be formed of material such as, for example, steel, and the socket 3134 may be, if desired, formed of a brass material. The two are assembled in the manner shown in FIGURE 13 to form the completed unit which is used by pattern makers for foundry patterns to hold together certain portions thereof.

Assuming that the motors 1122, 2130 and 324 have been energized and the clutch 2218 is engaged, the shaft 2286 will rotate and through the above-described gearing system will effect a turning movement of the cams 2296, 806 and 808 in a counterclockwise direction, as viewed in FIGURE 4, and will turn the cam 866 in a clockwise direction.

Referring now to FIGURE 11, the cam follower roller 2126 has just traced the periphery of the cam 2296 through position 1 after indexing to present the bar stop tools 4000, 4002 to the work 908, 908' carried in the spindles 192, 190, respectively. At this time, the work 908, 908' is forced against the bar stops while the collet fingers 352 are in their released condition. Immediately thereafter, the collet fingers 352 are closed as the cam follower roller moves into its full-line position shown in FIGURE 11 to effect the indexing of the turrets 922, 924 to present the tools 4012, 4014 to the work 908, 908'. Immediately after indexing the lever 2110 causes the turret slide 918 to move forward and engage the work 908, 908', in the manner described above, and simultaneously therewith the cams 806, 808 effect contact with their respective levers 706 to effect the movement of their associated tool slides 615 to engage their respective tools 644 against the side of the work 908, 908'.

The cam follower roller 2126 has now traced that portion of the cam 2296 through its second position and again indexes to present the work 908, 908' to the tools 4008, 4010 as shown in FIGURE 7. Simultaneously, the tool 644 is withdrawn away from the work with the escape of the cams 806, 808 from their respective associated levers 706. This last step is illustrated in FIGURE 7.

After indexing, the cam follower roller 2126 traces the next position (3A) of the cam 2296 causing the tool 4012 to approach the work 908 and the tool 4014 together with the contour tracing device 4016 to start copying the ogive configuration.

Over that portion of the cam 2296 designated as position 4 in FIGURE 11, the tools 4012 and 4014 finish their reaming and copying operations (see FIGURE 9).

As the roller 2126 faces that portion of the cam 2296 defined at position 5 in FIGURE 11, the turret mounting block is not idle. This is a reverse feed position at an increased feed rate of the forward stroke. The copying tool 4014 is held in a swing tool holder and has to come back to the ogive center in the feed motion. Once clear from the job, it may be indexed away.

There are two idle indexing in position 6 as represented in FIGURE 11 which is followed by position 6A for the cut-off operation illustrated in FIGURE 10.

It should be understood that the hub 1150 effects only one complete revolution during each indexing period, and that the indexing is, of course, controlled by the tripping of the lever 2004 in the manner described above.

While any desirable means may be employed for locking the several turret-carried tools on the turrets 922, 924, the securing device proposed by this invention is illustrated in FIGURE 33A. In this figure, it will be seen that the openings 928 in each of the turrets 920, 922 are intersected by bores 5000, the axis of the latter being substantially perpendicular to the axis of the former. Disposed in each of the bores 5000 is a stud 5002 having an arcuate recess 5004 formed therein. The recess 5004 faces the bores 928 and receives therein the shank 5006 of the turret-carried tools referred to above. The upper end of the stud 5002 is threaded at 5008, and projects beyond the exterior sides of the turrets 920, 922. The studs 5002 are tightened against the shanks 5006 by means of a lock washer 5010 and a lock bolt 5012.

Having described and illustrated one embodiment of this invention, it will be understood that the same is offered merely by way of example, and that this invention is to be limited only by the scope of the appended claims.

What is claimed is:

1. In a turret lathe, an elongated substantially rectangular turret mounting block, a first substantially cylindrical tool-holding turret having one end of a first shaft fixedly secured to one side thereof with the other end of said shaft projecting laterally therefrom in coaxial relation relative thereto, said other end of said shaft being rotatably supported within said block, a first gear fixedly secured to said other end of said first shaft, a second shaft journaled for rotation within said mounting block and extending transversely therethrough with its opposed ends extending beyond the opposed sides of said mounting block and with its axis of rotation perpendicular to the axis of rotation of said first shaft, a second gear fixedly secured to said second shaft intermediate its ends for rotation therewith, a second substantially cylindrical tool-holding turret secured to one end of said second shaft for rotation therewith, said first and second gears meshing with one another whereby rotation of said second shaft will effect simultaneous rotation of said first and second turrets, a Geneva gear fixedly connected to the other end of said second shaft, a third shaft journaled for rotation in said turret mounting block and having an end thereof projecting laterally from said other side of said block, a wheel having a roller projecting laterally from a side thereof, said wheel being secured to said third shaft for rotation therewith and said roller being engageable with said Geneva gear to effect intermittent rotary movement thereof and consequently of said turrets, and means including a gear train connected with said third shaft to effect rotation of the latter.

2. In a turret lathe, an elongated substantially rectangular mounting block, a first substantially cylindrical tool-holding turret having one end of a first shaft fixedly secured to one side thereof with the other end of said shaft projecting laterally therefrom in coaxial relation relative thereto, said other end of said shaft being rotatably supported within said block, a first gear fixedly secured to the other end of said first shaft, a second shaft journaled for rotation within said mounting block and extending transversely therethrough with its opposed ends extending beyond the opposed sides of said mounting block and with its axis of rotation perpendicular to the axis of rotation of said first shaft, a second gear fixedly secured to said second shaft intermediate its ends for rotation therewith, a second substantially cylindrical tool-holding turret secured to one end of said second shaft for rotation therewith, said first and second gears meshing with one another whereby rotation of said second shaft will effect simultaneous rotation of said first and second turrets, a Geneva gear fixedly connected to the other end of said second shaft, a third shaft journaled for rotation in said turret mounting block and having an end projecting laterally from the other side of said block, a wheel having a roller projecting laterally from a side thereof, said wheel being secured to said third shaft for rotation therewith and said roller being engageable with said Geneva gear to effect intermediate rotary movement thereof and consequently of said turrets, a fourth shaft supported for rotation on said turret mounting block, a programming drum fixedly secured to one end of said fourth shaft, a clutch-operating trip lever pivotally supported on said mounting block, said lever having one of its ends proximate said drum, means on said drum coacting with said one end of said lever to effect pivotal movement of said lever in one direction, power means including a gear train connected with said third shaft to effect rotation of said third shaft, said gear train including a clutch, and said other end of said trip lever being engaged with said clutch to hold the same normally in its disengaged condition, and said other end of said lever being disengaged from said clutch to effect engagement thereof when said other end of said lever is pivoted away therefrom, thereby activating said gear train.

3. A turret lathe including an elongated, substantially rectangular lathe bed, an elongated substantially rectangular headstock including a bottom wall and an upright end wall, said bottom wall being fixedly secured to said bed with said end wall disposed inwardly from an end thereof, a work-holding spindle mounted for rotation on said bottom and end walls and having an end projecting laterally from said end wall, motor means supported on said bed, means connecting said motor in driving relation with said spindle, an elongated substantially rectangular turret mounting block slidably mounted on said bed for reciprocation toward and away from said end wall, a tool-carrying turret mounted on said turret mounting block for presenting a tool to the work carried in said one end of said spindle, means effecting movement of said turret mounting block toward said end wall, said means comprising a sliding gear rack block mounted for reciprocation on said turret mounting block in the same direction, a shaft journaled for rotation on said turret mounting block, an arm having an end fixedly secured to said shaft and having a pin offset therefrom, a link having one of its ends pivotally connected on said pin, the other end of said link being pivotally connected with one end of said sliding gear block, an elongated lever having a segment-shaped gear train end meshing with the rack of said sliding gear rack block, said lever being pivotally mounted intermediate its ends on said turret mounting block, a cam follower mounted on the other end of said lever, a cam mounted for rotation on said turret mounting block, means supported on said bed and connected in driving relation with said cam, said cam follower engaging said cam whereby as said cam follower traces the high side of said cam, a force is exerted on said shaft to move said turret mounting block toward said headstock, and resilient means connected between said turret mounting block and said bed constantly biasing said turret mounting block for movement away from said headstock whereby as said cam follower traces the low side of said cam said turret mounting block is returned to its original position.

4. A turret lathe including an elongated, substantially rectangular lathe bed, an elongated substantially rectangular headstock including a bottom wall and an upright end wall, said bottom wall being fixedly secured to said bed with said end wall disposed inwardly from an end thereof, a work-holding spindle mounted for rotation on said bottom and end walls and having an end projecting laterally from said end wall to receive the work therein, motor means supported on said bed, means connecting said motor in driving relation with said spindle, an elongated substantially rectangular turret mounting block slidably mounted on said bed for reciprocation toward and away from said end wall, a tool-carrying turret mounted on said turret mounting block for presenting a tool to the work carried in said one end of said spindle, means for effecting movement of said turret mounting block toward said end wall, said means comprising a sliding gear rack block mounted for reciprocation on said turret mounting block in the same direction, a shaft journaled for rotation on said turret mounting block, an arm having an end fixedly secured to said shaft and having a pin offset therefrom, a link having one of its ends pivotally mounted on said pin, the other end of said link being pivotally connected with one end of said sliding gear rack block, an elongated lever having a segment-shaped gear carrying end meshing with the rack of said sliding gear rack block, said lever being pivotally mounted intermediate its ends on said turret mounting block, a cam follower mounted on the other end of said lever, a cam mounted for rotation on said turret mounting block, means supported on said bed and connected in driving relation with said cam, said cam follower engaging said cam whereby as said cam follower traces the high side of said cam a force is exerted on said shaft to move said turret mounting block toward said headstock, resilient means connected between said turret mounting block and said bed constantly biasing said turret mounting block for movement away from said headstock whereby as said cam follower traces the low side of said cam said turret mounting block is returned to its original position, motor-driven means supported on said bed, and means intermittently connecting said last-named motor with said last-named shaft whereby the latter is rotated by said motor as said cam follower traces the low side of said cam and approaches the high side thereof.

5. In a turret lathe including a lathe bed and an elongated, substantially rectangular turret mounting block supported on said bed, a tool-carrying turret having one end of a first shaft mounted on to a side thereof, the other end of said first shaft being journaled for rotation in said turret mounting block, a second shaft having one end thereof journaled for rotation in said turret mounting block, means connecting said other end of said first shaft in driving relation with said one end of said second shaft, the other end of said second shaft projecting laterally from one side of said turret mounting block and having a Geneva gear fixedly secured thereto, a third shaft supported for rotation in said turret mounting block, said third shaft having one end thereof projecting laterally from said one side of said turret mounting block and having a wheel secured thereon for rotation therewith, a roller mounted on said wheel and projecting from a side thereof for intermittent engagement with said Geneva gear whereby as said wheel is rotated, said first and second shafts are intermittently rotated to effect indexing of said turret from one tool station to a second tool station during each complete revolution of said wheel, a first spur gear mounted on said third shaft for rotation therewith, a fourth shaft mounted for rotation in said turret mounting block, said fourth shaft having one end thereof projecting laterally beyond one side of said turret mounting block, a second spur gear fixedly secured to said fourth shaft and meshing in driving relation with said first spur gear, a first bevel gear mounted on said fourth shaft for rotation therewith, an elongated fifth spur gear supported for rotation on said turret mounting block, said fifth spur gear having a second spur gear fixed thereto for rotation therewith, said second spur gear being meshed with said first spur gear, a motor fixedly mounted on said bed and having a drive shaft, a sixth spur gear mounted on said drive shaft for rotation therewith, a back shaft rotatably supported on said bed, a seventh spur gear fixedly secured to one end of said back shaft and meshing with said sixth spur gear, an eighth spur gear mounted on said back shaft, said back shaft being normally free to rotate relative to said eighth spur gear, said eighth spur gear meshing with said fifth spur gear, and clutch means mounted on said back shaft to effect a driving connection between said back shaft and said eighth spur gear whereby alternate engagement of said clutch will intermittently drive said eighth spur gear to intermittently drive said elongated fifth spur gear and through said fifth spur gear to drive said second and first bevel gears and said second and first spur gears thereby driving said first shaft and its associated wheel to effect turning of said Geneva gear and the indexing of said turret.

6. In a turret lathe including an elongated, substantially rectangular lathe bed, an elongated substantially rectangular mounting block supported on said bed, a first shaft having one end thereof journaled for rotation about a substantially vertical axis in said turret mounting block adjacent one end of the latter, a first tool-carrying turret fixedly secured to the other end of said first shaft, a second shaft journaled for rotation in said turret mounting block, said second shaft extending laterally across said turret mounting block and having its opposed end projecting laterally beyond the opposed sides of said turret mounting block and being disposed adjacent said one end of said turret mounting block and having a horizontal axis of rotation substantially perpendicular to the axis of rotation of said first shaft, a second tool-carrying turret mounted on one of the projecting ends of said second shaft for rotation therewith and disposed on one side of said turret mounting block, a Geneva gear fixedly secured to said second shaft on the other end thereof, a first bevel gear affixed to one end of said first shaft, a second bevel gear fixedly secured to said second shaft intermediate its ends and meshing with said first bevel gear, means imparting intermittent rotary motion to said Geneva gear whereby said first and second turrets through said first and second shafts are intermittently rotated to provide for the indexing thereof, said means comprising a third shaft mounted for rotation in said turret mounting block and projecting laterally from the other side thereof and having its axis of rotation substantially parallel to said axis of said second shaft, a wheel fixedly secured to the projecting end of said third shaft and having a roller projecting laterally from a side thereof for intermittent engagement with said Geneva gear to drive the latter, a first spur gear mounted on said third shaft for rotation therewith, a fourth shaft journaled for rotation in said turret mounting block and having an end thereof projecting laterally away from said other side of said turret mounting block and having its axis of rotation parallel to said axis of rotation of said third shaft, a second spur gear fixedly secured to said projecting end of said fourth shaft for rotation therewith and being in mesh with said first spur gear, a third bevel gear fixedly secured on said fourth shaft for rotation therewith, an elongated third spur gear supported for rotation on said turret mounting block with its axis of rotation perpendicular to the axis of rotation of said fourth shaft and having a fourth bevel gear fixedly secured thereto and coaxially aligned therewith, said fourth bevel gear meshing with said third bevel gear, a back shaft supported for rotation on said bed with its axis of rotation parallel to the axis of rotation of said third spur gear, a fourth spur gear fixedly secured on said back shaft adjacent an end thereof for rotation therewith, a motor having a drive shaft and mounted on said bed, a fifth spur gear secured on said drive shaft for rotation therewith and meshing with said fourth spur gear, a female clutching element fixedly secured to said back shaft for rotation therewith and being disposed adjacent its other end, a bushing mounted on said back shaft and having an end terminating adjacent said female clutching element, a male clutching element mounted for reciprocation on said bushing and having an end confronting said female clutching element, said male clutching element having a centrally reduced portion intermediate its ends and being counterbored to form, when taken in conjunction with adjacent portions of said bushings, a compartment, a sixth spur gear having an elongated hub mounted on said bushing and being freely rotatable thereabout and meshing with said fifth spur gear, said hub having a counterbored recess at one end thereof which when taken with the adjacent portions of said bushing forms a compartment, said counterbored ends of said female clutch element and the counterbored end of said hub being disposed in confronting relation and forming a closed compartment therebetween, a helicoidal spring surrounding said bushing and disposed within said closed compartment and constantly tending to urge said male clutching element for movement into engagement with said female clutching element, said counterbored end of said hub having a pair of diametrically-opposed axially-extending lugs and the adjacent end of said male clutching element having a pair of diametrically-opposed recesses formed therein to slidably receive said lugs, said male clutching element adjacent said counterbored end thereof having a cam face facing inwardly of said recess and having high and low sides, an elongated trip lever pivotally mounted intermediate its ends on said bed, a pin supported on one end of said lever and being pivotal into and out of said recess formed in said male clutching element, said pin normally engaging said high side of said cam to hold said clutching elements out of engagement with one another and being pivotally movable away from said high side of said cam to cause engagement of said male clutching element with said female clutching element under the influence of said spring whereby said sixth spur gear is driven and consequently said wheel and Geneva gear, and means for subsequently engaging said pin against said low side of said cam face to trace the same throughout one full revolution of said cam face, said pin moving over the high side of said cam face and effecting disengagement of said clutch elements against the force of said spring and halting the rotation of said sixth spur gear and of said wheel after one full revolution of said sixth spur gear and of said wheel.

7. In a turret lathe including an elongated, substantially rectangular lathe bed, an elongated substantially rectangular turret mounting block supported on said bed, a first shaft having one end thereof journaled for rotation about a substantially vertical axis in said turret mounting block adjacent one end of the latter, a first tool-carrying turret fixedly secured to the other end of said first shaft, a second shaft journaled for rotation in said turret mounting block and extending laterally across said turret mounting block and having its opposed ends projecting laterally beyond the opposed ends of said turret mounting block and being disposed adjacent said one end of said turret mounting block and having a horizontal axis of rotation substantially perpendicular to the axis of rotation of said first shaft, a second tool-carrying turret mounted on one of the projecting ends of said second shaft for rotation therewith and disposed on one side of said turret mounting block, a Geneva gear fixedly secured to said second shaft on the other end thereof adjacent the other side of said turret mounting block, a first bevel gear affixed to said one end of said first shaft, a second bevel gear fixedly secured to said second shaft intermediate its ends and meshing with said first bevel gear, means imparting intermittent rotary motion to said Geneva gear whereby said first and second turrets through said first and second shafts are intermittently rotated to provide for the indexing thereof simultaneously, said means comprising a third shaft mounted for rotation on said turret mounting block and projecting laterally from the other side thereof, said third shaft having its axis of rotation substantially parallel to the axis of rotation of said second shaft, a wheel fixedly secured to the projecting end of said third shaft and having a roller projecting laterally therefrom for intermittent engagement with said Geneva gear to drive the latter, a first spur gear secured on said third shaft for rotation therewith, a fourth shaft journaled for rotation in said turret mounting block and having an end thereof projecting laterally from said other side of said turret mounting block and having its axis of rotation parallel to said axis of rotation of said third shaft, a second spur gear fixedly secured to said projecting end of said fourth shaft for rotation therewith being in mesh with said first spur gear, a third bevel gear fixedly secured on said fourth shaft for rotation therewith, an elongated third spur gear supported for rotation on said turret mounting block with its axis of rotation perpendicular to the axis of rotation of said fourth shaft and having a fourth bevel gear fixedly secured thereto and coaxially aligned therewith, said fourth bevel gear meshing with said third bevel gear, and a back shaft supported for rotation on said bed with its axis of rotation parallel to the axis of rotation of said third spur gear, a fourth spur gear fixedly secured on said back shaft adjacent an end thereof for rotation therewith, a motor having a drive shaft supported on said bed, a fifth spur gear secured on said drive shaft for rotation therewith and meshing with said fourth spur gear, a female clutching element fixedly secured to said back shaft for rotation therewith and adjacent its other end, a bushing mounted on said back shaft and having an end terminating adjacent said female clutching element, a male clutching element mounted for reciprocation on said bushing and having an end confronting said female clutching element and having a centrally reduced portion intermediate its ends and being counterbored adjacent its other end, said counterbored portion when taken with adjacent portions of said bushing forming a compartment, a sixth spur gear having an elongated hub mounted on said bushing and freely rotatable thereabout and meshing with said elongated fifth spur gear, said hub having a counterbored recess at one end thereof which when taken with adjacent portions of said bushing form a compartment, said counterbored end of said male clutching element and the counterbored end of said hub being in confronting relation to form a closed compartment therebetween, a helicoidal spring surrounding said bushing and disposed within said closed compartment and constantly tending to urge said male clutching element for movement into engagement with said female clutching element, said counterbored end of said hub having a pair of diametrically-opposed axially-extending lugs and the adjacent end of said male clutching element having a pair of diametrically-opposed recesses formed therein to slidably receive said lugs, said male clutching element adjacent said counterbored end thereof having a cam face facing inwardly of said centrally reduced portion, said cam face having high and low sides, an elongated trip lever pivotally mounted intermediate its ends on said bed, a pin supported on one end of said lever and being pivotal into and out of said reduced portion of said male clutching element and normally engaging said high side of said cam to hold said clutching elements out of engagement with one another, said pin being pivotally movable away from said high side of said cam to cause engagement of said male clutching element with said female clutching element under the influence of said spring whereby said sixth spur gear is driven and consequently said wheel and Geneva gear, means for subsequently engaging said pin against said low side of said cam to trace the same throughout one full revolution thereof and in moving over said high side of said cam face effecting disengagement of said male clutching element from said female clutching element against the force of said spring and halting the rotation of said sixth spur gear and of said wheel after one full revolution of said sixth spur gear and of said wheel, and releasable locking means engaging said hub to prevent the over-running thereof after said sixth spur gear has completed one full revolution.

8. In a turret lathe as defined in claim 7, and manually-operable means fixedly secured to said back shaft to effect rotation thereof while said motor is de-energized whereby said turrets may be indexed during the lathe set-up operations.

9. In a turret lathe including a substantially rectangular lathe bed, an elongated substantially rectangular turret mounting block supported on said bed, a first shaft having one end thereof journaled for rotation in said turret mounting block about a vertical axis of rotation, the other end of said first shaft projecting above the upper end of said turret mounting block, said first shaft being disposed adjacent one end of said turret mounting block and having a first tool-carrying turret fixedly secured thereto for rotation therewith and having a side thereof proximate said upper end of said turret mounting block, said side of said first turret having a plurality of circumferentially-spaced openings formed therein, a second shaft journaled for rotation in said turret mounting block and extending transversely across said turret mounting block adjacent said one end thereof and having its opposed ends projecting beyond the opposed sides of said turret mounting block and having a horizontal axis of rotation extending perpendicular to the vertical axis of rotation of said first shaft, a second tool-carrying turret fixedly secured to one of the projecting ends of said second shaft adjacent one side of said turret mounting block, that side of said turret proximate said one side of said turret mounting block having a plurality of inwardly-extending openings formed therein, a hollow tubular sleeve disposed within said turret mounting block and extending transversely therethrough and having an end opening in the plane of said one side of said turret mounting block and disposed in the rotational path of said openings formed in said second turret, the other end of said sleeve having a centrally apertured end wall extending thereacross, said sleeve having a longitudinally-extending cut-out formed therein intermediate the ends thereof, said cut-out extending axially and vertically through said sleeve, a first lock shaft mounted for reciprocation within said sleeve and having a reduced end portion forming a shoulder intermediate its opposed ends and having rack gear teeth extending axially thereof and confronting said cut-out, the other end of said first lock shaft being normally releasably received within one of said openings formed in said second turret, said reduced end of said first lock shaft projecting through said apertured end wall and beyond said other side of said turret mounting block and having an upwardly-facing notch formed therein, a helicoidal spring surrounding said reduced end of said first lock shaft and abutting at its opposed ends said apertured end wall and said shoulder whereby said first lock shaft is constantly biased for movement toward said second turret, a lever pivotally mounted on said turret mounting block for movement about a vertical axis and being disposed above said first lock shaft and having at one end thereof a depending latch member engaged within said notch, said lever having a depending arm at the other end thereof disposed adjacent said other side of said turret mounting block, a wheel fixed to said second shaft at the other end thereof and disposed adjacent the other side of said mounting block, said wheel having an arcuate cam member fixed thereto adjacent the periphery thereof, said arm being disposed in the path of movement of said arcuate cam whereby engagement of said arcuate cam with said arm causes pivotal movement of said lever to effect movement of said first lock shaft in a direction away from said second turret.

10. A turret lathe comprising a lathe bed, a headstock fixed to said bed and a turret mounting block slidably supported thereon for reciprocable movement toward and away from said headstock, a pair of cylindrical tool-carrying turrets supported for rotation on said block, each of said turrets including a shaft projecting laterally therefrom and coaxially aligned therewith, said shafts being journaled for rotation within said block and disposed at right angles with respect to one another, gear means connecting said shafts for simultaneous movement about their respective axes, a slotted Geneva gear connected with one of said shafts to effect indexing of said turrets simultaneously upon intermittent rotation of said gear, a wheel mounted for rotation on said block and having a roller engageable within successive slots of said Geneva gear, a gear train mounted on said block means mounted on said bed and said block for driving said Geneva gear, said means including a motor mounted on said bed and connected in driving relation with one end of said gear train, the other end of said gear train being connected in driving relation with said Geneva gear.

11. A turret lathe as defined in claim 10, a lock bolt for each of said turrets mounted for reciprocation in said block and being disposed perpendicular to each other, gear means connecting together said lock bolts whereby movement of one bolt effects simultaneous movement of the other, a lever pivotally mounted on said block, said lever having an end thereof engageable with one of said bolts, a cam arm on the other end of said lever, said wheel having a cam surface thereon for engagement with said arm to effect pivotal movement of said lever and consequently of the other end of said lever whereby said bolts are caused to move out of locking engagement with said turrets, and resilient means for returning said bolts to locking engagement with said turrets after said arm escapes from said cam surface.

12. A turret lathe as defined in claim 11, clutch means supported on said lathe bed and interposed in said gear train and being normally in its disengaged position, an elongated lever pivotally supported on said bed intermediate the ends of said lever, said last-named lever engaging at one of its ends said clutch means to effect its engaged and disengaged positions, a programming drum mounted for rotation on said bed, motor means on said bed for driving said programming drum, and means on said drum sequentially engaging the other end of said last-named lever to pivot the same to cause said clutch to engage.

13. A turret lathe as defined in claim 12, a shaft supported for rotation on said bed, a gear train including clutching means connecting said last-named motor means with said last-named shaft, a cam mounted for rotation on said lathe bed, gear means connecting said last-named shaft in driving relation with said cam, a segmental lever pivotally mounted on said bed and having a cam follower on one end thereof for tracing said cam, gear means on the other end of said lever engaging gear means on said block whereby actuation of said last-named lever causes said block to move toward said headstock, and resilient means for moving said block away from said headstock.

14. A turret lathe as defined in claim 13, and linkage means connecting said first gear train with said block to initiate movement thereof toward said headstock.

15. A turret lathe as defined in claim 14, said headstock having a pair of work-holding spindles supported for rotation thereon in confronting relation relative to said turrets, said headstock including an end wall, a tool holder slide for each of said spindles mounted on said end wall for reciprocation toward and away from its associated spindle in substantially horizontal directions, cam-operated means driven by said last-named shaft to effect movement of said slides toward said spindles, resilient means for moving said slides in the reverse direction, a tool-carrying slide for each of said spindles mounted on said end wall for reciprocation at angles with respect to the movement of said first slides, cam-operated means driven by said last-named shaft to move said last-named slides toward their associated spindles, and resilient means for moving said last-named slides in the reverse direction.

16. A turret lathe as defined in claim 15, and each of said spindles having a work-holding collet disposed therein, pneumatically-operated means for effecting operation of said collets, a second drum supported for rotation on said bed and driven by said last-named motor means, said last-named drum having a plurality of trips mounted thereon, a micro-switch operable by said trips and connected in an electric circuit controlling said pneumatic means.

17. A turret lathe as defined in claim 16, and means supported on said bed for effecting rotation of said spindles.

18. In an automatic cam controlled turret lathe comprising a bed, a headstock carried by said bed, a plurality of parallel workpiece-carrying spindles rotatively mounted in said headstock; the combination of a front tool-holder slide displaceable with respect to said bed along slides disposed parallel to the axis of rotation of said workpiece-carrying spindles, a motor driven cam shaft, a cam driven in rotation by said cam shaft, a lever pivoted on the front slide having one end actuated by said cam and the other end drivingly connected to said front tool-holder slide to actuate said front slide in linear displacements corresponding to the shape of said cam, a turret support carried by said front tool-holder slide and presenting bearing faces inclined with respect to each other, a plurality of turrets each carried by one of said inclined bearing faces and mounted for rotation in said turret support, each of said turrets being associated with one of the said workpiece-carrying spindles and presenting an axis of rotation forming an angle with respect to the axis of rotation of each of the other turrets.

19. An automatic cam controlled turret lathe comprising a bed, a headstock and a front slide support carried by said bed, twin workpiece-carrying spindles rotatively mounted in said headstock and disposed parallely to each other, the axis of rotation of said spindles being located in different horizontal planes, slides carried by said front slide support disposed parallelly to the rotation axis of said workpiece-carrying spindles and located in a plane inclined with respect to a plane containing the axis of rotation of both said spindles, a front tool-holder slide reciprocable along said slides, a motor driven cam drivingly connected to said front tool-holder slide and controlling the reciprocative movements of said front slide, a turret support carried by said front tool-holder slide and presenting two bearing faces forming an angle between them, and twin turrets each disposed on one of said bearing faces and mounted for rotation in said turret support, each of said turrets being associated to one of said workpiece-carrying spindles and presenting an axis of rotation forming an angle comprised between 70° and 160° with the axis of rotation of the other turret.

20. An automatic lathe according to claim 19 in which the angle included between the two bearing faces of said turret support and between the axis of rotation of said two turrets is of 90°.

21. An automatic lathe according to claim 19 in which each turret includes an actuating shaft, said shafts being mechanically coupled together and to a common indexing device in order to index said turrets simultaneously and in synchronism.

22. An automatic lathe according to claim 21 which includes a two speed electric motor for the driving of the indexing device in order to effect the simultaneous indexing of the twin turrets more or less rapidly according to the desired machining cycle.

23. An automatic lathe according to claim 18 which includes at least one pair of radial tool-holder slides and a pair of horizontal tool-holder slides, the slides of each of said pairs being respectively associated to each of the workpiece-carrying spindles, the slides of each pair being mounted on parallel slides.

24. An automatic lathe according to claim 19 in which each turret includes a head presenting several tool supports, said head being fixed on a base plate presenting a number of holes equal to the number of tool supports, a locking device co-operating successively with each hole of said plate to fix each turret head in each of its successive working positions.

25. An automatic lathe according to claim 24 in which both said locking means are actuated by a common locking device, and a common indexing device controlling the actuating of said locking devices of the two turrets.

26. An automatic lathe according to claim 24 in which the base plate of each turret head presents a peripheral conical surface angularly slidable on a corresponding conical surface provided on an adjusting plate, said plate being rigidly fixed on the front tool-holder slide, the whole being arranged so as to form a joint preventing the entrance of foreign matter into the driving in rotation device of the turret.

27. An automatic lathe according to claim 19 in which each turret is removably secured on the said front tool-holder slide in order to be rapidly and easily inter-changeable without damaging the precision of the setting of its tools.

28. An automatic lathe according to claim 19 which includes an actuating device of the front tool-holder slide in its reciprocatory displacements, said device comprising a driving motor, a turret actuating cam drivingly connected to said driving motor, a toothed rack secured to the front tool-holder slide, a lever pivoted on the frame of the lathe comprising a toothed sector in mesh with said toothed rack, and a cam following roller resting against the peripheral edge of said turret cam, said turret cam being located outside and journaled in said front slide support whereby said turret cam is visible for the lathe operator during operation of said lathe.

References Cited in the file of this patent
UNITED STATES PATENTS

| | | |
|---|---|---|
| 452,495 | Lindner | May 19, 1891 |
| 456,913 | Smith | July 28, 1891 |
| 787,690 | Pealing | Apr. 8, 1905 |
| 922,429 | Hollm | May 18, 1909 |
| 1,152,641 | Jung | Sept. 7, 1915 |
| 1,366,757 | Whitaker | Jan. 25, 1921 |
| 1,410,528 | Cockcroft | Mar. 21, 1922 |
| 1,422,994 | Ligon | July 18, 1922 |
| 1,602,724 | Thatcher | Oct. 12, 1926 |
| 1,619,281 | White | Mar. 1, 1927 |
| 2,061,586 | Morrall | Nov. 24, 1936 |
| 2,094,816 | Poppensieker | Oct. 5, 1937 |
| 2,322,525 | Kuehn | June 22, 1943 |
| 2,379,096 | Meusy | June 26, 1945 |
| 2,462,936 | Bechler | Mar. 1, 1949 |
| 2,577,442 | Adams | Dec. 4, 1951 |
| 2,657,453 | Brohun | Nov. 3, 1953 |
| 2,735,161 | Pulman | Feb. 21, 1956 |